US012574635B2

(12) United States Patent
Shao et al.

(10) Patent No.: US 12,574,635 B2
(45) Date of Patent: Mar. 10, 2026

(54) IMAGE PROCESSING METHOD AND RELATED DEVICE THEREOF THAT PROCESSES AN IMAGE WITH AN ALGORITHM BASED ON A QUANTITY OF WAIT TIME DETERMINATION

(71) Applicant: Honor Device Co., Ltd., Shenzhen (CN)

(72) Inventors: Tao Shao, Shenzhen (CN); Wenhong Zhang, Shenzhen (CN); Bin Xiao, Shenzhen (CN); Congchao Zhu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 29 days.

(21) Appl. No.: 18/840,383

(22) PCT Filed: Apr. 10, 2023

(86) PCT No.: PCT/CN2023/087338
§ 371 (c)(1),
(2) Date: Aug. 21, 2024

(87) PCT Pub. No.: WO2024/021678
PCT Pub. Date: Feb. 1, 2024

(65) Prior Publication Data
US 2025/0184603 A1 Jun. 5, 2025

(30) Foreign Application Priority Data
Jul. 28, 2022 (CN) .......................... 202210900690.0

(51) Int. Cl.
*H04N 5/335* (2011.01)
*H04N 23/61* (2023.01)
(Continued)

(52) U.S. Cl.
CPC .......... *H04N 23/667* (2023.01); *H04N 23/61* (2023.01); *H04N 23/632* (2023.01); *H04N 23/71* (2023.01); *H04N 23/741* (2023.01); *H04N 23/81* (2023.01)

(58) Field of Classification Search
CPC ....................................................... H04N 5/21
See application file for complete search history.

(56) References Cited

U.S. PATENT DOCUMENTS

| | | | |
|---|---|---|---|
| 10,469,746 B2 | 11/2019 | Kunishige et al. | |
| 2004/0150724 A1 | 8/2004 | Nozaki et al. | |
| 2022/0342516 A1* | 10/2022 | Chen ..................... | G06F 3/0486 |

FOREIGN PATENT DOCUMENTS

| | | |
|---|---|---|
| CN | 103327248 A | 9/2013 |
| CN | 110166711 A | 8/2019 |

(Continued)

*Primary Examiner* — Gary C Vieaux
(74) *Attorney, Agent, or Firm* — Conley Rose, P.C.

(57) ABSTRACT

An image processing method includes: displaying a first interface, where the first interface includes a preview image and a first control, and the first control indicates a photo mode; when detecting a first operation on the first control, in response to the first operation, capturing an original image once by using a camera; determining a quantity of times of waiting for photographing in a background; processing the original image by using a first photographing algorithm, to obtain a corresponding captured image, when the quantity of times of waiting for photographing in the background is less than or equal to M; or processing the original image by using a second photographing algorithm, to obtain a corresponding captured image, when the quantity of times of waiting for photographing in the background is greater than M and less than or equal to N; and saving the captured image.

20 Claims, 32 Drawing Sheets

(51) Int. Cl.

| | | |
|---|---|---|
| *H04N 23/63* | (2023.01) | |
| *H04N 23/667* | (2023.01) | |
| *H04N 23/71* | (2023.01) | |
| *H04N 23/741* | (2023.01) | |
| *H04N 23/81* | (2023.01) | |

(56) References Cited

FOREIGN PATENT DOCUMENTS

| | | | |
|---|---|---|---|
| CN | 110401800 | A | 11/2019 |
| CN | 111526288 | A | 8/2020 |
| CN | 112003996 | A | 11/2020 |
| CN | 110418061 | B | 4/2021 |
| CN | 113727016 | A | 11/2021 |
| CN | 114679534 | A | 6/2022 |
| JP | H1042250 | A | 2/1998 |
| JP | 2004187183 | A | 7/2004 |
| JP | 2015179969 | A | 10/2015 |
| WO | 2018076710 | A1 | 5/2018 |

* cited by examiner

100

60

CONT.
FROM

50

(b)

TO

CONT.
FROM

| Algorithm | Time consumption | Memory |
|---|---|---|
| First photographing algorithm | 2000 ms | 87.5 M |
| Second photographing algorithm | 1200 ms | 50 M |
| Third photographing algorithm | 500 ms | 25 M |
| Fourth photographing algorithm | 70 ms | 12.5 M |

IMAGE PROCESSING METHOD AND RELATED DEVICE THEREOF THAT PROCESSES AN IMAGE WITH AN ALGORITHM BASED ON A QUANTITY OF WAIT TIME DETERMINATION

CROSS-REFERENCE TO RELATED APPLICATIONS

This is a U.S. National Stage of International Application No. PCT/CN2023/087338 filed on Apr. 10, 2023, which claims priority to Chinese Patent Application No. 202210900690.0, filed with the China National Intellectual Property Administration on Jul. 28, 2022, both of which are incorporated herein by reference in their entireties.

TECHNICAL FIELD

This application relates to the field of image technologies, and in particular, to an image processing method and a related device thereof.

BACKGROUND

With popularization of electronic devices with a photographing function in life, taking images by people by using the electronic devices becomes a daily behavior.

Currently, during photographing processing, most electronic devices determine photographing algorithms based on camera parameters, to process and generate captured images based on the determined photographing algorithms. Usually, the used camera parameters include brightness, a dynamic range, a focal length, an object distance, and the like. However, a photographing algorithm determined based on the foregoing parameters usually runs for a relatively long time, or runs for a relatively short time but has poor photographing effect. In this case, effect and performance cannot be both considered. A new method is urgently needed to resolve this problem.

SUMMARY

This application provides an image processing method and a related device thereof. Quantities of times of waiting for photographing in a background are distinguished to adaptively select algorithms with different time consumption to perform processing. In this way, photographing efficiency can be improved, and effect and performance can be both considered.

To achieve the foregoing objectives, the following technical solutions are used in this application.

According to a first aspect, an image processing method is provided and is applied to an electronic device including a camera. The method includes:

displaying, by the electronic device, a first interface, where the first interface includes a preview image and a first control, and the first control indicates a photo mode;

when detecting a first operation on the first control, in response to the first operation, capturing, by the electronic device, an original image once by using the camera;

determining a quantity of times of waiting for photographing in a background, where the quantity of times of waiting for photographing in the background is equal to a difference obtained through subtracting a quantity of times of processed photographing and a quantity of times of photographing being processed from a current accumulated quantity of photographing times; and processing the original image by using a first photographing algorithm, to obtain a corresponding captured image, when the quantity of times of waiting for photographing in the background is less than or equal to M; or processing the original image by using a second photographing algorithm, to obtain a corresponding captured image, when the quantity of times of waiting for photographing in the background is greater than M and less than or equal to N; and saving the captured image, where M<N, M and N are both positive integers, and a processing time of the second photographing algorithm is less than a processing time of the first photographing algorithm.

Optionally, the first operation is a tap operation. The first operation may alternatively include a voice instruction operation or another operation that instructs the electronic device to perform photographing.

This embodiment of this application provides the image processing method. In response to the first operation performed by a user on the first control, the electronic device captures the original image once by using the camera; and then determines the quantity of times of waiting for photographing in the background, and invokes different photographing algorithms based on different quantities of times of waiting for photographing in the background to perform processing. For example, when the quantity of times of waiting for photographing in the background is relatively large, a photographing algorithm with relatively small time consumption is invoked to perform processing; or when the quantity of times of waiting for photographing in the background is relatively large, a photographing algorithm with relatively large time consumption is invoked to perform processing. Therefore, different algorithms are dynamically invoked to coordinate running durations of the photographing algorithms, to improve a photographing success rate and consider both effect and performance.

In a possible implementation of the first aspect, the method further includes:

processing the original image by using a third photographing algorithm, to obtain a corresponding captured image, when the quantity of times of waiting for photographing in the background is greater than N, where a processing time of the third photographing algorithm is less than the processing time of the second photographing algorithm.

Optionally, the third photographing algorithm is a single-frame algorithm.

In this implementation, when the quantity of times of waiting for photographing in the background is relatively large, it indicates that frequency of performing the tap operation by the user is very high, and the electronic device cannot process much data in time. In this case, the algorithm with relatively small time consumption may be used to process the original image, to improve processing efficiency and ensure that data related to the quantity of times of waiting for photographing in the background can be processed in time, thereby avoiding waiting and avoiding a frame loss problem.

In a possible implementation of the first aspect, the method further includes:

when detecting a second operation on the first control, in response to the second operation, capturing, by the electronic device, original images in a plurality of times by using the camera; and processing, by using a fourth photographing algorithm, an original image captured in each time, to respectively obtain a corresponding captured image, where a processing time of the fourth photographing algorithm is less than the processing time of the second photographing algorithm.

Optionally, the second operation may be a long press operation. The second operation may alternatively include a voice instruction operation or another operation that instructs the electronic device to continuously perform photographing for a plurality of times.

The long press operation indicates a behavior that the user touches a photographing key for a relatively long time. A time between pressing down of a finger and lifting up of the finger is a duration of one long press operation. The duration of the long press operation is greater than a duration of a tap operation.

Optionally, the fourth photographing algorithm may be the same as the third photographing algorithm, and the fourth photographing algorithm is a single-frame algorithm.

In this implementation, when the user performs the long press operation, it indicates that the user expects to continuously perform photographing for a plurality of times. In this case, frequency at which the electronic device captures the original image is very high. If the algorithm with relatively large time consumption is used in the background to process the original image captured in each time, processing cannot be performed in time, and data congestion occurs. Therefore, when the user performs the long press operation, the algorithm with relatively small time consumption needs to be used to process the original image captured in each time, to improve processing efficiency.

In a possible implementation of the first aspect, before the processing the original image by using a first photographing algorithm, to obtain a corresponding captured image, the method further includes:

performing detection on a to-be-photographed scene, and obtaining a detection result, where the detection includes illuminance detection, dynamic range detection, and at least one of AI scene recognition, motion detection, human face detection, and human face attribute detection.

In this implementation, detection is performed on the to-be-photographed scene to refine a case in the scene in this embodiment of this application, to correspondingly refine a method for processing an original image, thereby adaptively improving quality and effect of a captured image obtained in each case.

In a possible implementation of the first aspect, for the performing detection on a to-be-photographed scene, and obtaining a detection result, the method includes:

performing front-end processing on the original image, where the front-end processing is used to correct the original image; and performing detection an original image obtained after the front-end processing, and obtaining a detection result.

In this embodiment of this application, an image obtained after first front-end processing is in a RAW domain, and an image obtained after second front-end processing is in a YUV domain.

In a possible implementation of the first aspect, the front-end processing includes the first front-end processing and the second front-end processing.

The first front-end processing includes at least one of defect pixel correction, RAW domain noise reduction, black level correction, lens shading correction, and auto white balance.

The second front-end processing includes at least one of color interpolation, color correction, global tone mapping processing, and gamma correction.

In this implementation, an image that is obtained after the first front-end processing and the second front-end processing in the YUV domain undergoes correction and adjustment in comparison with the original image, and information in the image is more accurate. In this case, detection may be subsequently performed on the image in the YUV domain, and a corresponding more accurate detection result may be obtained. The detection result is the detection result corresponding to the to-be-photographed scene.

In a possible implementation of the first aspect, the processing the original image by using a first photographing algorithm, to obtain a corresponding captured image, when the quantity of times of waiting for photographing in the background is less than or equal to M includes:

when the quantity of times of waiting for photographing in the background is less than or equal to M, determining, based on the detection result, whether a to-be-photographed object in the to-be-photographed scene is static;

when the to-be-photographed object is static, determining whether illuminance in the to-be-photographed scene is greater than a first illuminance threshold; and when the illuminance in the to-be-photographed scene is less than or equal to the first illuminance threshold, determining a first night mode algorithm as the first photographing algorithm, and processing P frames of original images by using the first night mode algorithm, to obtain a corresponding captured image; or when the illuminance in the to-be-photographed scene is greater than the first illuminance threshold, determining whether a dynamic range in the to-be-photographed scene is greater than a first dynamic range threshold; and when the dynamic range in the to-be-photographed scene is less than or equal to the first dynamic range threshold, determining a first MFNR algorithm as the first photographing algorithm, and processing P frames of original images by using the first MFNR algorithm, to obtain a corresponding captured image; or when the dynamic range in the to-be-photographed scene is greater than the first dynamic range threshold, determining a first HDR algorithm as the first photographing algorithm, and processing P frames of original images by using the first HDR algorithm, to obtain a corresponding captured image, where P is an integer greater than 1.

In this implementation, in this application, determining that the quantity of times of waiting for photographing in the background is relatively small may also be referred to as determining that the electronic device is in a common photographing state. A plurality of types of detection are performed on the to-be-photographed scene. When it is determined based on the detection result whether the to-be-photographed object is static, the to-be-photographed scene may be further divided into a plurality of cases based on detected illuminance and detected dynamic ranges. Then, for various cases, different quantities of frames of original images are processed by using different algorithms. Therefore, a method for processing an original image can be refined, and quality and effect of a captured image obtained in each case can be improved adaptively.

In a possible implementation of the first aspect, the processing P frames of original images by using the first night mode algorithm, to obtain a corresponding captured image includes:

performing third front-end processing on the P frames of original images, to obtain P frames of first intermediate images;

processing the P frames of first intermediate images by using the first night mode algorithm, to obtain one frame of second intermediate image; and performing first back-end processing on the frame of second intermediate image, to obtain a corresponding captured image.

The third front-end processing is used to correct the P frames of original images. The first back-end processing is used to correct the second intermediate image.

Optionally, when a plurality of frames of original images are selected for processing, the plurality of frames of original images may include at least one of a long exposure original image, a normal exposure original image, and a short exposure original image.

Optionally, the electronic device may be provided with a night mode algorithm module. The electronic device may implement a processing process of the first night mode algorithm by using the night mode algorithm module.

In this implementation, when it is detected that the illuminance in the to-be-photographed scene is less than or equal to the first illuminance threshold, it indicates that ambient brightness in the to-be-photographed scene is relatively dark. In this case, if processing is performed by using a general photographing algorithm, an obtained captured image is unclear, and the user cannot clearly see details in the captured image. In this case, in this embodiment of this application, the first night mode algorithm may be selected to perform processing, to improve brightness of an image in a processing process. Therefore, more details can be presented in the obtained captured image.

In a possible implementation of the first aspect, the processing P frames of original images by using the first MFNR algorithm, to obtain a corresponding captured image includes:

performing fourth front-end processing on the P frames of original images, to obtain P frames of third intermediate images;

processing the P frames of third intermediate images by using the first MFNR algorithm, to obtain one frame of fourth intermediate image; and performing second back-end processing on the frame of fourth intermediate image, to obtain a corresponding captured image.

The fourth front-end processing is used to correct the P frames of original images. The second back-end processing is used to correct the fourth intermediate image.

In this implementation, when it is detected that the to-be-photographed object in the to-be-photographed scene is static, the illuminance is greater than the first illuminance threshold, and the dynamic range is less than or equal to the first dynamic range threshold, it indicates that ambient light in the to-be-photographed scene is relatively strong, and the dynamic range is relatively small. In this case, if processing is performed by using a general photographing algorithm, noise of the obtained captured image is relatively loud, and the dynamic range is relatively small. In this case, in this embodiment of this application, the first MFNR algorithm may be selected to perform processing, to reduce the noise of the captured image and improve the dynamic range of the captured image.

In a possible implementation of the first aspect, the processing P frames of original images by using the first HDR algorithm, to obtain a corresponding captured image includes:

performing fifth front-end processing on the P frames of original images, to obtain P frames of fifth intermediate images;

processing the P frames of fifth intermediate images by using the first HDR algorithm, to obtain one frame of sixth intermediate image; and performing third back-end processing on the frame of sixth intermediate image, to obtain a corresponding captured image.

The fifth front-end processing is used to correct the P frames of original images. The third back-end processing is used to correct the sixth intermediate image.

In this embodiment of this application, when the first HDR algorithm is selected to process a plurality of frames of original images, the plurality of frames of original images may separately correspond to different exposure values.

In this implementation, when it is detected that the dynamic range in the to-be-photographed scene is greater than the first dynamic range threshold, it indicates that intensity of ambient light in the to-be-photographed scene is relatively high. It may be considered that the to-be-photographed scene is a scene with a high dynamic range. In this case, if processing is performed by using a general photographing algorithm, an over-exposure problem may occur in the obtained captured image. In this case, in this embodiment of this application, the first HDR algorithm may be selected to perform processing, to adjust the dynamic range of the image and image details, so that content presented in the obtained captured image is more real, to improve image quality.

In a possible implementation of the first aspect, the method further includes:

when the to-be-photographed object is not static, determining whether a moving speed of the to-be-photographed object is greater than a preset speed threshold;

when the moving speed of the to-be-photographed object is greater than the preset speed threshold, determining whether illuminance in the to-be-photographed scene is greater than a second illuminance threshold; and when the illuminance in the to-be-photographed scene is less than or equal to the second illuminance threshold, determining a second night mode algorithm as the first photographing algorithm, and processing Q frames of original images by using the second night mode algorithm, to obtain a corresponding captured image; or when the illuminance in the to-be-photographed scene is greater than the second illuminance threshold, determining whether a dynamic range in the to-be-photographed scene is greater than a second dynamic range threshold; and when the dynamic range in the to-be-photographed scene is less than or equal to the second dynamic range threshold, determining a second MFNR algorithm as the first photographing algorithm, and processing Q frames of original images by using the second MFNR algorithm, to obtain a corresponding captured image; or when the dynamic range in the to-be-photographed scene is greater than the second dynamic range threshold, determining a second HDR algorithm as the first photographing algorithm, and processing Q frames of original images by using the second HDR algorithm, to obtain a corresponding captured image, where Q is an integer greater than or equal to 1, and Q<P.

In a possible implementation of the first aspect, the processing Q frames of original images by using the second night mode algorithm, to obtain a corresponding captured image includes:

performing sixth front-end processing on the Q frames of original images, to obtain Q frames of seventh intermediate images;

processing the Q frames of seventh intermediate images by using the second night mode algorithm, to obtain one frame of eighth intermediate image; and performing fourth back-end processing on the frame of eighth intermediate image, to obtain a corresponding captured image.

The sixth front-end processing is used to correct the Q frames of original images. The fourth back-end processing is used to correct the eighth intermediate image.

In this implementation, when it is detected that the to-be-photographed object in the to-be-photographed scene is greater than the preset speed threshold and the illuminance in the to-be-photographed scene is less than or equal to the second illuminance threshold, it indicates that in a dark environment, the to-be-photographed object is moving, and a moving amplitude is relatively large, which may be referred to as a fast moving state. In this case, processing is performed by using a general photographing algorithm, and problems of blurring or ghosting may occur in an obtained captured image. In this case, in this embodiment of this application, the second night mode algorithm may be selected to perform processing, to improve image clarity and ensure image quality.

In a possible implementation of the first aspect, the processing Q frames of original images by using the second MFNR algorithm, to obtain a corresponding captured image includes:

performing seventh front-end processing on the Q frames of original images, to obtain Q frames of ninth intermediate images;

processing the Q frames of ninth intermediate images by using the second MFNR algorithm, to obtain one frame of tenth intermediate image; and performing fifth back-end processing on the frame of tenth intermediate image, to obtain a corresponding captured image.

The seventh front-end processing is used to correct the Q frames of original images. The fifth back-end processing is used to correct the tenth intermediate image.

In this implementation, when the to-be-photographed object is dynamic, the moving speed is greater than the preset speed threshold, and the illuminance in the to-be-photographed scene is greater than the second illuminance threshold. However, the dynamic range is less than or equal to the second dynamic range threshold. It indicates that the moving amplitude of the to-be-photographed object is relatively large, and the to-be-photographed object is in a fast moving state in a bright scene with the relatively small dynamic range. In this case, if processing is performed by using a general photographing algorithm, noise of an obtained captured image is relatively large, and a dynamic range is relatively small. In this case, in this embodiment of this application, the second MFNR algorithm may be selected to perform processing, to reduce the noise of the captured image and improve the dynamic range of the captured image.

In a possible implementation of the first aspect, the processing Q frames of original images by using the second HDR algorithm, to obtain a corresponding captured image includes:

performing eighth front-end processing on the Q frames of original images, to obtain Q frames of eleventh intermediate images;

processing the Q frames of eleventh intermediate images by using the second HDR algorithm, to obtain one frame of twelfth intermediate image; and performing sixth back-end processing on the frame of twelfth intermediate image, to obtain a corresponding captured image.

The eighth front-end processing is used to correct the Q frames of original images. The sixth back-end processing is used to correct the twelfth intermediate image.

In this implementation, when the to-be-photographed object is dynamic, the moving speed is greater than the preset speed threshold, and the illuminance in the to-be-photographed scene is greater than the second illuminance threshold. The dynamic range is greater than the second dynamic range threshold. It indicates that the moving amplitude of the to-be-photographed object is relatively large, and the to-be-photographed object is in a fast moving state in a high dynamic range. In this case, if processing is performed by using a general photographing algorithm, an over-exposure problem may occur in an obtained captured image. In this case, in this embodiment of this application, the second HDR algorithm may be selected to perform processing, to adjust the dynamic range of the image and image details, so that content presented in the obtained captured image is more real, to improve image quality.

In a possible implementation of the first aspect, the method further includes:

when the moving speed of the to-be-photographed object is less than or equal to the preset speed threshold, determining a single-frame algorithm as the first photographing algorithm, and processing one frame of original image by using the single-frame algorithm, to obtain a corresponding captured image.

In this implementation, when it is detected that the to-be-photographed object in the to-be-photographed scene is dynamic, and the moving speed is less than or equal to the preset speed threshold, it indicates that the moving amplitude of the to-be-photographed object is relatively small, which may be referred to as a slow moving state. In this case, processing may be performed by using a general photographing algorithm. For example, the single-frame algorithm is used to perform processing.

In a possible implementation of the first aspect, the processing one frame of original image by using the single-frame algorithm, to obtain a corresponding captured image includes:

performing ninth front-end processing on the frame of original image, to obtain one frame of thirteenth intermediate image; and performing seventh back-end processing on the frame of thirteenth intermediate image, to obtain a corresponding captured image.

The ninth front-end processing is used to correct the frame of original image. The seventh back-end processing is used to correct the thirteenth intermediate image.

In a possible implementation of the first aspect, the processing the original image by using a second photographing algorithm, to obtain a corresponding captured image, when the quantity of times of waiting for photographing in the background is greater than M and less than or equal to N includes:

when the quantity of times of waiting for photographing in the background is greater than M and less than or equal to N, determining, based on the detection result, whether illuminance in the to-be-photographed scene is greater than a third illuminance threshold; and when the illuminance in the to-be-photographed scene is less than or equal to the third illuminance threshold, determining a third night mode algorithm as the second photographing algorithm, and processing R frames of original images by using the third night mode algorithm, to obtain a corresponding captured image; or when the illuminance in the to-be-photographed scene is greater than the third illuminance threshold, determining whether a dynamic range in the to-be-photographed scene is greater than a third dynamic range threshold; and when the dynamic range in the to-be-photographed scene is less than or equal to the third dynamic range threshold, determining a third MFNR algorithm as the second photographing algorithm, and processing R frames of original images by using the third MFNR algorithm, to obtain a corresponding captured image; or when the dynamic range in the to-be-photographed scene is greater than the third dynamic range threshold, determining a third HDR algorithm as the second photographing algorithm, and processing R frames of original images by using the third HDR algorithm, to obtain a corresponding captured image, where R is an integer greater than or equal to 1, and $R \leq Q < P$.

In this implementation, in this application, determining that the quantity of times of waiting for photographing in the background is relatively large may also be referred to as determining that the electronic device is in a continuous photographing state. The to-be-photographed scene is divided into a plurality of cases based on detected illuminance and detected dynamic ranges. Then, for various cases, relatively small quantities of frames of original images are processed by using different algorithms. Therefore, a method for processing an original image can be refined, and quality of an obtained captured image is ensured and processing efficiency is also improved. In addition, the quantity of times of waiting for photographing in the background is reduced, and effect and performance are both considered.

In a possible implementation of the first aspect, the processing R frames of original images by using the third night mode algorithm, to obtain a corresponding captured image includes:

performing tenth front-end processing on the R frames of original images, to obtain R frames of fourteenth intermediate images;

processing the R frames of fourteenth intermediate images by using the third night mode algorithm, to obtain one frame of fifteenth intermediate image; and performing eighth back-end processing on the frame of fifteenth intermediate image, to obtain a corresponding captured image.

The tenth front-end processing is used to correct the R frames of original images. The eighth back-end processing is used to correct the fifteenth intermediate image.

In this implementation, when it is detected that the quantity of times of waiting for photographing in the background is neither more nor less, and the illuminance in the to-be-photographed scene is less than or equal to the third illuminance threshold, it indicates that the user performs continuous photographing in a relatively dark environment. In this case, processing is performed by using a general photographing algorithm, and an obtained captured image is relatively fuzzy and details cannot be clearly seen. In this case, in this embodiment of this application, the third night mode algorithm with relatively small time consumption may be selected to perform processing. In this way, image clarity can be improved, and processing efficiency can also be improved, to reduce the quantity of times of waiting for photographing in the background and consider both effect and performance.

In a possible implementation of the first aspect, the processing R frames of original images by using the third MFNR algorithm, to obtain a corresponding captured image includes:

performing eleventh front-end processing on the R frames of original images, to obtain R frames of sixteenth intermediate images;

processing the R frames of sixteenth intermediate images by using the third MFNR algorithm, to obtain one frame of seventeenth intermediate image; and performing ninth back-end processing on the frame of seventeenth intermediate image, to obtain a corresponding captured image.

The eleventh front-end processing is used to correct the R frames of original images. The ninth back-end processing is used to correct the seventeenth intermediate image.

In this implementation, when it is detected that the quantity of times of waiting for photographing in the background is neither more nor less, the illuminance in the to-be-photographed scene is greater than the third illuminance threshold, and the dynamic range is less than or equal to the third dynamic range threshold, it indicates that the user performs continuous photographing in a bright environment with a relatively small dynamic range. In this case, processing is performed by using a general photographing algorithm, and an obtained captured image has relatively loud noise. In addition, a dynamic range is relatively small, and content is unreal. In this case, in this embodiment of this application, the third MFNR algorithm with relatively small time consumption may be selected to perform processing. In this way, noise is reduced and a dynamic range of a captured image is expanded, and processing efficiency can also be improved, to reduce the quantity of times of waiting for photographing in the background and consider both effect and performance.

In a possible implementation of the first aspect, the processing R frames of original images by using the third HDR algorithm, to obtain a corresponding captured image includes:

performing twelfth front-end processing on the R frames of original images, to obtain R frames of eighteenth intermediate images;

processing the R frames of eighteenth intermediate images by using the third HDR algorithm, to obtain one frame of nineteenth intermediate image; and performing tenth back-end processing on the frame of nineteenth intermediate image, to obtain a corresponding captured image.

The twelfth front-end processing is used to correct the R frames of original images. The tenth back-end processing is used to correct the nineteenth intermediate image.

In this implementation, when it is detected that the quantity of times of waiting for photographing in the background is neither more nor less, the illuminance in the to-be-photographed scene is greater than the third illuminance threshold, and the dynamic range is greater than the third dynamic range threshold, it indicates that the user performs continuous photographing in a bright environment with a high dynamic range. In this case, processing is performed by using a general photographing algorithm, and an over-exposure problem may occur in an obtained captured image. In this case, in this embodiment of this application, the third HDR algorithm with relatively small time consumption may be selected to perform processing, to adjust a dynamic range of an image and enhance image details, so that content presented in a captured image is more real. In addition, processing efficiency can be improved, the quantity of times of waiting for photographing in the background can be reduced, and effect and performance are both considered.

In a possible implementation of the first aspect, the processing the original image by using a third photographing algorithm, to obtain a corresponding captured image, when the quantity of times of waiting for photographing in the background is greater than N includes:

when the quantity of times of waiting for photographing in the background is greater than N, determining a single-frame algorithm as the third photographing algorithm, and processing one frame of original image by using the single-frame algorithm, to obtain a corresponding captured image.

In this implementation, in this application, determining that the quantity of times of waiting for photographing in the background is very large may also be referred to as determining that the electronic device is in a supper continuous photographing state. The smallest quantity of original images may be processed by using a single-frame algorithm with the simplest processing steps and the smallest time consumption, to maximumly improve processing efficiency and reduce the quantity of times of waiting for photographing in the background, thereby avoiding a frame loss problem.

In a possible implementation of the first aspect, the third front-end processing to the twelfth front-end processing each are at least one of defect pixel correction, RAW domain noise reduction, black level correction, lens shading correction, and auto white balance.

In this implementation, the third front-end processing to the twelfth front-end processing each may be the same as the first front-end processing.

In a possible implementation of the first aspect, the first back-end processing to the tenth back-end processing each include at least one of distortion correction, YUV domain noise reduction, brightness adjustment, color processing, and image scaling.

In this implementation, clarity of the captured image obtained after each of the first back-end processing to the tenth back-end processing is improved in comparison with the original image. Therefore, the captured image has better image quality.

According to a second aspect, an image processing apparatus is provided. The apparatus includes units configured to perform steps in the third aspect or any possible implementation of the third aspect.

According to a third aspect, an electronic device is provided, including a processor and a memory. The memory is configured to store a computer program that can run on a processor. The processor is configured to perform the image processing method provided in the first aspect or any possible implementation of the first aspect.

According to a fourth aspect, a chip is provided, including: a processor, configured to invoke a computer program from a memory and run the computer program, so that a device installed with the chip performs the image processing method provided in the first aspect or any possible implementation of the first aspect.

According to a fifth aspect, a computer-readable storage medium is provided. The computer-readable storage medium stores a computer program. The computer program includes program instructions. When the program instructions are executed by a processor, the processor is enabled to perform the image processing method provided in the first aspect or any possible implementation of the first aspect.

According to a sixth aspect, a computer program product is provided. The computer program product includes a computer-readable storage medium that stores a computer program. The computer program enables a computer to perform the image processing method provided in the first aspect or any possible implementation of the first aspect.

According to the image processing method and the related device thereof that are provided in embodiments of this application, in response to the first operation performed by the user on the first control, the electronic device captures the original image once by using the camera; and then determines the quantity of times of waiting for photographing in the background, and invokes different algorithms based on different quantities of times of waiting for photographing in the background to perform processing. For example, when the quantity of times of waiting for photographing in the background is relatively large, the third photographing algorithm with relatively small time consumption is invoked to perform processing; or when the quantity of times of waiting for photographing in the background is relatively small, the first photographing algorithm with relatively large time consumption is invoked to perform processing; or when the quantity of times of waiting for photographing in the background is neither more nor less, the second photographing algorithm with neither larger nor smaller time consumption is invoked to perform processing. Therefore, different algorithms are dynamically invoked to coordinate running durations of the photographing algorithms, to improve a photographing success rate and consider both effect and performance.

In addition, in response to the second operation performed by the user on the second control, the electronic device captures original images in a plurality of times by using the camera, and processes the original images by using the fourth photographing algorithm with a relatively short processing time, to improve processing efficiency and achieve "unlimited photographing". Therefore, a frame loss problem does not occur in photographing in any case.

BRIEF DESCRIPTION OF DRAWINGS

FIG. 6 shows a table according to an embodiment of this application;

DESCRIPTION OF EMBODIMENTS

Figure 1:
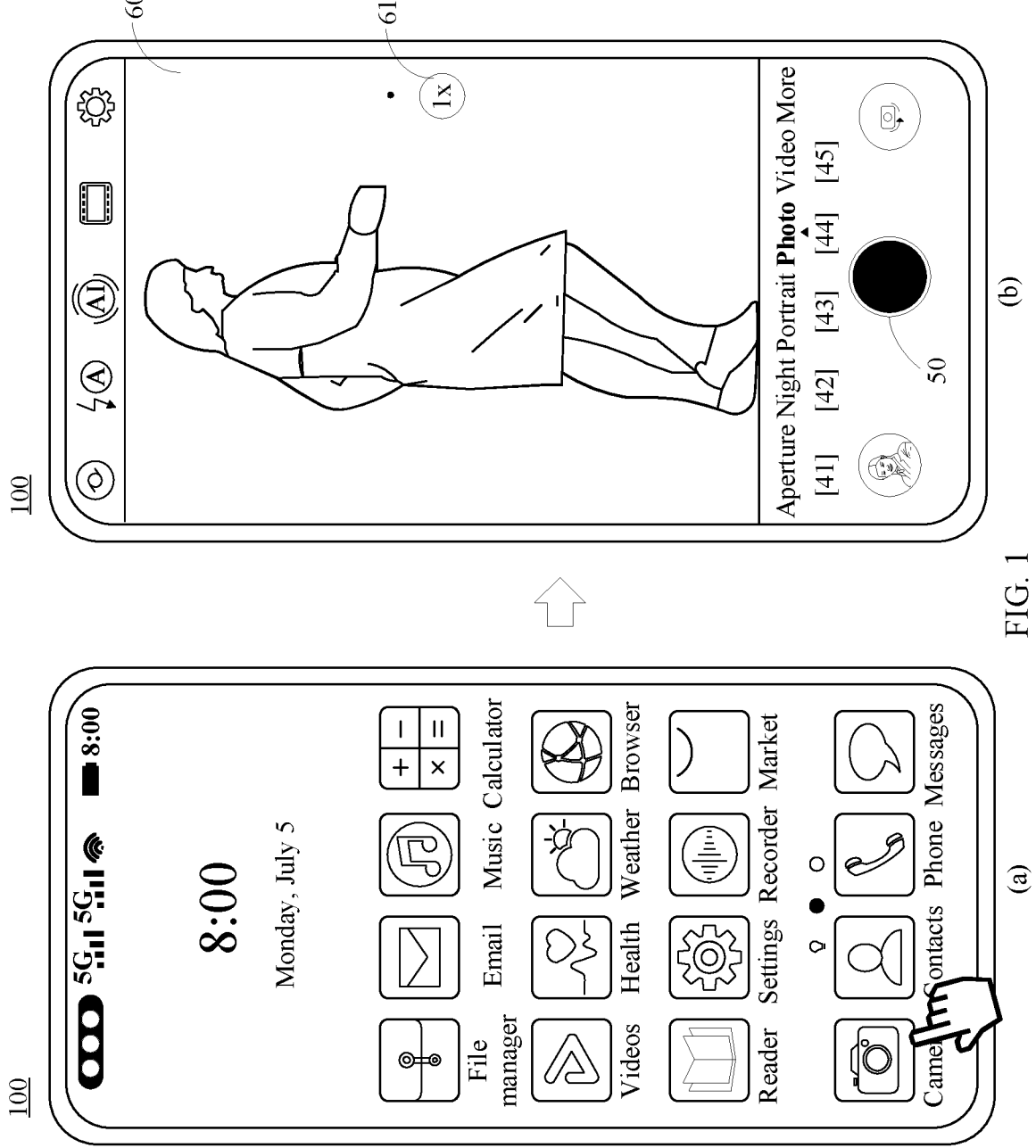
FIG. 1 is a diagram of display interfaces according to an embodiment of this application.

The following describes technical solutions of this application with reference to the accompanying drawings.

In descriptions in embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions in embodiments of this application, "a plurality of" means two or more.

In the following description, the terms "first" and "second" are merely intended for a purpose of description, and shall not be interpreted as indicating or implying relative importance or implying a quantity of indicated technical features. Therefore, features defining "first" and "second" may explicitly or implicitly include one or more such features.

Some terms in embodiments of this application are first described for ease of understanding by a person skilled in the art.

1. An RGB (red, green, blue) color space means a color model related to a structure of a human visual system. According to a structure of human eyes, all colors are considered as different combinations of red, green, and blue.

2. A YUV color space means a color encoding method, where Y represents brightness, and U and V represent chroma. The foregoing RGB color space focuses on sensing of human eyes to colors, while the YUV color space focuses on sensitivity of vision to brightness. The RGB color space and the YUV color space may be converted into each other.

3. A pixel value means a set of color components corresponding to each pixel in a color image in the RGB color space. For example, each pixel corresponds to one set of three-primary-color components, where the three-primary-color components are respectively a red component R, a green component G, and a blue component B.

4. Bayer pattern (bayer pattern) color filter array (color filter array, CFA): When an image is converted from an actual scene to image data, generally, an image sensor receives information of three channel signals: a red channel signal, a green channel signal, and a blue channel signal respectively, and then synthesizes the information of the three channel signals into a color image. However, in this solution, three filters are required correspondingly at a position of each pixel, which is expensive and difficult to manufacture. Therefore, a surface of the image sensor may be covered with a color filter array to obtain the information of the three channel signals. The Bayer pattern color filter array means an arrangement of filters in a chessboard format. For example, a minimum repeating unit in the Bayer pattern color filter array is as follows: A filter for obtaining a red channel signal, two filters for obtaining green channel signals, and a filter for obtaining a blue channel signal are arranged in a 2×2 manner.

5. A Bayer image (bayer image) is an image output by the image sensor based on the Bayer pattern color filter array. Pixels of various colors in the image are arranged in a Bayer pattern. Each pixel in the Bayer image corresponds to a channel signal of only one color. For example, because human vision is sensitive to green, a green pixel (a pixel corresponding to a green channel signal) may be set to account for 50% of all pixels, and a blue pixel (a pixel corresponding to a blue channel signal) and a red pixel (a pixel corresponding to a red channel signal) each may be set to account for 25% of all the pixels. A minimum repeating unit in the Bayer image is as follows: One red pixel, two green pixels, and one blue pixel are arranged in a 2×2 manner. The Bayer image is an image in a RAW domain.

6. Photographing parameter

The photographing parameter may include a shutter, an exposure time, an aperture value (aperture value, AV), an exposure value (exposure value, EV), and photosensibility ISO. Descriptions are separately provided below.

The shutter is an apparatus that controls a time of light entering a camera to determine an exposure time of an image. A longer time for which the shutter is on indicates more light that enters the camera and a longer exposure time corresponding to the image. On the contrary, a shorter time for which the shutter is on indicates less light that enters the camera and a shorter exposure time corresponding to the image.

The exposure time means a time for which the shutter needs to be on to project the light onto a photosensitive surface of a photosensitive material of the camera. The exposure time is determined based on photosensibility of the photosensitive material and illuminance on the photosensitive surface. A longer exposure time indicates more light that enters the camera, and a shorter exposure time indicates less light that enters the camera. Therefore, a longer exposure time is needed in a dark scene, and a shorter exposure time is needed in a backlight scene.

The aperture value (f value) is a ratio of a focal length of a lens (lens) in the camera to a light passing diameter of the lens. A larger aperture value indicates more light that enters the camera. A smaller aperture value indicates less light that enters the camera.

The exposure value is a value that is obtained by combining the exposure time and the aperture value and that represents a light passing capability of the lens of the camera. The exposure value may be defined as:

$$EV = \log_2 \frac{N^2}{t}.$$

Herein, N is the aperture value, t is the exposure time, and a unit is a second.

The ISO is used to measure sensitivity of a negative film to light, namely, photosensibility or a gain. An insensitive negative film needs a longer exposure time to achieve an image with same luminance as a sensitive negative film. A sensitive negative film needs a shorter exposure time to achieve an image with same luminance as an insensitive negative film.

For the shutter, the exposure time, the aperture value, the exposure value, and the ISO among the photographing parameters, an electronic device can implement at least one of auto focus (auto focus, AF), automatic exposure (automatic exposure, AE), and auto white balance (auto white balance, AWB) through an algorithm, to achieve automatic adjustment of these photographing parameters.

The auto focus means that the electronic device obtains the highest image frequency component by adjusting a position of a focusing lens, to obtain a higher image contrast. Focus is a continuous accumulation process. The electronic device compares contrasts of images captured by the lens in different positions to obtain a lens position with the highest image contrast, and further determines a focal length of focus.

The automatic exposure means that the electronic device automatically sets an exposure value according to an available light source condition. The electronic device can automatically set a shutter speed and the aperture value based on an exposure value of a currently captured image, to automatically set the exposure value.

A color of an object changes according to a color of casted light. Images captured by the electronic device in cases of different light colors have different color temperatures. The white balance is closely related to ambient light. Regardless of the ambient light, the camera of the electronic device can recognize white, and restore other colors based on white. The auto white balance enables the electronic device to adjust fidelity of colors in an image according to a light source condition. 3A is the auto focus, automatic exposure, and auto white balance.

For example, the exposure value may be any one of −24, −4, −3, −2, −1, 0, 1, 2, 3, 4, and 24.

An exposure image corresponding to EV0 represents an exposure image captured by using the determined exposure value 0 when the electronic device implements exposure by using an algorithm. An exposure image corresponding to EV−2 represents an exposure image captured by using the determined exposure value −2 when the electronic device implements exposure by using the algorithm. An exposure image corresponding to EV1 represents an exposure image captured by using the determined exposure value 1 when the electronic device implements exposure by using the algorithm. The rest can be deduced by analogy, and details are not described herein.

Each time the exposure value is increased by 1, one stop of exposure is changed. In other words, an exposure quantity (that is, an integral of illuminance received by a surface element of an object surface in a time t) is doubled, for example, an exposure time or an aperture area is doubled. In this case, the increase of the exposure value corresponds to a slower shutter speed and a smaller value of f. It can be learned that the exposure value of EV0 is increased by 2 in comparison with EV−2, and two stops of exposure are changed. Similarly, the exposure value of EV1 is increased by 1 in comparison with EV0, and one stop of exposure is changed.

Herein, when the exposure value EV is equal to 0, the exposure value is usually an optimal exposure value under a current illumination condition. Correspondingly, an exposure image correspondingly obtained by the electronic device under the condition of EV0 is an optimal exposure image under the current illumination condition. The optimal exposure image may also be referred to as a reference exposure image.

It should be understood that the "optimal" exposure image means an exposure image determined by a given electronic device by using an algorithm, and varies with the electronic device, the algorithm, or the current illumination condition.

The foregoing briefly describes the nouns involved in embodiments of this application. Details are not described below.

With popularization of electronic devices with a photographing function in life, taking images by people by using the electronic devices becomes a daily behavior.

Nowadays, people have increasingly high requirements for photographing performed by using the electronic devices. Original images taken by using only cameras on the electronic devices cannot meet requirements of people.

Different original images need to be processed by using different photographing algorithms, to obtain images that meet different requirements of users. The original image means an image output by an image sensor in a camera.

Currently, during photographing processing, most electronic devices determine photographing algorithms based on camera parameters, to process and generate captured images based on the determined photographing algorithms. The captured image is an image used for display or storage. Usually, when a photographing algorithm is determined, the used camera parameters include brightness, a dynamic range, a focal length, an object distance, and the like. However, in the prior art, a photographing algorithm determined based on the foregoing parameters usually runs for a relatively long time, or runs for a relatively short time but has poor photographing effect. In this case, effect and performance cannot be both considered.

In addition, when the electronic device performs photographing processing by using the photographing algorithm, the electronic device can perform a current time of photographing processing only after a previous time of photographing processing ends. Based on the processing process, if the user triggers a plurality of photographing commands in a relatively short time, a quantity of times of waiting for photographing processing in a background on the electronic device increases due to a relatively long time of performing each time of photographing processing by using the photographing algorithm. Further, when a memory is full, related data of waiting for photographing processing may be lost. In other words, a frame loss problem may occur. In this way, a quantity of frames of actually obtained captured images is less than a quantity of frames that the user expects to obtain through photographing. This is equivalent to a case in which the electronic device does not have a function of implementing continuous photographing.

In view of this, an embodiment of this application provides an image processing method. In response to a first operation performed by a user on a first control, an electronic device captures an original image once by using a camera; and then determines a quantity of times of waiting for photographing in a background, and invokes different photographing algorithms based on different quantities of times of waiting for photographing in the background to perform processing. For example, when the quantity of times of waiting for photographing in the background is relatively large, a photographing algorithm with relatively small time consumption is invoked to perform processing; or when the quantity of times of waiting for photographing in the background is relatively large, a photographing algorithm with relatively large time consumption is invoked to perform processing. Therefore, different algorithms are dynamically invoked to coordinate running durations of the photographing algorithms, to improve a photographing success rate and consider both effect and performance.

The image processing method provided in this embodiment of this application may be applied to various electronic devices.

In some embodiments of this application, the electronic device may be various photographing apparatuses such as a motion camera and a digital camera, a mobile phone, a tablet computer, a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, a personal digital assistant (personal digital assistant, PDA), or another device or apparatus that can perform image display. A specific type of the electronic device is not limited in this embodiment of this application.

The following uses an example in which the electronic device is a mobile phone for description. The mobile phone includes a display and one or more cameras. In a to-be-photographed scene, the mobile phone may perform photographing by using the one or more cameras, to obtain captured images with different features. The display is configured to display the captured images obtained through photographing.

The to-be-photographed scene is a scene that the user expects to photograph. If the user uses the camera of the electronic device to be aligned with a scene that includes a specific object, the scene that includes the object is a to-be-photographed scene. It should be understood that the to-be-photographed scene does not specifically indicate a specific scene, but indicates a scene aligned with the camera in real time.

FIG. 1 is a diagram of interfaces of an electronic device according to an embodiment of this application.

As shown in (a) in FIG. 1, a camera application is installed on the electronic device 100. In addition, a plurality of applications are also installed. This is not limited in this embodiment of this application. For example, when the electronic device 100 runs the camera application, in response to a touch operation of a user, the electronic device 100 displays a photographing interface shown in (b) in FIG. 1.

The photographing interface includes a plurality of photographing modes of the camera application, for example, a large aperture mode 41, a night mode 42, a portrait mode 43, a photo mode 44, and a video mode 45. The photographing interface further includes a first control. The first control is a photographing key 50. The photographing key 50 is used to indicate a current photographing mode. For example, when a camera is enabled by default, the photographing key 50 indicates that the current photographing mode is the photo mode 44.

As shown in (b) in FIG. 1, the photographing interface further includes a viewfinder window 60. The viewfinder window 60 may be used to display in real time a preview image before photographing or video recording. A second control is further displayed in the photographing interface. The second control is a zoom option 61. The user may select a currently needed zoom ratio through the zoom option 61, for example, a zoom ratio of 0.5 times, 2 times, or 50 times.

With reference to (a) and (b) in FIG. 1, when the user enables the camera, and the current photographing mode is the photo mode by default, after the user aligns the camera on the mobile phone with a to-be-photographed scene, the viewfinder window 60 may display in real time a preview image before photographing. In response to a touch operation performed by the user on the photographing key 50, the electronic device may invoke the image processing method provided in this application, and perform processing by using different photographing algorithms according to different cases, to shorten a running duration of a photographing algorithm, improve a photographing success rate, and consider both effect and performance.

Figure 2:
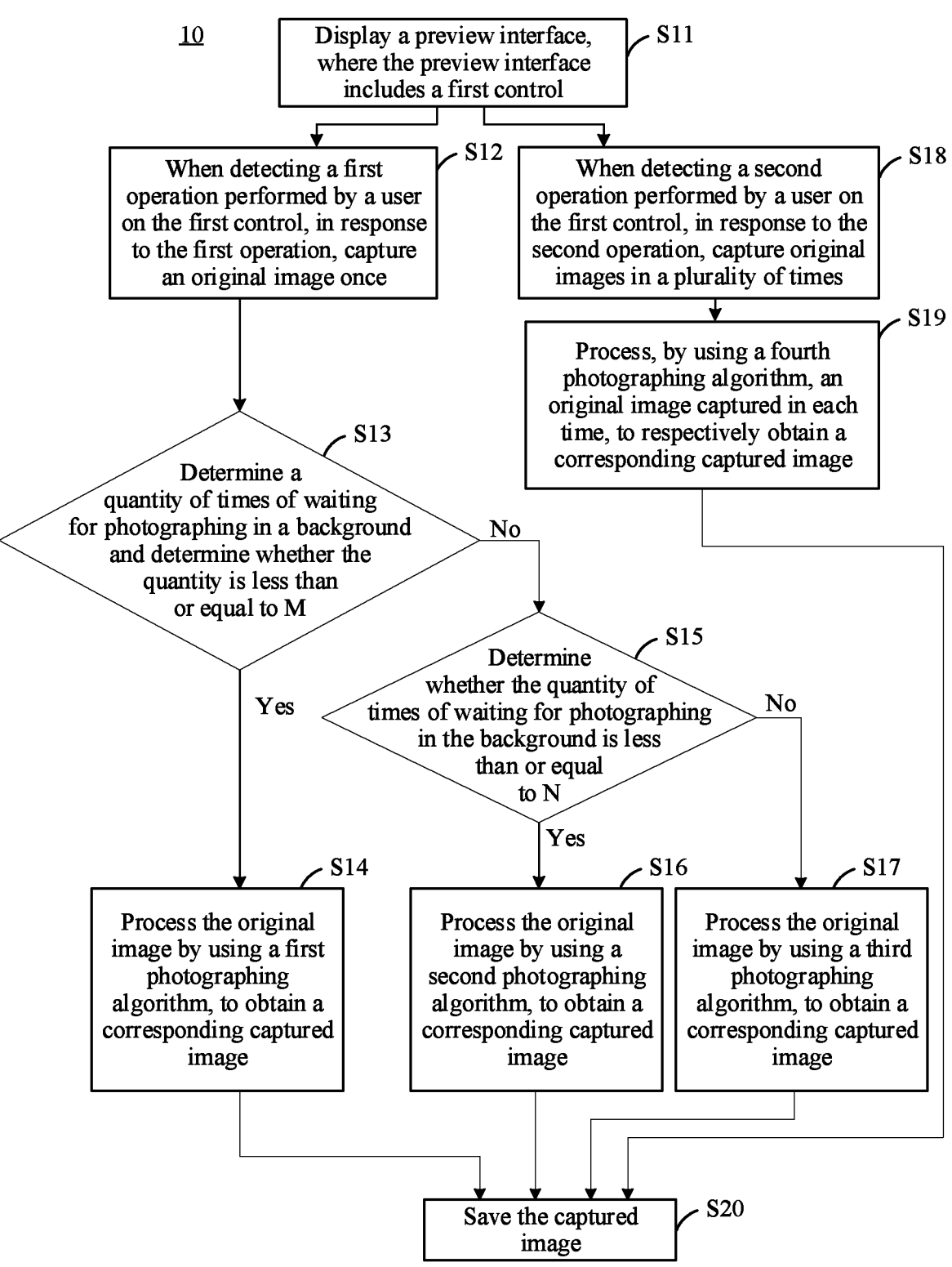
FIG. 2 is a schematic flowchart of an image processing method according to an embodiment of this application.

On this basis, FIG. 2 is a schematic flowchart of an image processing method according to an embodiment of this application.

As shown in FIG. 2, the method 10 is applied to an electronic device that includes a display and a camera. The method 10 may include the following steps S11 to S20.

S11: The electronic device displays a first interface. The first interface includes a preview image and a first control. The first control indicates a photo mode.

For example, as shown in (b) in FIG. 1, the electronic device displays a preview interface, a first control included in the preview interface is the photographing key 50, and the photographing key 50 indicates that the current photographing mode is the photo mode. To be specific, a user may perform photographing by using the photo mode.

S12: When detecting a first operation performed by the user on the first control, in response to the first operation, the electronic device captures an original image once by using the camera.

Optionally, the first operation is a tap operation on the first control. The first operation may alternatively include a voice instruction operation or another operation that instructs the electronic device to perform photographing. This is not limited in this embodiment of this application.

Figure 3:
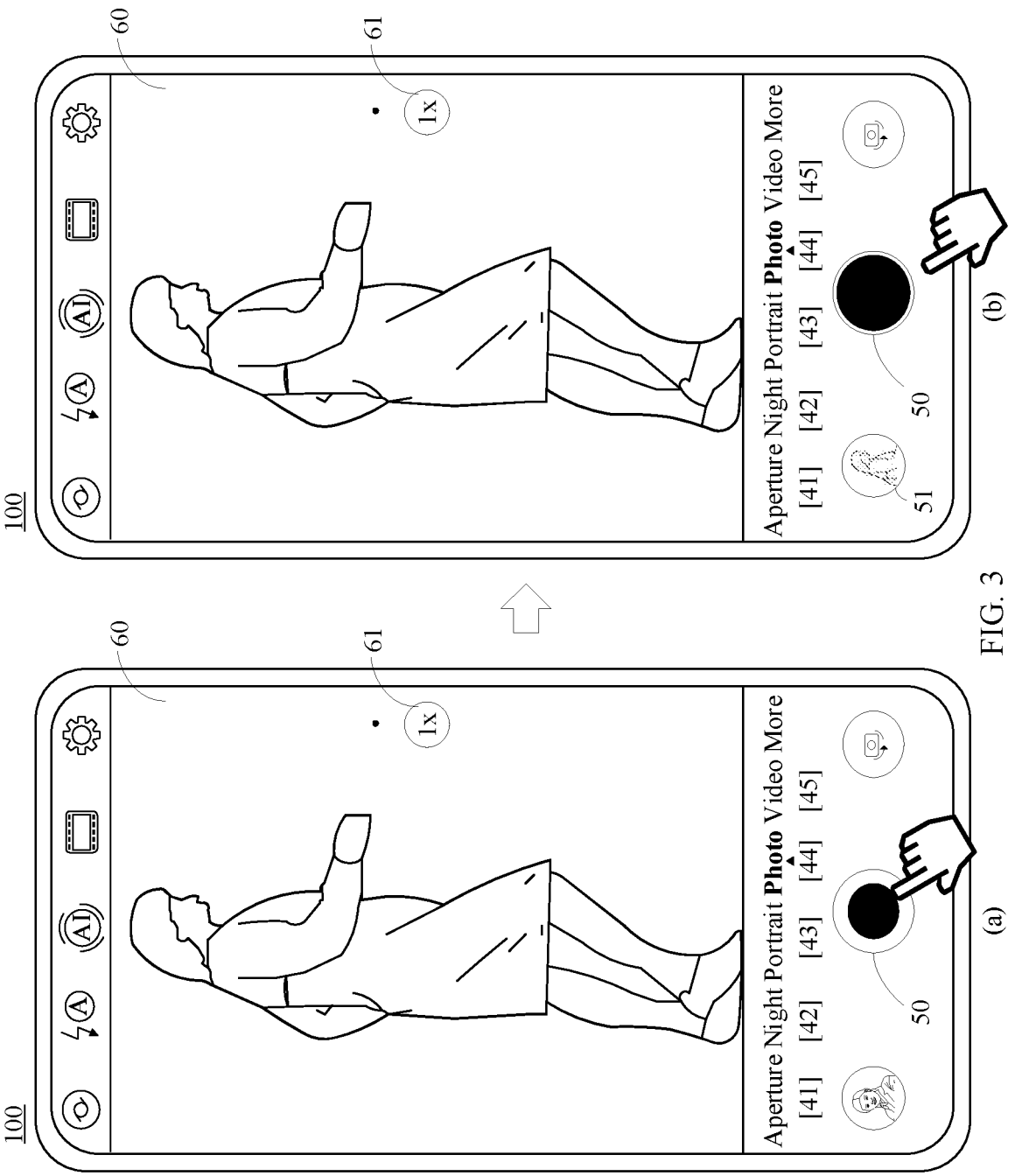
FIG. 3 is a diagram of interfaces of a tap operation according to an embodiment of this application.

The tap operation is a behavior that the user touches the photographing key 50 for a relatively short time and then leaves. FIG. 3 is a diagram of interfaces of a tap operation. As shown in (a) and (b) in FIG. 3, that a finger presses the photographing key 50 and then is lifted is denoted as one tap operation. A time between a time point at which the finger presses the photographing key 50 and a time point at which the finger is lifted away from the photographing key 50 is a duration of the tap operation. Usually, the duration is very short.

For example, when the camera is enabled, the photographing key 50 indicates that the current photographing mode is the photo mode 44. When the user performs one tap operation on the photographing key 50, in response to the tap operation, the electronic device captures the original image once by using the camera.

When the user performs a plurality of tap operations on the photographing key 50, in response to the plurality of tap operations, the electronic device may capture original images in a plurality of times by using the camera. It should be understood that, when the user performs the plurality of tap operations on the photographing key 50, a first tap operation corresponds to a first time of photographing, and a current accumulated quantity of photographing times is 1; and a second tap operation corresponds to a second time of photographing, and the current accumulated quantity of photographing times is 2. By analogy, a tenth tap operation corresponds to a tenth time of photographing, and the current accumulated quantity of photographing times is 10. A most recent tap operation corresponds to a most recent time of photographing.

It should be noted herein that when the camera is enabled again after being disabled, the current accumulated quantity of photographing times needs to be accumulated again from 0. Alternatively, when a time interval between two consecutive tap operations exceeds a first preset time interval, and there is no data to be processed in the background, the current accumulated quantity of photographing times also needs to be accumulated again from 0. The first preset time interval is at least greater than a processing time during one time of photographing. A specific duration of the first preset time interval may be set and modified as required. This is not limited in this embodiment of this application.

Example 1: After the user enables the camera for the first time and performs the first tap operation on the photographing key 50, in response to the tap operation, the electronic device captures the original image once by using the camera, and the current accumulated quantity of photographing times is 1. Then, the user disables the camera. If the user enables the camera again and performs a tap operation on the photographing key 50, in response to the tap operation, the electronic device captures an original image once by using the camera. In this case, because the camera is restarted, the current accumulated quantity of photographing times needs to be recorded as 1 again.

Figure 4:
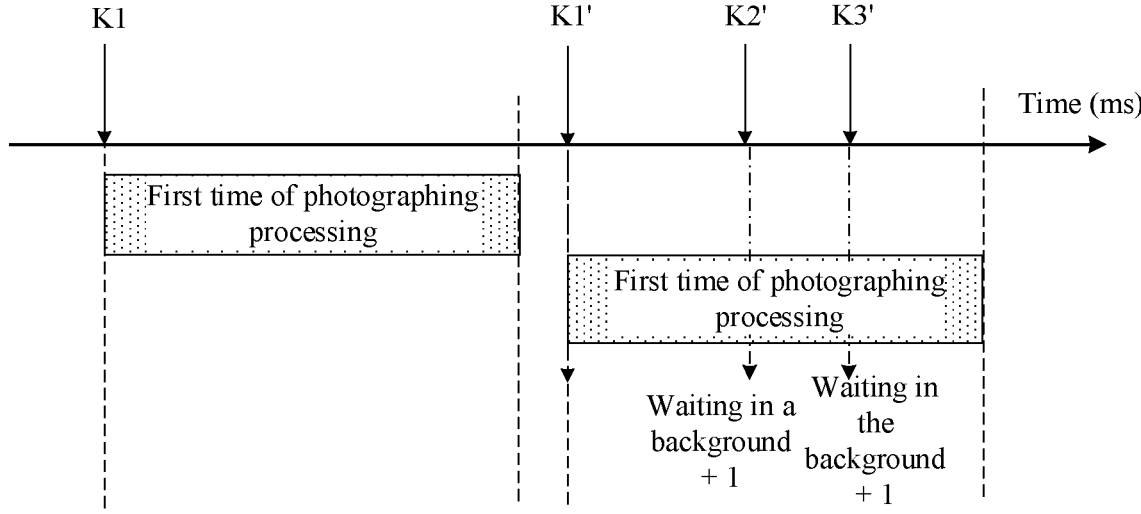
FIG. 4 is a diagram of an image processing progress according to an embodiment of this application.

Example 2: FIG. 4 is a diagram of an image processing progress.

As shown in FIG. 4, when the user enables the camera and performs a first tap operation K1 on the photographing key 50, in response to the tap operation K1, the electronic device captures an original image once by using the camera, and a current accumulated quantity of photographing times is 1.

However, only after a relatively long period of time, the user performs a next tap operation K1' on the photographing key 50. In response to the tap operation K1', the electronic device captures an original image again by using the camera. Because a time interval between the tap operation K1 and the tap operation K1' exceeds the first preset time interval, and there is no data to be processed in the background, the current accumulated quantity of photographing times needs to be accumulated again from 0. In other words, the current accumulated quantity of photographing times is recorded as 1 again. When the user subsequently performs a tap operation K2' on the photographing key, in response to the tap operation K2', the electronic device captures an original image again by using the camera. Because a time interval between the tap operation K2' and the tap operation K1' is less than the first preset time interval, the current accumulated quantity of photographing times may be recorded as 2. When the user subsequently performs a tap operation K3' on the photographing key, in response to the tap operation K3', the electronic device captures an original image again by using the camera. Because a time interval between the tap operation K3' and the tap operation K2' is less than the first preset time interval, the current accumulated quantity of photographing times may be recorded as 3. By analogy, there are other cases. Details are not described herein.

It should be noted that, if the time interval between two consecutive tap operations exceeds the first preset time interval, and there is data to be processed in the background, it indicates that the user performs many tap operations before, and there is some data that is not processed in time because tapping frequency is very high and processing in the background is relatively slow. Therefore, the current accumulated quantity of photographing times cannot be accumulated again from 0, and an original recorded quantity should be maintained.

When the electronic device includes a plurality of cameras, in response to one tap operation, one or more cameras may be used to capture an original image, and each camera may capture one or more frames of original images. In other words, the one or more frames of original images may be captured each time. A specific quantity of frames may be captured as required. This is not limited in this embodiment of this application.

It should be further understood that the original image may be an image in a RAW domain. However, when the camera is a black-and-white camera, the original image may be a gray-scale image. When the camera is a multi-spectral camera, the original image may be a multi-spectral image that includes a plurality of color channel signals. This is not limited in this embodiment of this application.

S13: Determine a quantity of times of waiting for photographing in the background.

The quantity of times of waiting for photographing in the background is equal to a difference obtained through subtracting a quantity of times of processed photographing and a quantity of times of photographing being processed from the current accumulated quantity of photographing times.

It should be understood that, in response to one tap operation, the electronic device needs to invoke the camera to capture an original image once, process the original image by using a related photographing algorithm, and then generate a corresponding captured image for storage or display. A duration for processing performed by the electronic device in response to one tap operation is one photographing processing duration or is referred to as a photographing processing time. Because the photographing processing duration is far greater than a duration of the tap operation, when the user performs a plurality of tap operations on the photographing key in a relatively short time period and triggers a plurality of times of processing, single-thread processing is performed in the background and cannot be completed in time, thereby causing data congestion. In this case, the electronic device can only store a part of data first. After an ongoing photographing progress in the background ends, the electronic device invokes the stored data, processes the stored data one by one, and then generates a corresponding captured image.

In this process, if there is an ongoing photographing progress in the background, the quantity of times of photographing being processed is recorded as 1. If there is no ongoing photographing progress in the background, the quantity of times of photographing being processed may be recorded as 0. In addition, in a process in which the current accumulated quantity of photographing times is accumulated from 0 to the present, a quantity of completed photographing progresses is the quantity of times of processed photographing.

For example, if the current accumulated quantity of photographing times is 1, the quantity of times of waiting for photographing in the background is 0. If the current accumulated quantity of photographing times is 2, the quantity of times of photographing being processed is 1, and the quantity of times of processed photographing is 0, it may be determined that the quantity of times of waiting for photographing in the background is 1. If the current accumulated quantity of photographing times is 10, the quantity of times of photographing being processed is 1, and the quantity of times of processed photographing is 5, it may be determined that the quantity of times of waiting for photographing in the background is 4. The foregoing is merely several examples. Another process of determining the quantity of times of waiting for photographing in the background is similar to the foregoing. Details are not described herein.

It should be further noted that, if the current accumulated quantity of photographing times is counted again from 0, the quantity of times of processed photographing also needs to be counted again from 0.

S14: Process the original image by using a first photographing algorithm, to obtain a corresponding captured image, when the quantity of times of waiting for photographing in the background is less than or equal to M.

It should be understood that the original image is the original image that is captured by the electronic device by using the camera in response to the latest first operation, that is, a correspondingly captured original image in the current accumulated quantity of photographing times. The original image includes one or more frames of images. When the original image includes a plurality of frames of images, the plurality of frames of images may be captured by one camera or separately captured by a plurality of cameras. This is not limited in this embodiment of this application.

S15: Determine whether the quantity of times of waiting for photographing in the background is less than or equal to N, where M<N, and M and N are both positive integers.

S16: When the quantity of times of waiting for photographing in the background is greater than M and less than or equal to N, process the original image by using a second photographing algorithm, to obtain a corresponding captured image. A processing time of the second photographing algorithm is less than a processing time of the first photographing algorithm.

The processing time of the first photographing algorithm is a duration of processing the original image by using the first photographing algorithm. The processing time of the second photographing algorithm is a duration of processing the original image by using the second photographing algorithm. A memory corresponding to the second photographing algorithm is less than a memory corresponding to the first photographing algorithm.

S17: Process the original image by using a third photographing algorithm, to obtain a corresponding captured image, when the quantity of times of waiting for photographing in the background is greater than N. A processing time of the third photographing algorithm is less than the processing time of the second photographing algorithm.

The processing time of the third photographing algorithm is a duration of processing the original image by using the third photographing algorithm. A memory corresponding to the third photographing algorithm is less than the memory corresponding to the second photographing algorithm.

When the quantity of times of waiting for photographing in the background is relatively small, it indicates that frequency of performing the tap operation by the user is not very high, and processing performed by the electronic device is relatively timely. In this case, an algorithm with relatively large time consumption may be used to process the original image, to ensure better quality of the obtained captured image. When the quantity of times of waiting for photographing in the background is relatively large, it indicates that frequency of performing the tap operation by the user is very high, and the electronic device cannot process much data in time. In this case, an algorithm with relatively small time consumption may be used to process the original image, to improve processing efficiency and ensure that data related to the quantity of times of waiting for photographing in the background can be processed in time, thereby avoiding waiting and avoiding a frame loss problem.

It should be understood that it may be usually considered that the algorithm with relatively large processing time consumption includes more processing steps, or is used to process a relatively large quantity of frames of original images, and is used to obtain better quality of an obtained captured image.

For example, the quantity of times of waiting for photographing in the background may be divided into two cases. When the quantity of times of waiting for photographing in the background is relatively small, processing may be performed by using the first photographing algorithm with relatively large time consumption. When the quantity of times of waiting for photographing in the background is relatively large, processing may be performed by using the second photographing algorithm with relatively small time consumption.

For example, as described above, the quantity of times of waiting for photographing in the background may be divided into three cases. When the quantity of times of waiting for photographing in the background is relatively small, processing may be performed by using the first photographing algorithm with relatively largest time consumption. When the quantity of times of waiting for photographing in the background is relatively large, processing may be performed by using the third photographing algorithm with relatively smallest time consumption. When the quantity of times of waiting for photographing in the background is neither more nor less, processing is performed by using the second photographing algorithm with neither larger nor smaller time consumption.

It should be understood that the foregoing is merely division examples of the quantity of times of waiting for photographing in the background. The quantity of times of waiting for photographing in the background may be alternatively divided into four, five, or more cases. When the quantity of times of waiting for photographing in the background becomes more, processing is performed by using a photographing algorithm with smaller time consumption. A specific division manner and a specific photographing algorithm may need to be set and modified. This is not limited in this embodiment of this application.

S18: When detecting a second operation performed by the user on the first control, in response to the second operation, the electronic device captures original images in a plurality of times by using the camera.

Optionally, the second operation is a long press operation on the first control. The second operation may alternatively include a voice instruction operation or another operation that instructs the electronic device to continuously perform photographing for a plurality of times. This is not limited in this embodiment of this application.

The long press operation indicates a behavior that the user touches the photographing key for a relatively long time. A time between pressing down of a finger and lifting up of the finger is a duration of one long press operation. The duration of the long press operation is greater than the duration of the tap operation. Different electronic devices may set different durations of the tap operation and different durations of the long press operation. However, the setting needs to meet a condition in which the duration of the long press operation is relatively greater than the duration of the tap operation.

Figure 5A:
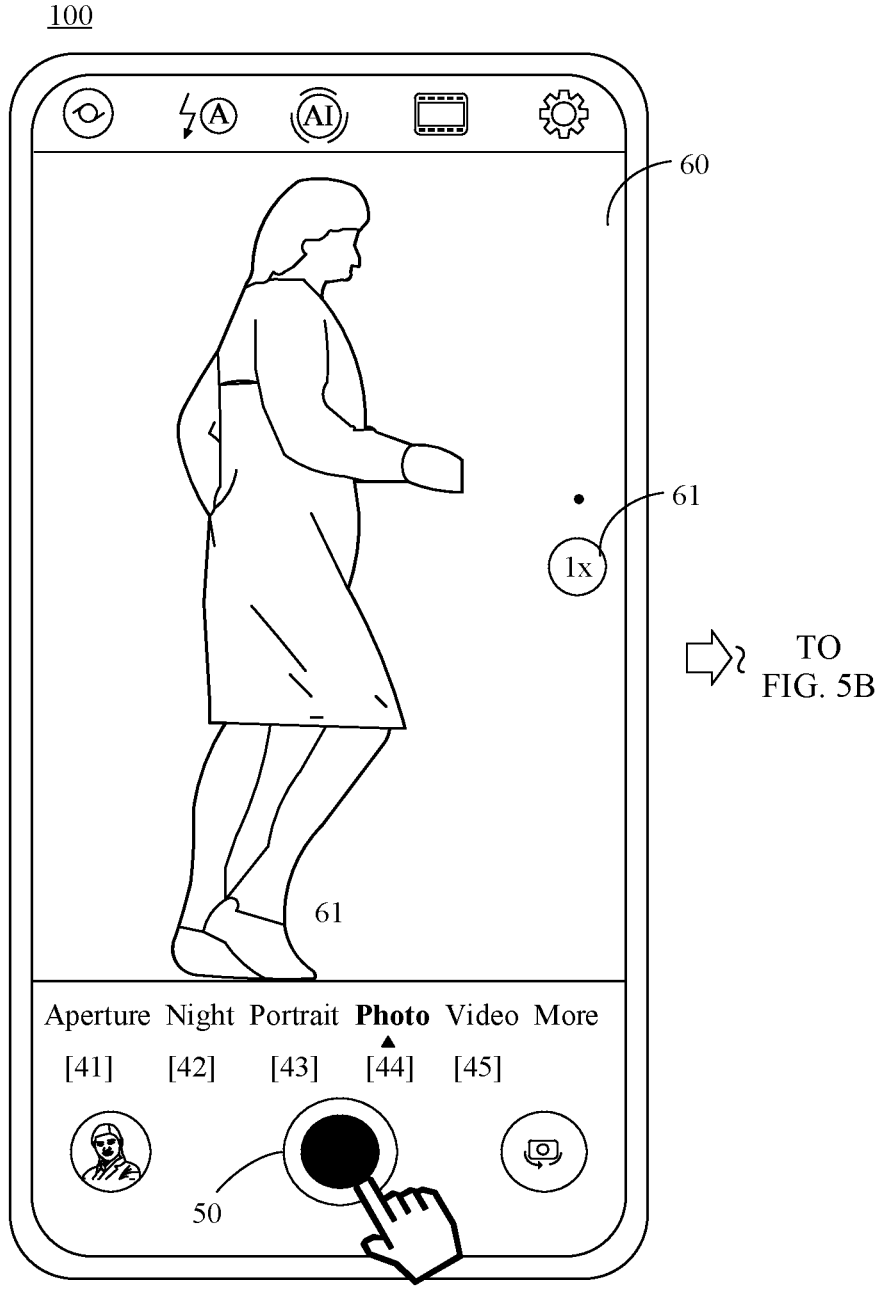
FIG. 5A, FIG. 5B, FIG. 5C, and FIG. 5D are diagrams of interfaces of a long press operation according to an embodiment of this application.
Figures 5A, 5B, 5C:
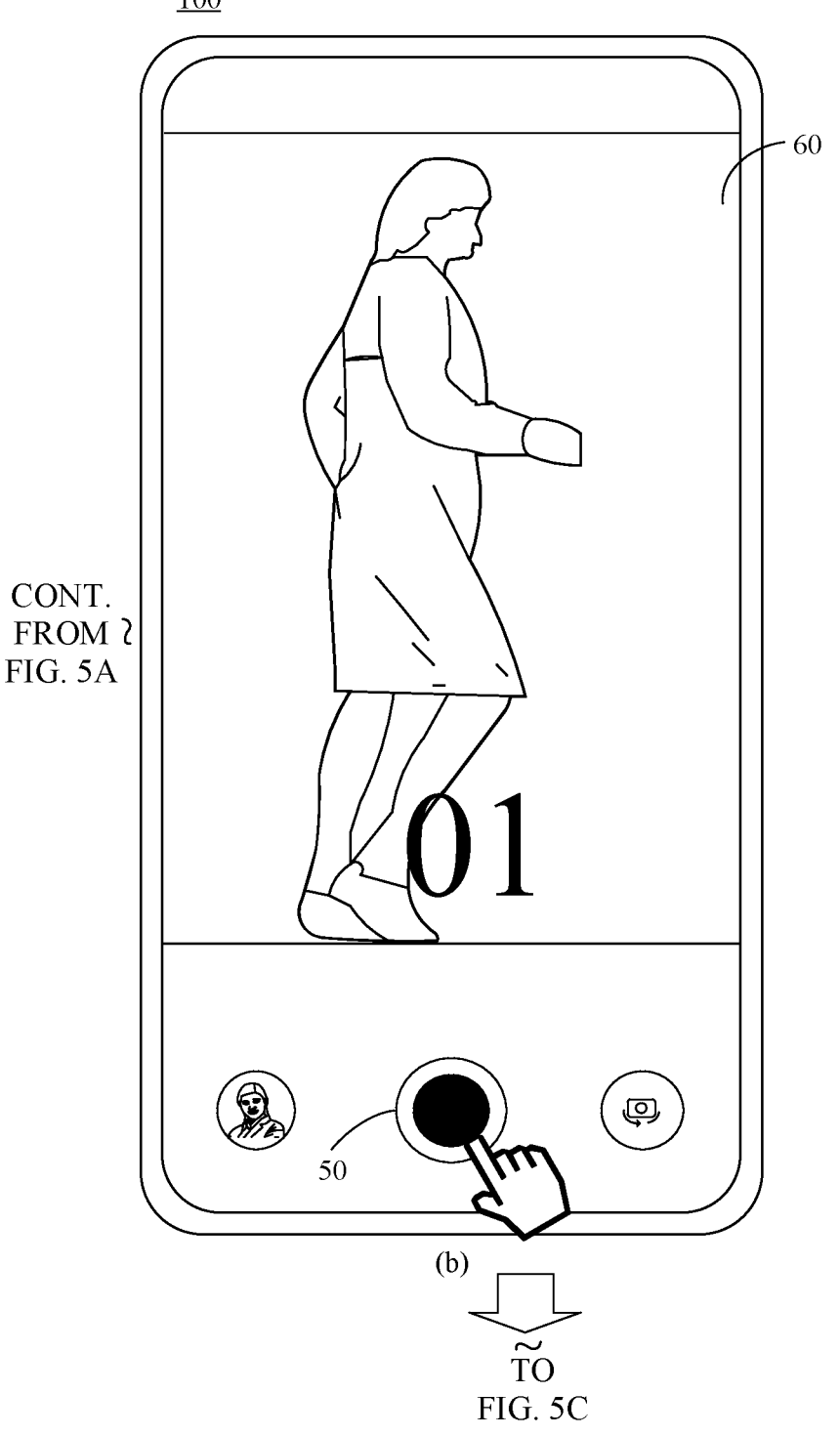
Figure 5C:
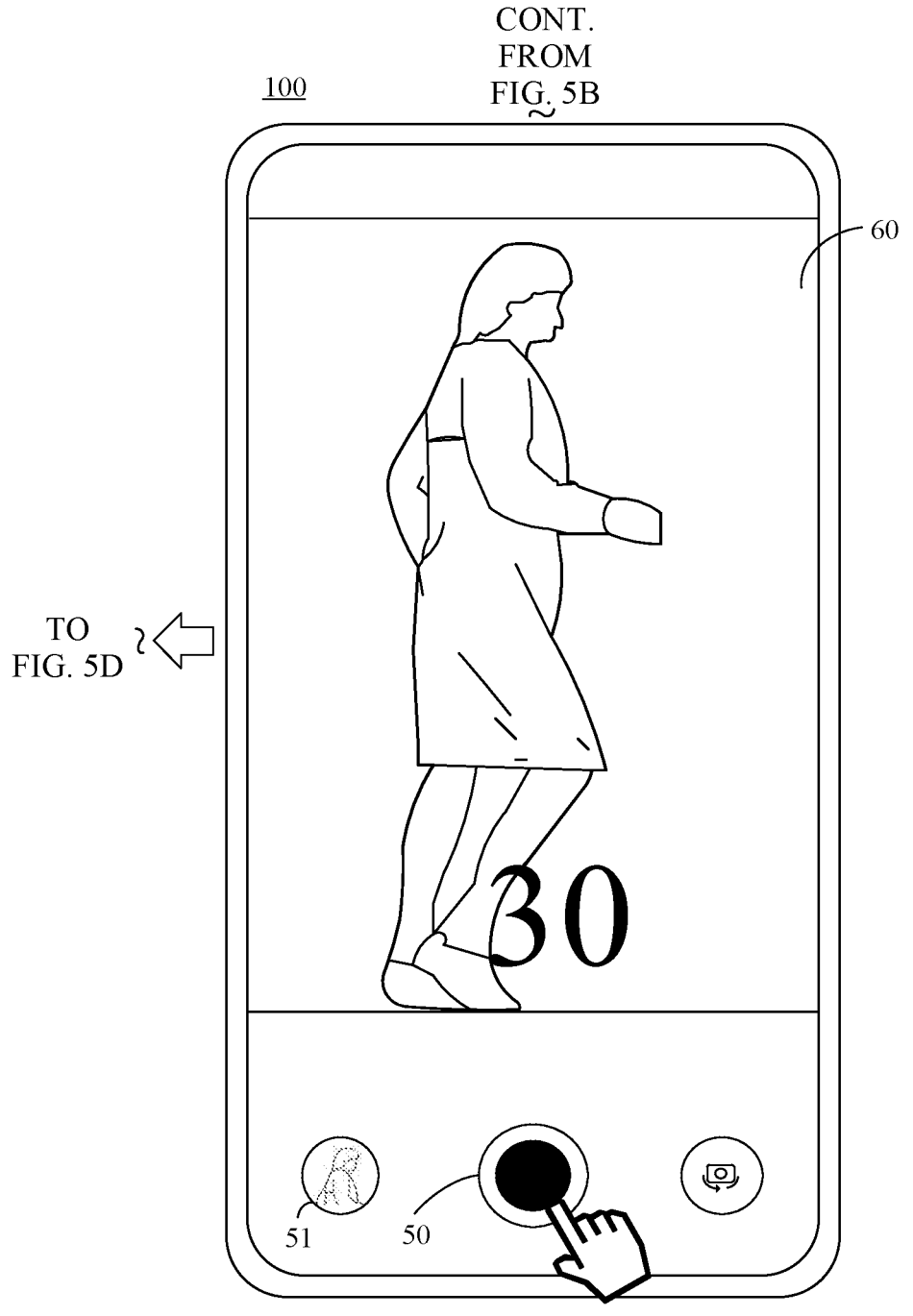

For example, FIG. 5A, FIG. 5B, FIG. 5C, and FIG. 5D are diagrams of interfaces of a long press operation. As shown in FIG. 5A, after the finger presses the photographing key 50, the electronic device detects that a pressing time is equal to a duration of one tap operation. If the finger is not lifted, the electronic device may determine that a long press operation is performed in this case. Therefore, the camera may be instructed to capture one original image at intervals of a second preset time interval. As shown in FIG. 5B, how many times the camera has been instructed to capture the original image is displayed in real time from "01" in a preview interface through number scrolling.

Figures 5C, 5D:
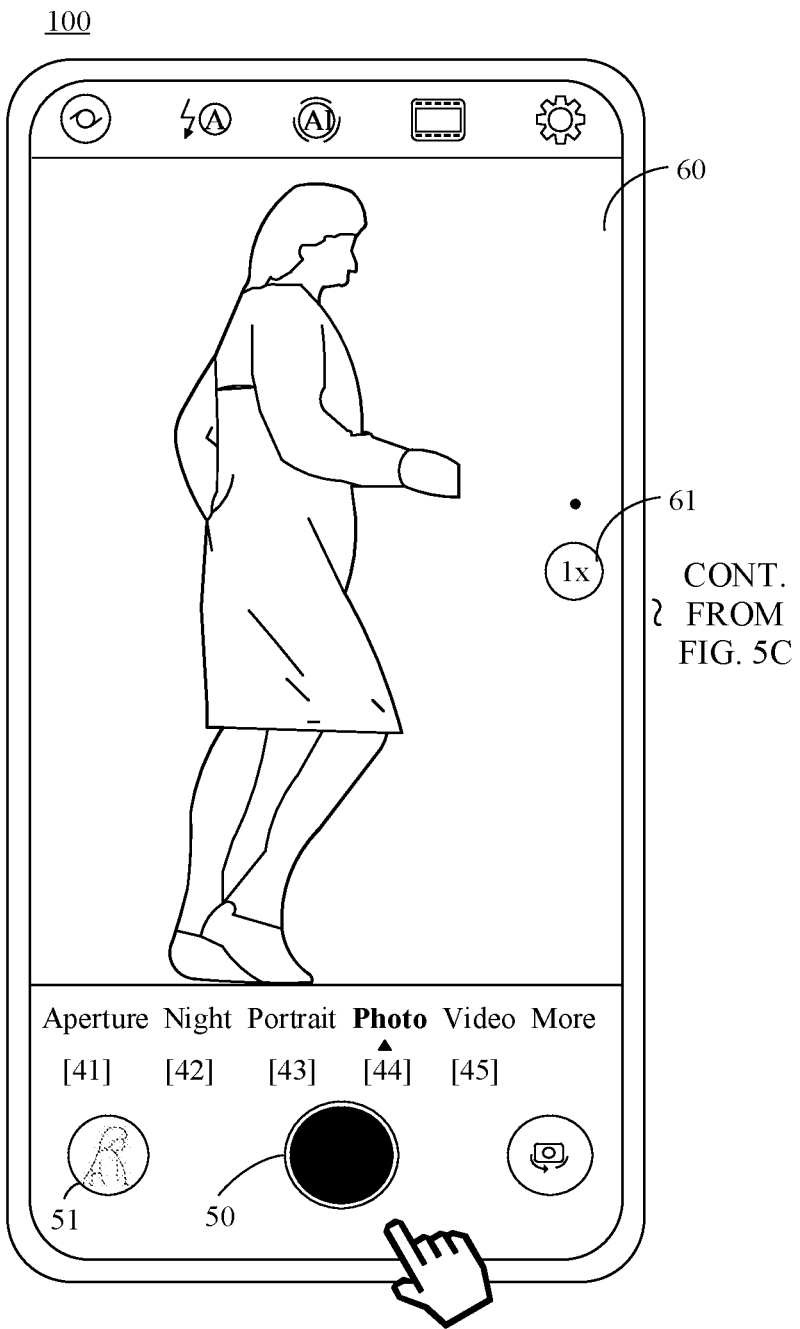

As shown in FIG. 5C, if the number in the preview interface has been scrolled to and displayed as "30", it indicates that the camera has been instructed to capture the original image for 30 times in this case. As shown in FIG. 5D, if the number in the preview interface is displayed as "30", the finger of the user is immediately lifted away from the photographing key 50. The behavior from pressing the photographing key 50 by the finger to lifting the finger may be recorded as one long press operation. A time between pressing the photographing key 50 by the finger and lifting the finger away from the photographing key 50 is a duration of the long press operation. In the duration, the electronic device instructs the camera to capture the original image for 30 times in total.

For example, when the camera is enabled, the photographing key 50 indicates that the current photographing mode is the photo mode 44. When the user performs one long press operation on the photographing key 50, in response to the long press operation, the electronic device captures the original images in a plurality of times by using the camera.

It should be noted that a longer time in which the user performs the long press operation usually indicates a larger quantity of times in which the electronic device captures the original image by using the camera. In addition, the second preset time interval between two consecutive times may be set and modified as required. This is not limited in this embodiment of this application.

S19: Process, by using a fourth photographing algorithm, an original image captured in each time, to respectively obtain a corresponding captured image.

A processing time of the fourth photographing algorithm is less than the processing time of the second photographing algorithm.

The processing time of the fourth photographing algorithm is a duration of processing the original image by using the fourth photographing algorithm. A memory corresponding to the fourth photographing algorithm is less than the memory corresponding to the second photographing algorithm.

It should be understood that, when the user performs the long press operation, it indicates that the user expects to continuously perform photographing for a plurality of times. In this case, frequency at which the electronic device captures the original image is very high. If the algorithm with relatively large time consumption is used in the background to process the original image captured in each time, processing cannot be performed in time, and data congestion occurs. Therefore, when the user performs the long press operation, the algorithm with relatively small time consumption needs to be used to process the original image captured in each time, to improve processing efficiency.

Optionally, the fourth photographing algorithm may be the same as the third photographing algorithm. The processing time of the fourth photographing algorithm is equal to the processing time of the third photographing algorithm. The memory corresponding to the fourth photographing algorithm is equal to the memory corresponding to the third photographing algorithm.

Because the processing time of the third photographing algorithm is less than the processing time of the second photographing algorithm, that the fourth photographing algorithm is the same as the third photographing algorithm is equivalent to that the processing time of the fourth photographing algorithm is also less than the processing time of the second photographing algorithm.

Optionally, the fourth photographing algorithm may be different from the third photographing algorithm. The processing time of the fourth photographing algorithm is less than the processing time of the third photographing algorithm. The memory corresponding to the fourth photographing algorithm is less than the memory corresponding to the third photographing algorithm.

For example, the fourth photographing algorithm may include fewer processing steps than the third photographing algorithm. In this case, the processing time of the fourth photographing algorithm is less than the processing time of the third photographing algorithm.

It should be understood that because the processing time of the third photographing algorithm is less than the processing time of the second photographing algorithm, and the processing time of the fourth photographing algorithm is less than the processing time of the third photographing algorithm, the processing time of the fourth photographing algorithm is still less than the processing time of the second photographing algorithm.

For example, as shown in FIG. 6, the processing time corresponding to the first photographing algorithm is 2000 ms, and an occupied memory amount is 87.5 M; the processing time corresponding to the second photographing algorithm is 1200 ms, and an occupied memory amount is 50 M; the processing time corresponding to the third photographing algorithm is 500 ms, and an occupied memory amount is 25 M; and the processing time corresponding to the fourth photographing algorithm is 1200 ms, and an occupied memory amount is 12.5 M.

It should be understood that the foregoing is merely an example. A processing time and an occupied memory amount corresponding to each photographing algorithm may be specifically set and modified as required. This is not limited in this embodiment of this application.

S20: Save a captured image.

The captured image may be stored in a gallery or may be displayed.

One frame of captured image may be obtained in response to one tap operation. A plurality of frames of captured images may be obtained in response to a plurality of tap operations. A plurality of frames of captured images may be obtained in response to a long press operation. A specific quantity of captured images is related to an operation of the user. This is not limited in this embodiment of this application.

According to the image processing method provided in this embodiment of this application, in response to the first operation performed by the user on the first control, the electronic device captures the original image once by using the camera; and then determines the quantity of times of waiting for photographing in the background, and invokes different algorithms based on different quantities of times of waiting for photographing in the background to perform processing. For example, when the quantity of times of waiting for photographing in the background is relatively large, the third photographing algorithm with relatively small time consumption is invoked to perform processing; or when the quantity of times of waiting for photographing in the background is relatively small, the first photographing algorithm with relatively large time consumption is invoked to perform processing; or when the quantity of times of waiting for photographing in the background is neither more nor less, the second photographing algorithm with neither larger nor smaller time consumption is invoked to perform processing. Therefore, different algorithms are dynamically invoked to coordinate running durations of the photographing algorithms, to improve a photographing success rate and consider both effect and performance.

In addition, in response to the second operation performed by the user on the second control, the electronic device captures original images in a plurality of times by using the camera, and processes the original images by using the fourth photographing algorithm with a relatively short processing time, to improve processing efficiency and achieve "unlimited photographing". Therefore, a frame loss problem does not occur in photographing in any case.

On this basis, because a to-be-photographed scene includes diverse information, when the quantity of times of waiting for photographing in the background is relatively small, detection and analysis may be performed on the to-be-photographed scene, to further classify the to-bephotographed scene. Then, different photographing algorithms are used to process different scenes, to improve quality of the obtained captured image.

Figure 7:
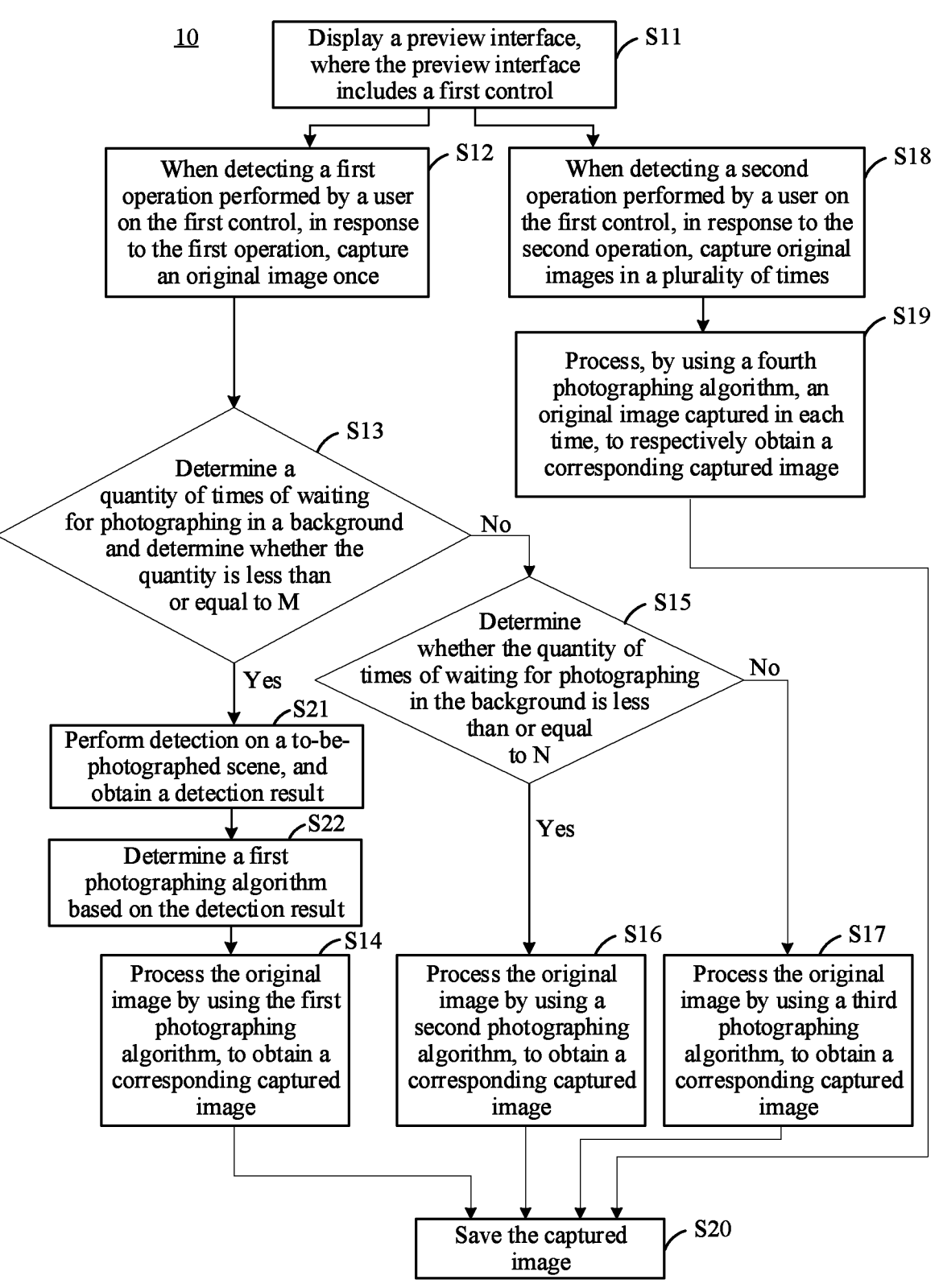
FIG. 7 is a schematic flowchart of another image processing method according to an embodiment of this application.

Optionally, as shown in FIG. 7, before step S14, after it is determined that the quantity of times of waiting for photographing in the background is less than or equal to M, the method further includes the following steps S21 and S22.

S21: Perform detection on the to-be-photographed scene, and obtain a detection result.

The detection includes illuminance (lightness value, LV) detection and dynamic range detection. In addition, the detection further includes at least one of artificial intelligence (artificial intelligence, AI) scene recognition, motion detection, human face detection, and human face attribute detection.

It should be understood that the illuminance detection means estimation of ambient brightness in the to-be-photographed scene. Illuminance means a degree in which an object is illuminated, and specifically means energy of visible light received in a unit area of an object, which is briefly referred to as illuminance whose unit is lux (Lux). A dark street, a dark room, and the like are generally in low illuminance. In comparison, a playground in sunlight, a stage in the spotlight, and the like may be referred to as being in medium-high illuminance. If the illuminance of the to-be-photographed scene is relatively low, when the to-be-photographed scene is photographed by using the electronic device, the captured image is fuzzy, and effect is relatively poor. If the illuminance of the to-be-photographed scene is relatively high, when the to-be-photographed scene is photographed by using the electronic device, the captured image is relatively clear, and photographing effect is good.

Herein, for example, a photoelectric sensor may be disposed in the electronic device, and the illuminance of the to-be-photographed scene is detected by using the photoelectric sensor. Alternatively, the illuminance may be calculated based on a received response value and an exposure parameter of the camera, such as an exposure time, photosensitivity, or an aperture, by using the following formula:

$$LV = 10 \times \log_2\left(\frac{\text{Aperture}^2}{\text{Exposure}} \times \frac{100}{ISO} \times \frac{Luma}{46}\right).$$

Herein, Exposure is the exposure time, Aperture is an aperture value, ISO is the photosensitivity, and Luma is an average value of Y in an XYZ color space.

In cases of the same exposure parameter, a larger response value indicates higher illuminance of the to-be-photographed scene and therefore a larger value of illuminance obtained through calculation.

It should be understood that the dynamic range (dynamic range) detection is detection of a dynamic range value of the to-be-photographed scene. The dynamic range value indicates a scale number of gray-scale division in a brightness range of pixels in an image, that is, between a "brightest" pixel and a "darkest" pixel in the image. A larger dynamic range value of an image indicates richer brightness levels that can be expressed in the image, and more vivid visual effect of the image. An expression of the dynamic range value may be as follows:

$$\text{dynamic range} = 20\log_{10}\left(\frac{\text{bright}}{\text{dark}}\right).$$

Herein, dynamic range is the dynamic range value, bright is brightness of the "brightest" pixel, and dark is brightness of the "darkest" pixel. A unit of the dynamic range is a stop (stop).

Herein, it may be determined based on the detected dynamic range value whether the to-be-photographed scene is a dark scene or a high dynamic range (high dynamic range, HDR) scene. The dark scene is a scene in which intensity of ambient light is relatively low. The high dynamic range scene is a scene in which intensity of ambient light is relatively high, or a scene in which intensity of a part of light is relatively low and intensity of the other part of light is relatively high.

The AI scene recognition is used to detect whether the to-be-photographed scene includes a to-be-photographed object, for example, a landscape, a portrait, a text, and the sky. The to-be-photographed object may be set and modified as required. This is not limited in this embodiment of this application.

Herein, a scene recognition model may be set in the electronic device. The electronic device can recognize a landscape, a portrait, a text, and the like in the to-be-photographed scene by using the scene recognition model. In other words, the AI scene recognition may be detection performed by using the scene recognition model. The scene recognition model may be a recognition model based on a convolutional neural network. A specific construction process and a specific training process of the scene recognition model are not limited in this embodiment of this application. Construction may be performed by using an existing construction process, and training may be performed by using an existing training process. It should be understood that the scene recognition model set in the electronic device may be obtained through training performed by a cloud server, or may be updated in real time according to an update operation of a cloud server.

The motion detection is used to detect whether a person or an object in the to-be-photographed scene is moving, and a value of a moving speed, for example, a person is running, a child is chasing, and a pet is running.

Herein, an acceleration sensor and/or a gyroscope sensor may be disposed in the electronic device. The electronic device may recognize whether the person or the object in the to-be-photographed scene is moving, and the value of the moving speed through assistance provided by using the acceleration sensor and/or the gyroscope sensor. A unit of the moving speed may be meter/second (m/s) or centimeter/second (cm/s). This may be specifically set as required. This is not limited in this embodiment of this application.

The human face detection is used to detect whether the to-be-photographed scene includes human face information. The human face attribute detection is used to estimate a quantity, a gender, an age, and the like of detected human faces.

Herein, a human face detection model may be set in the electronic device. The electronic device may recognize the quantity, the gender, the age, and the like in the to-be-photographed scene by using the human face detection model. In other words, the human face detection and the human face attribute detection may detection performed by using the human face recognition model. The human face recognition model may be a recognition model constructed based on a convolutional neural network. A specific construction process and a specific training process of the human face recognition model are not limited in this embodiment of this application. Construction may be performed by using an existing construction process, and training may be performed by using an existing training process. It should be understood that the human face recognition model set in the electronic device may be obtained through training performed by a cloud server, or may be updated in real time according to an update operation of a cloud server.

It should be understood that the detection may include the foregoing one or more detection items, and certainly may further include another detection item. A detection item may be specifically added as required. This is not limited in this embodiment of this application.

It should be noted that, during detection, an execution sequence of a plurality of types of detection may be set as required. For example, the illuminance detection, the dynamic range detection, the AI scene recognition, the motion detection, the human face detection, and the human face attribute detection may be sequentially performed; or the illuminance detection, the dynamic range detection, the AI scene recognition, the motion detection, the human face detection, and the human face attribute detection may be simultaneously performed. Certainly, execution may also be performed in another sequence. This is not limited in this embodiment of this application.

S22: Determine the first photographing algorithm based on the detection result.

The to-be-photographed object in the to-be-photographed scene may be divided into a static state, a low-speed moving state, and a high-speed moving state based on the detection result. For different states, different algorithms are used as the first photographing algorithm to process the original image.

Detection is performed on the to-be-photographed scene to refine a case in the scene in this embodiment of this application, to correspondingly refine a method for processing an original image, thereby adaptively improving quality and effect of a captured image obtained in each case.

The following describes in detail the image processing method provided in this application with reference to embodiments. In the following embodiments, an example in which M is 3 and N is 10 is used for description.

It should be understood that each number is merely an example, and may be specifically set and modified as required. This is not displayed in this embodiment of this application.

Figure 8A:
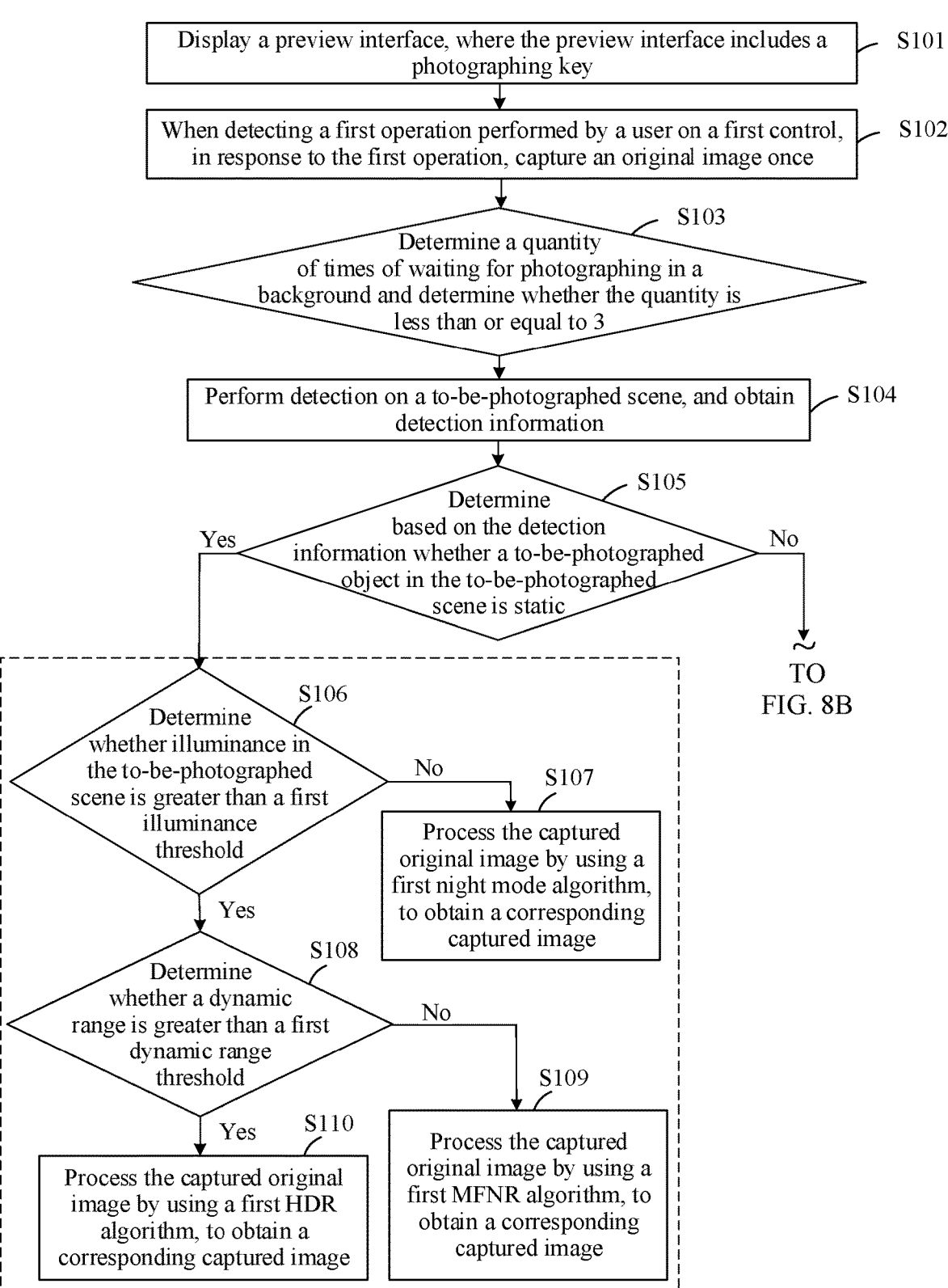
FIG. 8A and FIG. 8B are a schematic flowchart of a first photographing algorithm according to an embodiment of this application.
Figure 8B:
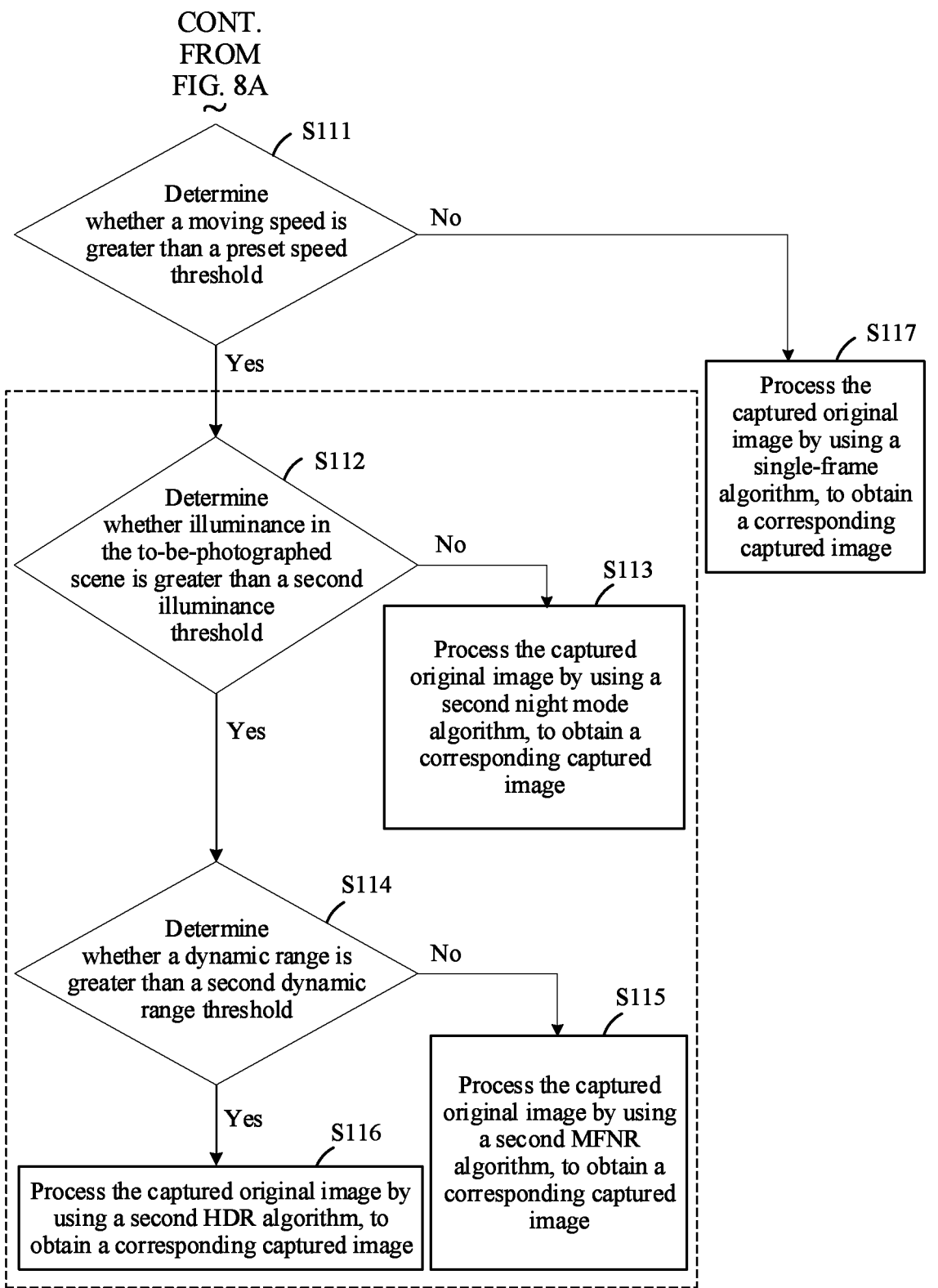

Embodiment 1 provides an image processing method. As shown in FIG. 8A and FIG. 8B, the method may include the following steps S101 to S117.

S101: An electronic device displays a first interface. The first interface includes a preview image and a photographing key. The photographing key indicates a photo mode.

S102: When detecting a tap operation performed by a user on the photographing key, in response to the tap operation, the electronic device captures an original image once by using a camera.

For example, for one tap operation, the camera captures 10 frames of original images. It should be understood that a quantity of frames included in the original image collected once by the electronic device by using the camera may be set and modified as required. This is not limited in this embodiment of this application.

S103: Determine a quantity of times of waiting for photographing in a background.

For example, after the user enables the camera, a current accumulated quantity of photographing times is accumulated from 0. When detecting a tap operation A1 performed by the user on the photographing key, in response to the tap operation A1, the electronic device captures the original image once by using the camera, and the current accumulated quantity of photographing times is 1. In this case, a quantity of times of processed photographing and a quantity of times of photographing being processed are both zero. Therefore, the quantity of times of waiting for photographing in the background can be obtained through subtracting the quantity of times of processed photographing and the quantity of times of photographing being processed from the current accumulated quantity of photographing times, that is, 1.

S104: Because the quantity of times of waiting for photographing in the background is 1 that is less than 3, and the quantity of times of photographing in the background is relatively small, perform detection on a to-be-photographed scene, and obtain a detection result.

Herein, illuminance detection, dynamic range detection, AI scene recognition, motion detection, human face detection, human face attribute detection, and the like may be performed in a specific sequence. Alternatively, a plurality of types of detection may be simultaneously performed. A detection sequence may be set and modified as required. This is not limited in this embodiment of this application.

In addition to the foregoing manners, a plurality of detection algorithms and models such as illuminance detection, dynamic range detection, AI scene recognition, motion detection, human face detection, and human face attribute detection may be alternatively combined into a perception engine. Then, when the perception engine is used to perform detection on the to-be-photographed scene, detection results of all related types can be conveniently and quickly obtained at one time. Certainly, a specific combination type and a specific combination manner may be set and modified as required. This is not limited in this embodiment of this application.

Optionally, before detection is performed, front-end processing may be further performed on the original image, to perform some corrections on the original image.

Figure 9:
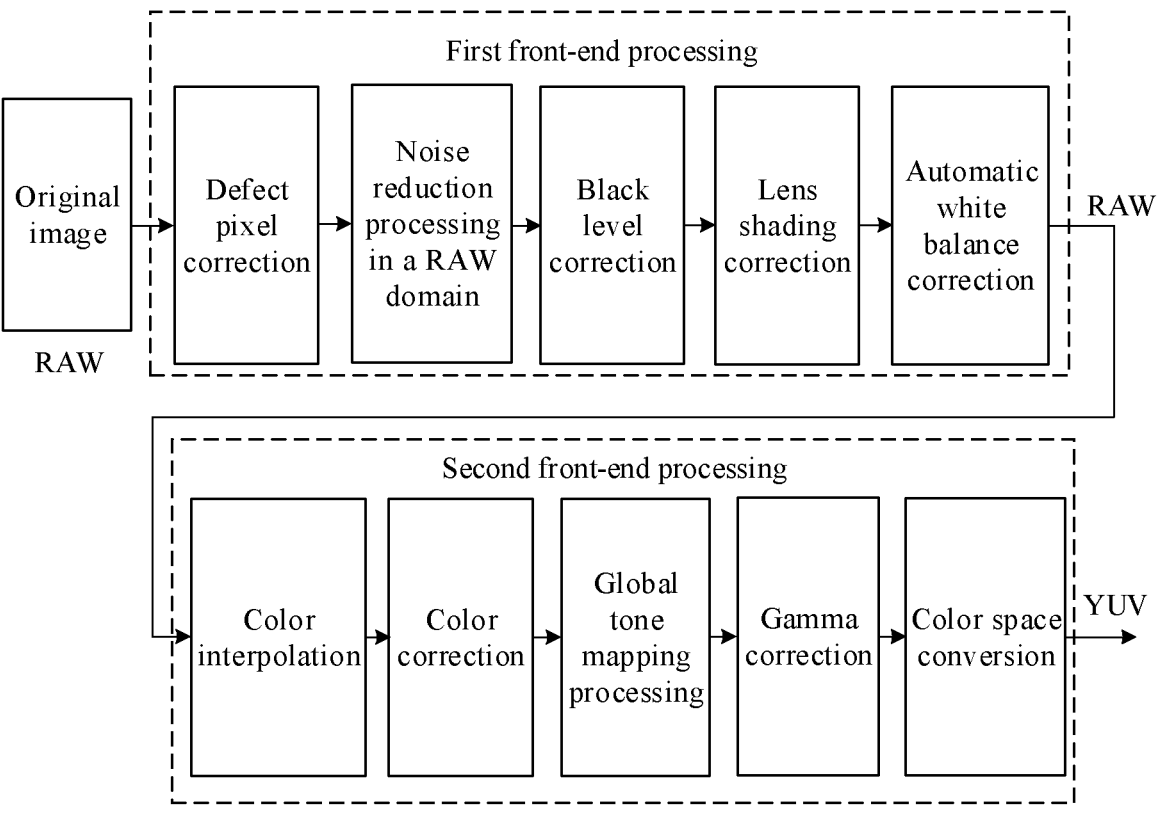
FIG. 9 is a schematic flowchart of front-end processing according to an embodiment of this application.

FIG. 9 is a diagram of front-end processing.

As shown in FIG. 9, the front-end processing may include first front-end processing and second front-end processing.

The first front-end processing may include at least one of defect pixel correction (default pixel correction, DPC), RAW domain noise reduction (raw domain noise filter, RAWNF), black level correction (black level correction, BLC), lens shading correction (lens shading correction, LSC), and auto white balance. The second front-end processing may include at least one of color interpolation, color correction (color correction matrix, CCM), global tone mapping processing (the global tone mapping), gamma (Gamma) correction, and color space conversion.

In the defect pixel correction, a defective pixel is a white dot in an output image in an all-black environment, and a black dot in an output image in a highly bright environment. Generally, three primary color channel signals should have a linear response relationship with ambient brightness, but due to a poor signal outputted by the image sensor, white dots or black dots may appear. For this, defective pixels may be automatically detected and automatically repaired, or a defective pixel linked list may be established for repair of defective pixels at fixed positions. A dot indicates a pixel.

Noise reduction is a process of reducing noise in an image. Common methods include mean filtering, Gaussian filtering, bilateral filtering, and the like. The RAW domain noise reduction is a process of reducing noise in an image in the RAW domain.

For the black level correction, because there is a dark current in the image sensor, a pixel also corresponds to a specific output voltage when no light is irradiated. In addition, pixels in different positions may correspond to different output voltages. Therefore, an output voltage corresponding to a dim (that is, black) pixel needs to be corrected.

The lens shading correction can resolve a case in which a shadow appears around a lens because the lens unevenly reflects light.

The auto white balance is used to eliminate impact of a light source on imaging of the image sensor, simulate color constancy of human vision, and ensure that white seen in any scene is real white. Therefore, a color temperature needs to be corrected, and white balance needs to be automatically adjusted to an appropriately position.

For the color interpolation, because each pixel in an image in the RAW domain corresponds to color information of only one channel, other colors may be estimated by using surrounding pixel information. For example, in a linear interpolation manner, color information of other two channels missing from each pixel may be determined, to restore all channel information of all pixels in the image. A color interpolation process is equivalent to converting an image from a RAW domain to an RGB domain. Herein, the color interpolation may also be referred to as demosaicing.

For the color correction, color correction needs to be performed because colors in an image obtained by the camera are different from colors expected by people. Because white has been calibrated through the auto white balance, the color correction can be used to calibrate colors other than white.

The global tone mapping processing means mapping all pixels in an image by using a space-invariant mapping function. In other words, when dynamic range conversion is performed on an image through the global tone mapping processing, a same conversion function is used for all pixels in the image. This is a one-to-one mapping relationship. Herein, the global tone mapping processing may also be referred to as dynamic range compression (dynamic range compression, DRC).

The gamma correction means editing a gamma curve of an image, detecting a deep-colored part and a light-colored part in the image in a manner of performing non-linear tone editing on the image, and increasing the deep-colored part and the light-colored part in the image in proportion, to improve contrast effect of the image.

The color space conversion means converting an image from the RGB domain to the YUV domain. Therefore, an image obtained after processing in a previous step can be converted from the RGB domain to the YUV domain, to reduce a volume of subsequently stored and transmitted data, thereby saving bandwidth.

In this embodiment of this application, an image obtained after the first front-end processing is in the RAW domain, and an image obtained after the second front-end processing is in the YUV domain. An image in the RAW domain includes more information. An image in the YUV domain corresponds to less data and faster transmission.

The first front-end processing and/or the second front-end processing may include the foregoing one or more processing steps. When the first front-end processing and/or the second front-end processing include/includes a plurality of processing steps, a processing sequence of the plurality of processing steps may be adjusted as required. This is not limited in this embodiment of this application. In addition, the first front-end processing and the second front-end processing may further include another step. The step may be specifically added and modified as required. This is not limited in this embodiment of this application.

It should be understood that the image that is obtained after the second front-end processing in the YUV domain undergoes correction and adjustment in comparison with the original image, and information in the image is more accurate. In this case, the image in the YUV domain may be subsequently input to the perception engine for detection, and a corresponding more accurate detection result may be obtained. The detection result is the detection result corresponding to the to-be-photographed scene.

S105: Determine, based on the detection result, whether a to-be-photographed object in the to-be-photographed scene is static.

Herein, static means that the to-be-photographed object in the to-be-photographed scene is still, for example, a landscape, a standing portrait, a text, and the sky. Dynamic is relative to static. Dynamic means that the to-be-photographed object in the to-be-photographed scene is moving, for example, a running child and a moving basketball.

It should be understood that the to-be-photographed object may be added and modified as required. This is not limited in this embodiment of this application.

S106: When it is determined that the to-be-photographed object in the to-be-photographed scene is static, in this case, determine whether detected illuminance in the to-be-photographed scene is greater than a first illuminance threshold (for example, 100 Lux).

It should be understood that a value of the first illuminance threshold may be set and modified as required. This is not limited in this embodiment of this application.

S107: If it is detected that the illuminance in the to-be-photographed scene is less than or equal to the first illuminance threshold, determine a first night mode algorithm as a first photographing algorithm, and process, by using the first night mode algorithm, the original image captured by the camera in this time, to obtain a corresponding captured image.

When it is detected that the illuminance in the to-be-photographed scene is less than or equal to the first illuminance threshold, it indicates that ambient brightness in the to-be-photographed scene is relatively dark. In this case, if processing is performed by using a general photographing algorithm, an obtained captured image is unclear, and the user cannot clearly see details in the captured image. In this case, in this embodiment of this application, the first night mode algorithm may be selected to perform processing, to improve brightness of an image in a processing process. Therefore, more details can be presented in the obtained captured image.

Optionally, P frames of original images captured by the camera in this time may be processed by using the first night mode algorithm, to obtain a corresponding captured image.

For example, because the camera can capture 10 frames of original images in response to one tap operation, in this case, when processing is performed by using the first night mode algorithm, some frames of original images may be selected for processing, or all frames may be selected for processing. This is not limited in this embodiment of this application. Herein, P should be greater than 1 and less than or equal to a quantity of all frames of original images captured by the camera in this time, that is, 10. A value of P should be an integer.

Optionally, when a plurality of frames of original images are selected for processing, the plurality of frames of original images may include at least one of a long exposure original image, a normal exposure original image, and a short exposure original image.

The long exposure original image is an image obtained through a relatively long time of exposure during photographing. The short exposure original image is an image obtained through a relatively short time of exposure during photographing. Both "long" and "short" are relative to the "normal" exposure time. When exposure times corresponding to the normal exposure original image are different, long exposure and short exposure also change accordingly.

When the plurality of frames of original images include the long exposure original image, the normal exposure original image, and/or the short exposure original image, a quantity of frames of long exposure original images, a quantity of frames of normal exposure original images, and a quantity of frames of short exposure original images may be selected and modified as required. This is not limited in this embodiment of this application.

Optionally, the electronic device may be provided with a night mode algorithm module. The electronic device may implement a processing process of the first night mode algorithm by using the night mode algorithm module.

For example, the night mode algorithm module is generated based on a Unet network model. A plurality of frames of original images in the RAW domain may be fused into one frame of image in the RAW domain. Certainly, the night mode algorithm module may also be generated based on another model. This is not limited in this embodiment of this application.

Figure 10:
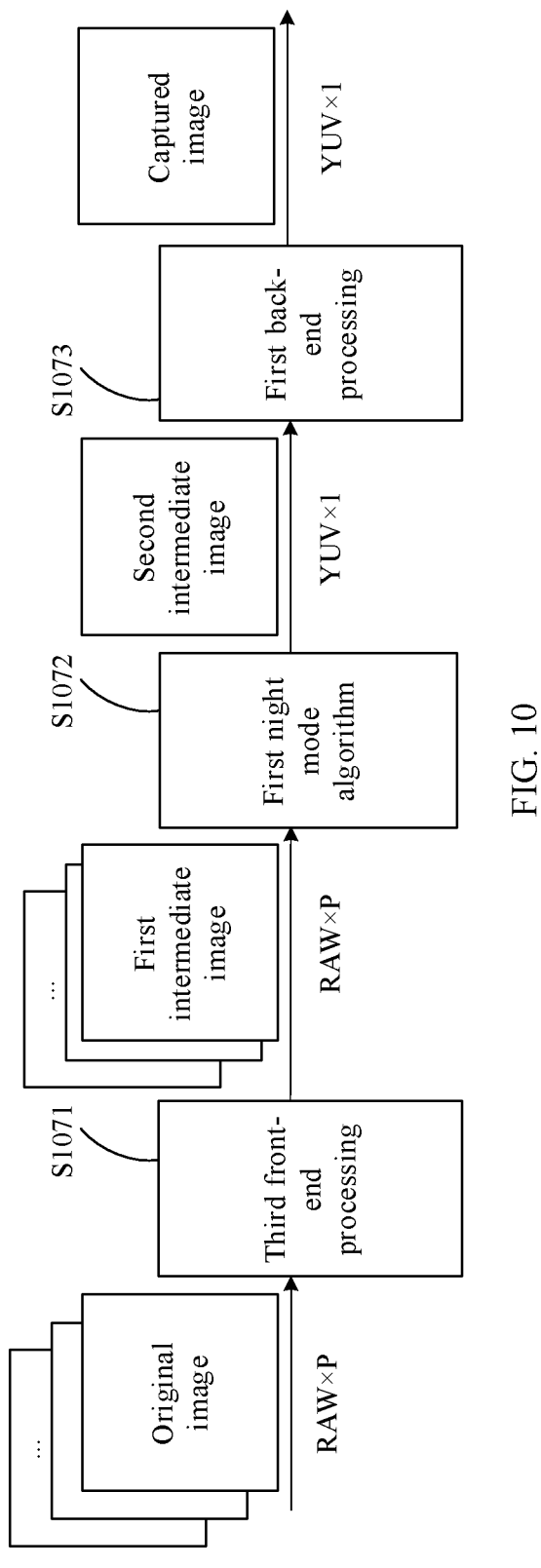
FIG. 10 is a schematic flowchart of still another image processing method according to an embodiment of this application.

On this basis, the first night mode algorithm is used to process the P frames of original images captured by the camera in this time, to obtain a corresponding captured image. As shown in FIG. 10, the following steps S1071 to S1073 may be included.

S1071: Perform third front-end processing on the P frames of original images captured by the camera in this time, to obtain P frames of first intermediate images.

For example, when the camera captures 10 frames of original images in this time, it is assumed that P=9. Nine frames may be selected for the third front-end processing, to obtain nine frames of first intermediate images.

Steps included in the third front-end processing may be the same as the steps included in the foregoing first front-end processing. For details, refer to the foregoing description. Certainly, the third front-end processing may further include another step. This is not limited in this embodiment of this application.

S1072: Process the P frames of first intermediate images by using the first night mode algorithm, to obtain one frame of second intermediate image.

The first intermediate image is an image in the RAW domain. The second intermediate image is an image in the YUV domain.

S1073: Perform first back-end processing on the frame of second intermediate image, to obtain a corresponding captured image.

It should be understood that the first back-end processing is used to correct the second intermediate image.

Figure 11:
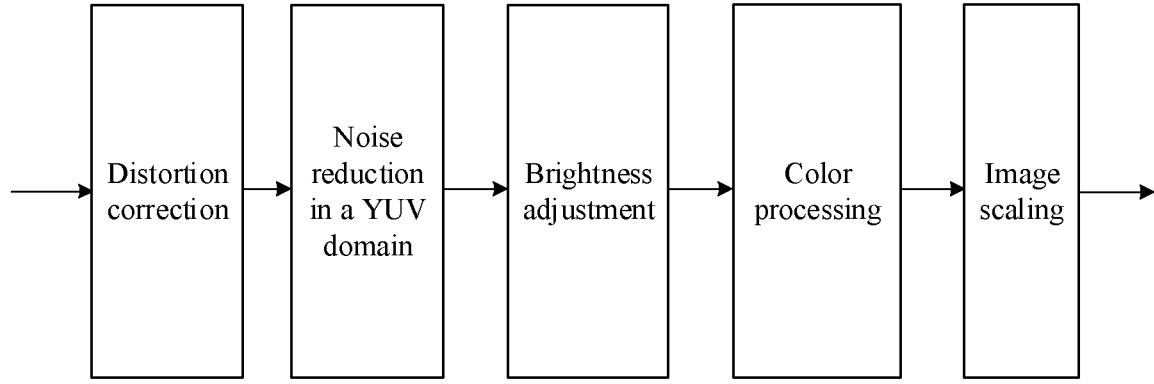
FIG. 11 is a schematic flowchart of first back-end processing according to an embodiment of this application.

FIG. 11 is a diagram of first back-end processing.

As shown in FIG. 11, the first back-end processing may include at least one of distortion correction, YUV domain noise reduction, brightness adjustment, color processing, and image scaling.

For the distortion correction, because a lens of the camera has a different capability of bending color light, a distance between an imaging point and an optical axis is different, and therefore, a lateral magnification is different. Therefore, actual imaging distortion occurs, and a distortion problem occurs. Therefore, the distortion correction needs to be performed on an image, to return the image back to normal.

The YUV domain noise reduction is a process of reducing noise in an image in the YUV domain.

The brightness adjustment is improving or reducing brightness of an image.

The color processing is used to make original unsaturated color information saturated and rich. Herein, the color processing may also be referred to as color enhancement (color enhancement, CE).

The image scaling is used to scale up or down a size of an image.

In this embodiment of this application, the image obtained after the first back-end processing is in the YUV domain.

It should be understood that the first back-end processing may include the foregoing one or more processing steps. When the first back-end processing includes a plurality of processing steps, a processing sequence of the plurality of processing steps may be adjusted as required. This is not limited in this embodiment of this application. In addition, the first back-end processing may further include another step. The step may be specifically added and modified as required. This is not limited in this embodiment of this application.

After the first back-end processing, the captured image is an image in the YUV domain, or format conversion may be further performed to convert the captured image into another format commonly used for display, for example, JPEG.

It should be understood that, clarity of the captured image obtained after the first back-end processing is improved in comparison with the original image. Therefore, the captured image has better image quality.

S108: If it is detected that the illuminance in the to-be-photographed scene is greater than the first illuminance threshold, further determine whether a dynamic range result detected in the to-be-photographed scene is greater than a first dynamic range threshold (for example, 8-stop).

It should be understood that a value of the first dynamic range threshold may be set and modified as required. This is not limited in this embodiment of this application.

S109: If the detected dynamic range in the to-be-photographed scene is less than or equal to the first dynamic range threshold, determine a first multi-frame noise reduction (multi frame noise reduction, MFNR) algorithm as a first photographing algorithm, and process, by using a first MFNR algorithm, the original image captured by the camera in this time, to obtain a corresponding captured image.

With reference to steps S105, S106, and S108, when it is detected that the to-be-photographed object in the to-be-photographed scene is static, the illuminance is greater than the first illuminance threshold, and the dynamic range is less than or equal to the first dynamic range threshold, it indicates that ambient light in the to-be-photographed scene is relatively strong, and the dynamic range is relatively small. In this case, if processing is performed by using a general photographing algorithm, noise of the obtained captured image is relatively loud, and the dynamic range is relatively small. In this case, in this embodiment of this application, the first MFNR algorithm may be selected to perform processing, to reduce the noise of the captured image and improve the dynamic range of the captured image.

Optionally, the first MFNR algorithm is used to process the P frames of original images captured by the camera in this time, to obtain the corresponding captured image.

It should be understood that, because the camera can capture 10 frames of original images in response to one tap operation, when processing is performed by using the first MFNR algorithm, some frames of original images may be selected for processing, or all frames of original images may be selected for processing. This is not limited in this embodiment of this application. Herein, a quantity of frames processed by using the first MFNR algorithm may be the same as a quantity of frames processed by using the first night mode algorithm.

In this embodiment of this application, when the first MFNR algorithm is selected to process a plurality of frames of original images, exposure times of the plurality of frames of original images are the same.

Optionally, in this embodiment of this application, the first MFNR algorithm may be a process of first aligning the P frames of original images, and then processing the aligned original images by using a wavelet fusion algorithm. Alternatively, the first MFNR algorithm may be an optical flow algorithm. This is not limited in this embodiment of this application.

Figure 12:
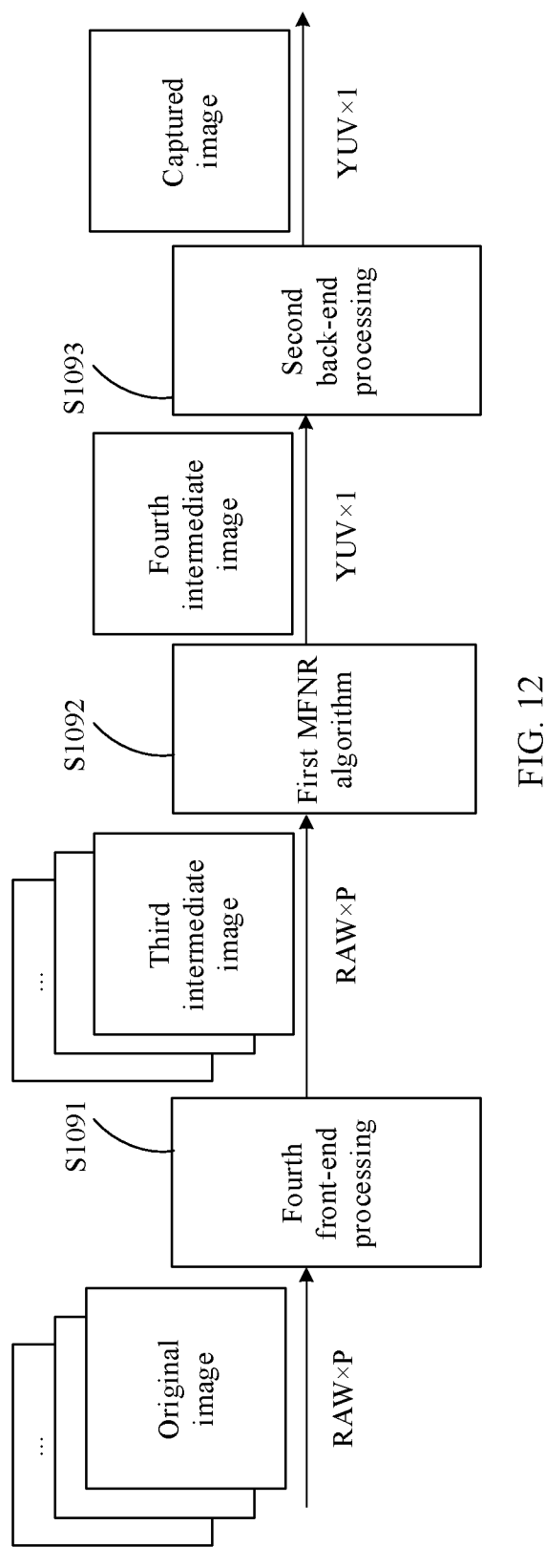
FIG. 12 is a schematic flowchart of still another image processing method according to an embodiment of this application.

On this basis, the first MFNR algorithm is used to process the P frames of original images captured by the camera in this time, to obtain a corresponding captured image. As shown in FIG. 12, the following steps S1091 to S1093 may be included.

S1091: Perform fourth front-end processing on the P frames of original images captured by the camera in this time, to obtain P frames of third intermediate images.

Steps included in the fourth front-end processing may be the same as the steps included in the foregoing first front-end processing. For details, refer to the foregoing description. Certainly, the fourth front-end processing may further include another step. This is not limited in this embodiment of this application.

S1092: Process the P frames of third intermediate images by using the first MFNR algorithm, to obtain one frame of fourth intermediate image.

The third intermediate image is an image in the RAW domain. The fourth intermediate image is an image in the YUV domain.

S1093: Perform second back-end processing on the frame of fourth intermediate image, to obtain a corresponding captured image.

Steps included in the second back-end processing may be the same as the steps included in the foregoing first back-end processing. For details, refer to the description of FIG. 11. Certainly, the second back-end processing may further include another step. This is not limited in this embodiment of this application.

After the second back-end processing, the captured image is an image in the YUV domain, or format conversion may be further performed to convert the captured image into another format commonly used for display, for example, JPEG.

S110: If the detected dynamic range in the to-be-photographed scene is greater than the first dynamic range threshold, determine a first HDR algorithm as a first photographing algorithm, and process, by using the first HDR algorithm, the original image captured by the camera in this time, to obtain a corresponding captured image.

When it is detected that the dynamic range in the to-be-photographed scene is greater than the first dynamic range threshold, it indicates that intensity of ambient light in the to-be-photographed scene is relatively high. It may be considered that the to-be-photographed scene is a scene with a high dynamic range. In this case, if processing is performed by using a general photographing algorithm, an over-exposure problem may occur in the obtained captured image. In this case, in this embodiment of this application, the first HDR algorithm may be selected to perform processing, to adjust the dynamic range of the image and image details, so that content presented in the obtained captured image is more real, to improve image quality.

Optionally, the first HDR algorithm is used to process the P frames of original images captured by the camera in this time, to obtain the corresponding captured image.

For example, the camera can capture 10 frames of original images in response to one tap operation. In this case, when processing is performed by using the first HDR algorithm, some frames of original images may be selected for processing, or all frames of original images may be selected for processing. This is not limited in this embodiment of this application. Herein, a quantity of frames processed by using the first HDR algorithm may be the same as a quantity of frames processed by using the first night mode algorithm.

In this embodiment of this application, when the first HDR algorithm is selected to process a plurality of frames of original images, the plurality of frames of original images may separately correspond to different exposure values. For example, some of the plurality of frames of original images correspond to EV−1, some correspond to EV0, and some correspond to EV1.

Optionally, the electronic device may be provided with an HDR algorithm module. The electronic device may implement a processing process of the first HDR algorithm by using the HDR algorithm module.

For example, the first HDR algorithm module is generated based on multi-exposure fusion processing and a tone mapping model, and may be used to fuse a plurality of frames of original images with different exposure values or different exposure degrees to obtain one frame of image in the RAW domain, and perform mapping conversion processing on a color of the image. The tone mapping model may be any one of a Unet network model, a Resnet network model, or a Hdrnet network model. Certainly, the tone mapping model may alternatively be another model, on which no limitation is made in this embodiment of this application.

Figure 13:
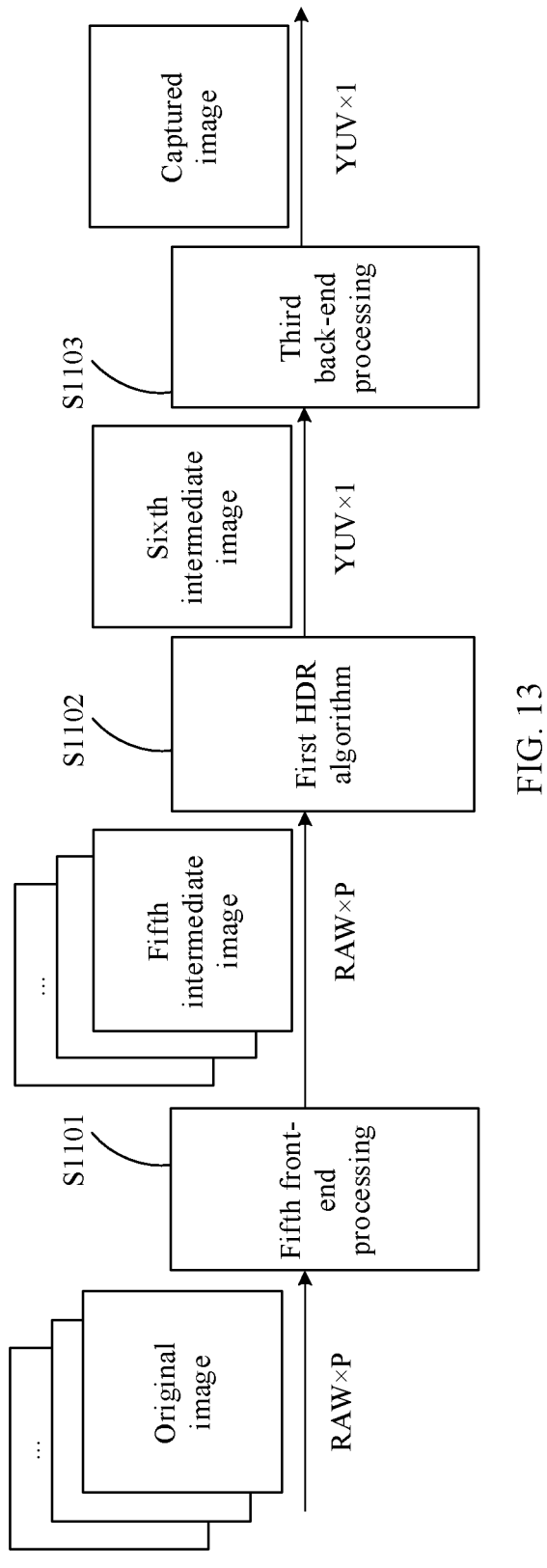
FIG. 13 is a schematic flowchart of still another image processing method according to an embodiment of this application.

On this basis, the first HDR algorithm is used to process the P frames of original images captured by the camera in this time, to obtain a corresponding captured image. As shown in FIG. 13, the following steps S1101 to S1103 may be included.

S1101: Perform fifth front-end processing on the P frames of original images captured by the camera in this time, to obtain P frames of fifth intermediate images.

Steps included in the fifth front-end processing may be the same as the steps included in the foregoing first front-end processing. For details, refer to the foregoing description. Currently, the fifth front-end processing may further include another step. This is not limited in this embodiment of this application.

S1102: Process the P frames of fifth intermediate images by using the first HDR algorithm, to obtain one frame of sixth intermediate image.

The fifth intermediate image is an image in the RAW domain. The sixth intermediate image is an image in the YUV domain.

S1103: Perform third back-end processing on the frame of sixth intermediate image, to obtain a corresponding captured image.

Steps included in the third back-end processing may be the same as the steps included in the foregoing first back-end processing. For details, refer to the description of FIG. 11. Certainly, the third back-end processing may further include another step. This is not limited in this embodiment of this application.

After the third back-end processing, the captured image is an image in the YUV domain, or format conversion may be further performed to convert the captured image into another format commonly used for display, for example, JPEG.

S111: After step S105, when it is determined that the to-be-photographed object in the to-be-photographed scene is not static, it indicates that the to-be-photographed object in the to-be-photographed scene is dynamic. In this case, it may be further determined, based on a value of a moving speed detected through motion detection, whether a moving speed of the to-be-photographed object is greater than a preset speed threshold (for example, 1 m/s).

It should be understood that a value of the preset speed threshold may be set and modified as required. This is not limited in this embodiment of this application.

S112: If it is detected that the moving speed of the to-be-photographed object in the to-be-photographed scene is greater than the preset speed threshold, it may be further determined, based on a detected illuminance result in the to-be-photographed scene, whether the illuminance in the to-be-photographed scene is greater than a second illuminance threshold (for example, 100 Lux).

It should be understood that a value of the second illuminance threshold may be set and modified as required, and the value of the second illuminance threshold may be the same as or different from the value of the first illuminance threshold. This is not limited in this embodiment of this application.

S113: If it is detected that the illuminance in the to-be-photographed scene is less than or equal to the second illuminance threshold, determine a second night mode algorithm as the first photographing algorithm, and process, by using the second night mode algorithm, the original image captured by the camera in this time, to obtain a corresponding captured image.

With reference to steps S111 and S113, when it is detected that the to-be-photographed object in the to-be-photographed scene is greater than the preset speed threshold and the illuminance in the to-be-photographed scene is less than or equal to the second illuminance threshold, it indicates that in a dark environment, the to-be-photographed object is moving, and a moving amplitude is relatively large, which may be referred to as a fast moving state. In this case, in this embodiment of this application, the second night mode algorithm may be selected to perform processing, to improve image clarity and ensure image quality.

Optionally, Q frames of original images captured by the camera in this time may be processed by using the second night mode algorithm, to obtain a corresponding captured image.

It should be understood that, because the camera can capture 10 frames of original images in response to one tap operation, when processing is performed by using the second night mode algorithm, some frames of original images may be selected for processing, or all frames may be selected for processing. This is not limited in this embodiment of this application. Herein, Q should be greater than or equal to 1 and less than the quantity of all frames of original images captured by the camera in this time. A value of Q should be an integer, and 1≤Q<P.

For selection of a plurality of frames of original images, refer to the description of step S107. Details are not described herein again.

Optionally, the second night mode algorithm may be the same as or different from the first night mode algorithm. This is not limited in this embodiment of this application.

For example, the second night mode algorithm and the first night mode algorithm may be the same and both are AI algorithms. Processing such as noise reduction, demosaicing, and dynamic range compression are implemented by using an AI network. A processing process is relatively complex. Many software and computing resources need to be invoked, for example, a graphics processing unit (graphics processing unit, GPU) and a neural-network processing unit (neural-network processing unit, NPU).

The second night mode algorithm may also be different from the first night mode algorithm. The first night mode algorithm is an AI algorithm, and the second night mode algorithm is a conventional algorithm. Noise reduction, demosaicing, dynamic range compression, and the like are completed in a collaboration manner of software and hardware. A resource that needs to be invoked is, for example, an image signal processor (image signal processor, ISP), a central processing unit (central processing unit, CPU), and a digital signal processor (digital signal processor, DSP). In this case, a completion time is shorter.

Figure 14:
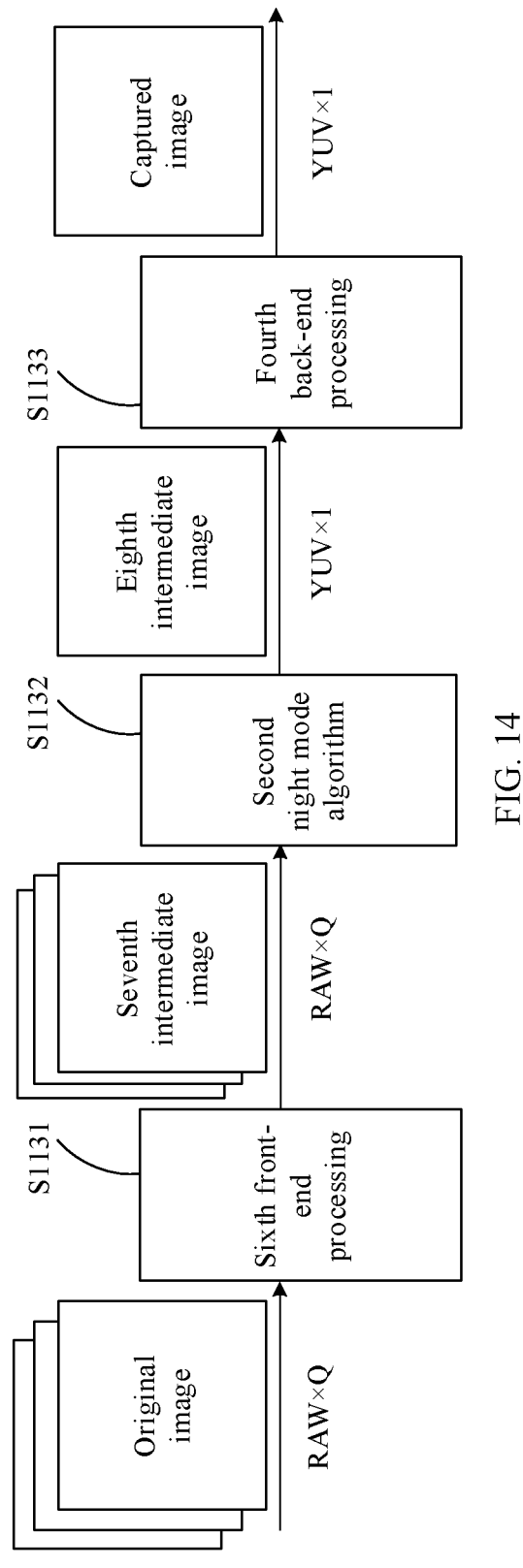
FIG. 14 is a schematic flowchart of still another image processing method according to an embodiment of this application.

On this basis, the second night mode algorithm is used to process the Q frames of original images captured by the camera in this time, to obtain a corresponding captured image. As shown in FIG. 14, the following steps S1131 to S1133 may be included.

S1131: Perform sixth front-end processing on the Q frames of original images captured by the camera in this time, to obtain Q frames of seventh intermediate images.

For example, when the camera captures 10 frames of original images in this time, it is assumed that Q=3. Three frames may be selected for the sixth front-end processing, to obtain three frames of seventh intermediate images.

Steps included in the sixth front-end processing may be the same as the steps included in the foregoing first front-end processing. For details, refer to the foregoing description. Certainly, the sixth front-end processing may further include another step. This is not limited in this embodiment of this application.

S1132: Process the Q frames of seventh intermediate images by using the second night mode algorithm, to obtain one frame of eighth intermediate image.

The seventh intermediate image is an image in the RAW domain. The eighth intermediate image is an image in the YUV domain.

S1133: Perform fourth back-end processing on the frame of eighth intermediate image, to obtain a corresponding captured image.

The fourth back-end processing is used to correct the eighth intermediate image.

Steps included in the fourth back-end processing may be the same as the steps included in the foregoing first back-end processing. For details, refer to the description of FIG. 11. Certainly, the fourth back-end processing may further include another step. This is not limited in this embodiment of this application.

After the fourth back-end processing, the captured image is an image in the YUV domain, or format conversion may be further performed to convert the captured image into another format commonly used for display, for example, JPEG.

S114: If it is detected that the illuminance in the to-be-photographed scene is greater than the second illuminance threshold, further determine whether the dynamic range result detected in the to-be-photographed scene is greater than a second dynamic range threshold (for example, 8-stop).

It should be understood that a value of the second dynamic range threshold may be set and modified as required, and the value of the second dynamic range threshold may be the same as or different from the value of the first dynamic range threshold. This is not limited in this embodiment of this application.

S115: If the detected dynamic range in the to-be-photographed scene is less than or equal to the second dynamic range threshold, determine a second MFNR algorithm as the first photographing algorithm, and process, by using the second MFNR algorithm, the original image captured by the camera in this time, to obtain a corresponding captured image.

With reference to steps S105, S111, S112, and S114, when the to-be-photographed object is dynamic, the moving speed is greater than the preset speed threshold, and the illuminance in the to-be-photographed scene is greater than the second illuminance threshold. However, the dynamic range is less than or equal to the second dynamic range threshold. It indicates that the moving amplitude of the to-be-photographed object is relatively large, and the to-be-photographed object is in a fast moving state in a bright scene with the relatively small dynamic range. In this case, if processing is performed by using a general photographing algorithm, noise of an obtained captured image is relatively large, and a dynamic range is relatively small. In this case, in this embodiment of this application, the second MFNR algorithm may be selected to perform processing, to reduce the noise of the captured image and improve the dynamic range of the captured image.

Optionally, the second MFNR algorithm is used to process the Q frames of original images captured by the camera in this time, to obtain the corresponding captured image.

It should be understood that, because the camera can capture 10 frames of original images in response to one tap operation, when processing is performed by using the second MFNR algorithm, some frames of original images may be selected for processing, or all frames of original images may be selected for processing. This is not limited in this embodiment of this application. Herein, a quantity of frames processed by using the second MFNR algorithm may be the same as a quantity of frames processed by using the second night mode algorithm.

In this embodiment of this application, when the second MFNR algorithm is selected to process a plurality of frames of original images, exposure times of the plurality of frames of original images are the same.

Optionally, the second MFNR algorithm may be the same as or different from the first MFNR algorithm. This is not limited in this embodiment of this application.

For example, the second MFNR algorithm and the first MFNR algorithm may be the same and both are AI algorithms. Processing such as noise reduction and demosaicing are implemented by using an AI network. A processing process is relatively complex. Many software and computing resources need to be invoked, for example, a GPU and an NPU.

The second MFNR algorithm may be alternatively different from the first MFNR algorithm. The first MFNR algorithm is an AI algorithm, and the second MFNR algorithm is a conventional algorithm. Noise reduction, demosaicing, and the like are completed in a collaboration manner of software and hardware. A resource that needs to be invoked is, for example, an ISP, a CPU, and a DSP. In this case, a completion time is shorter.

Figure 15:
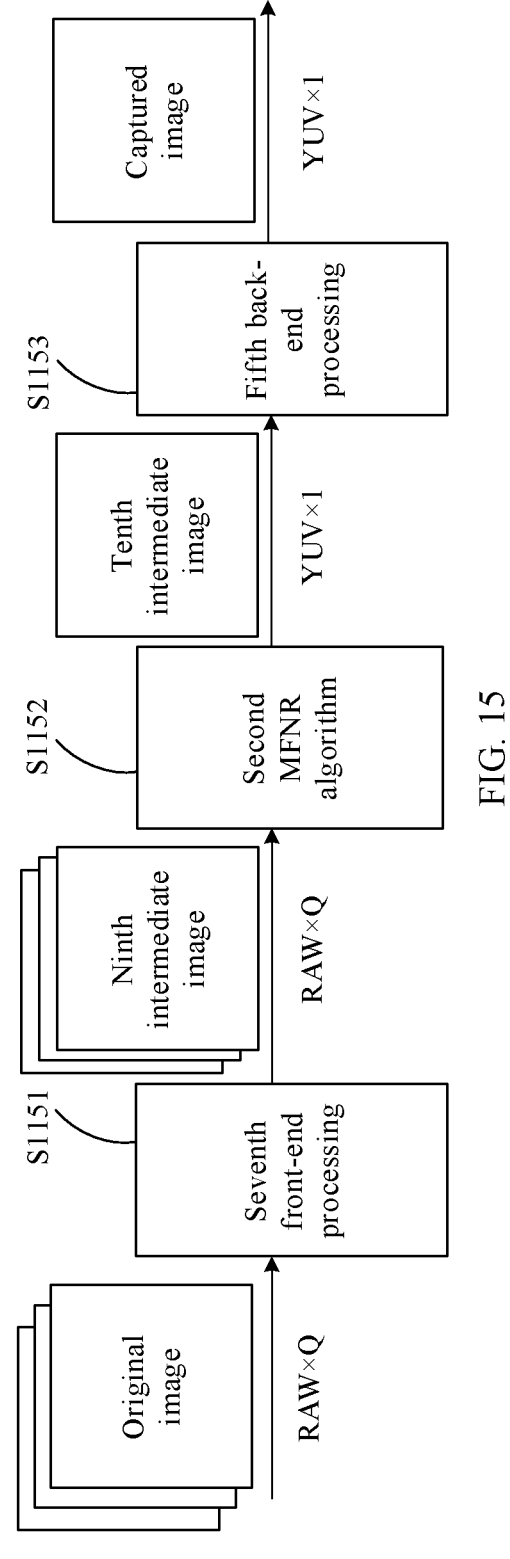
FIG. 15 is a schematic flowchart of still another image processing method according to an embodiment of this application.

On this basis, the second MFNR algorithm is used to process the Q frames of original images captured by the camera in this time, to obtain a corresponding captured image. As shown in FIG. 15, the following steps S1151 to S1153 may be included.

S1151: Perform seventh front-end processing on the Q frames of original images captured by the camera in this time, to obtain Q frames of ninth intermediate images.

Steps included in the seventh front-end processing may be the same as the steps included in the foregoing first front-end processing. For details, refer to the foregoing description. Certainly, the seventh front-end processing may further include another step. This is not limited in this embodiment of this application.

S1152: Process the Q frames of ninth intermediate images by using the second MFNR algorithm, to obtain one frame of tenth intermediate image.

The ninth intermediate image is an image in the RAW domain. The tenth intermediate image is an image in the YUV domain.

S1153: Perform fifth back-end processing on the frame of tenth intermediate image, to obtain a corresponding captured image.

The fifth back-end processing is used to correct the tenth intermediate image.

Steps included in the fifth back-end processing may be the same as the steps included in the foregoing first back-end processing. For details, refer to the description of FIG. 11. Certainly, the fifth back-end processing may further include another step. This is not limited in this embodiment of this application.

After the fifth back-end processing, the captured image is an image in the YUV domain, or format conversion may be further performed to convert the captured image into another format commonly used for display, for example, JPEG.

S116: If the detected dynamic range in the to-be-photographed scene is greater than the second dynamic range threshold, determine a second HDR algorithm as the first photographing algorithm, and process, by using the second HDR algorithm, the original image captured by the camera in this time, to obtain a corresponding captured image.

With reference to steps S105, S111, S112, and S114, when the to-be-photographed object is dynamic, the moving speed is greater than the preset speed threshold, and the illuminance in the to-be-photographed scene is greater than the second illuminance threshold. The dynamic range is greater than the second dynamic range threshold. It indicates that the moving amplitude of the to-be-photographed object is relatively large, and the to-be-photographed object is in a fast moving state in a high dynamic range. In this case, if processing is performed by using a general photographing algorithm, an over-exposure problem may occur in an obtained captured image. In this case, in this embodiment of this application, the second HDR algorithm may be selected to perform processing, to adjust the dynamic range of the image and image details, so that content presented in the obtained captured image is more real, to improve image quality.

Optionally, the second HDR algorithm is used to process the Q frames of original images captured by the camera in this time, to obtain the corresponding captured image.

It should be understood that, because the camera can capture 10 frames of original images in response to one tap operation, when processing is performed by using the second HDR algorithm, some frames of original images may be selected for processing, or all frames of original images may be selected for processing. This is not limited in this embodiment of this application. Herein, a quantity of frames processed by using the second HDR algorithm may be the same as a quantity of frames processed by using the second night mode algorithm.

In this embodiment of this application, when the second HDR algorithm is selected to process a plurality of frames of original images, the plurality of frames of original images may separately correspond to different exposure values.

Optionally, the second HDR algorithm may be the same as or different from the first HDR algorithm. This is not limited in this embodiment of this application.

For example, the second HDR algorithm and the first HDR algorithm may be the same and both are AI algorithms. Processing such as noise reduction, demosaicing, and dynamic range compression are implemented by using an AI network. A processing process is relatively complex. Many software and computing resources need to be invoked, for example, a GPU and an NPU.

The second HDR algorithm may be alternatively different from the first HDR algorithm. The first HDR algorithm is an AI algorithm, and the second HDR algorithm is a conventional algorithm. Noise reduction, demosaicing, dynamic range compression, and the like are completed in a collaboration manner of software and hardware. A resource that needs to be invoked is, for example, an ISP, a CPU, and a DSP. In this case, a completion time is shorter.

Figure 16:
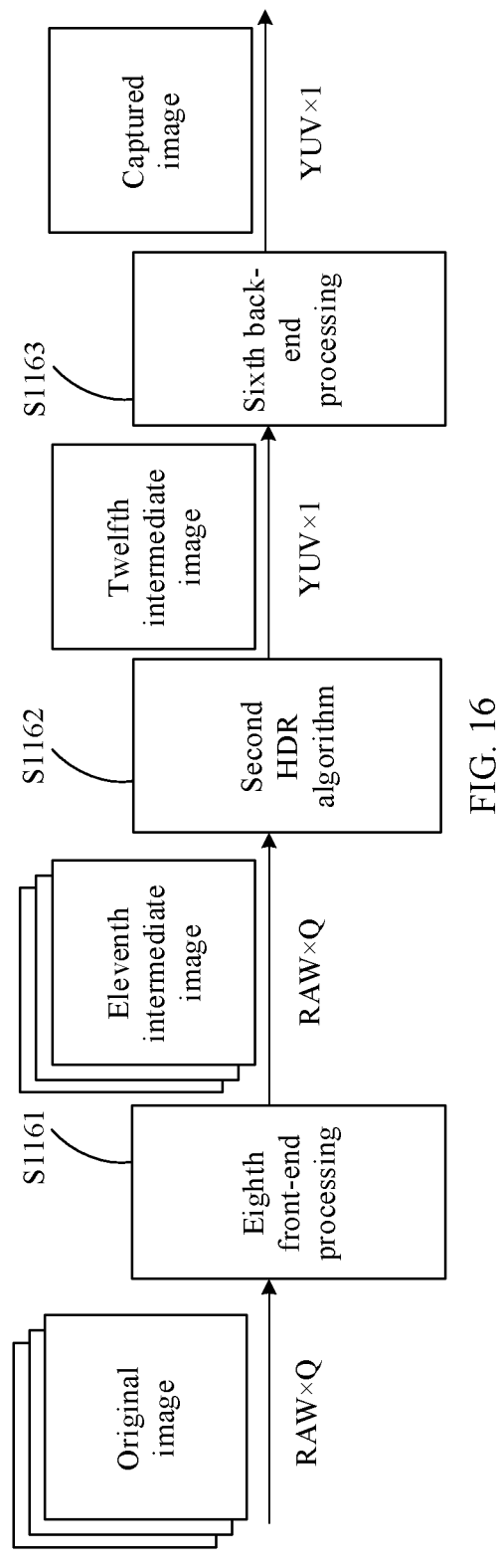
FIG. 16 is a schematic flowchart of still another image processing method according to an embodiment of this application.

On this basis, the second HDR algorithm is used to process the Q frames of original images captured by the camera in this time, to obtain a corresponding captured image. As shown in FIG. 16, the following steps S1161 to S1163 may be included.

S1161: Perform eighth front-end processing on the Q frames of original images captured by the camera in this time, to obtain Q frames of eleventh intermediate images.

Steps included in the eighth front-end processing may be the same as the steps included in the foregoing first front-end processing. For details, refer to the foregoing description. Currently, the eighth front-end processing may further include another step. This is not limited in this embodiment of this application.

S1162: Process the Q frames of eleventh intermediate images by using the second HDR algorithm, to obtain one frame of twelfth intermediate image.

The eleventh intermediate image is an image in the RAW domain. The twelfth intermediate image is an image in the YUV domain.

S1163: Perform sixth back-end processing on the frame of twelfth intermediate image, to obtain a corresponding captured image.

The sixth back-end processing is used to correct the twelfth intermediate image.

Steps included in the sixth back-end processing may be the same as the steps included in the foregoing first back-end processing. For details, refer to the description of FIG. 11. Certainly, the sixth back-end processing may further include another step. This is not limited in this embodiment of this application.

After the sixth back-end processing, the captured image is an image in the YUV domain, or format conversion may be further performed to convert the captured image into another format commonly used for display, for example, JPEG.

S117: In step S111, if it is detected that the moving speed of the to-be-photographed object in the to-be-photographed scene is less than or equal to the preset speed threshold, a single-frame algorithm may be determined as the first photographing algorithm, and the original image captured by the camera in this time may be processed by using the single-frame algorithm, to obtain a corresponding captured image.

With reference to steps S111 and S117, when it is detected that the to-be-photographed object in the to-be-photographed scene is dynamic, and the moving speed is less than or equal to the preset speed threshold, it indicates that the moving amplitude of the to-be-photographed object is relatively small, which may be referred to as a slow moving state. In this case, processing may be performed by using a general photographing algorithm. For example, the single-frame algorithm is used to perform processing.

Optionally, the single-frame algorithm is used to process one frame of original image captured by the camera in this time, to obtain the corresponding captured image.

Optionally, the single-frame algorithm includes ninth front-end processing and seventh back-end processing.

Figure 17:
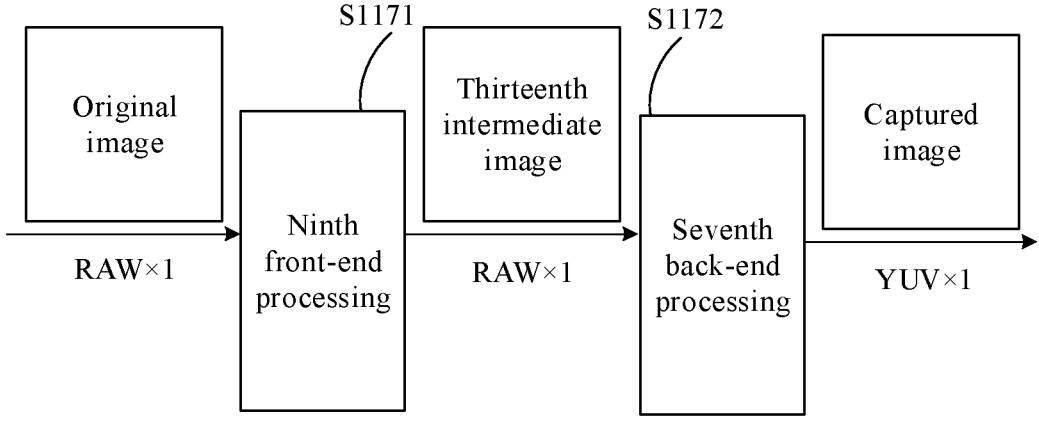
FIG. 17 is a schematic flowchart of still another image processing method according to an embodiment of this application.

On this basis, the single-frame algorithm is used to process the frame of original image captured by the camera in this time, to obtain a corresponding captured image. As shown in FIG. 17, the following steps S1171 and S1172 may be included.

S1171: Perform the ninth front-end processing on the frame of original image captured by the camera in this time, to obtain one frame of thirteenth intermediate image.

Steps included in the ninth front-end processing may be the same as the steps included in the foregoing first front-end processing. For details, refer to the foregoing description. Currently, the ninth front-end processing may further include another step. This is not limited in this embodiment of this application.

The thirteenth intermediate image is an image in the RAW domain.

S1172: Perform the seventh back-end processing on the frame of thirteenth intermediate image, to obtain a corresponding captured image.

The seventh back-end processing is used to correct the thirteenth intermediate image.

Steps included in the seventh back-end processing may be the same as the steps included in the foregoing first back-end processing. For details, refer to the description of FIG. 11. Certainly, the seventh back-end processing may further include another step. This is not limited in this embodiment of this application.

After the seventh back-end processing, the captured image is an image in the YUV domain, or format conversion may be further performed to convert the captured image into another format commonly used for display, for example, JPEG.

In this embodiment, in this application, determining that the quantity of times of waiting for photographing in the background is relatively small may also be referred to as determining that the electronic device is in a common photographing state. A plurality of types of detection are performed on the to-be-photographed scene. When it is determined based on the detection result whether the to-be-photographed object is static, the to-be-photographed scene may be further divided into a plurality of cases based on detected illuminance and detected dynamic ranges. Then, for various cases, different quantities of frames of original images are processed by using different algorithms. Therefore, a method for processing an original image can be refined, and quality and effect of a captured image obtained in each case can be improved adaptively.

Figure 18:
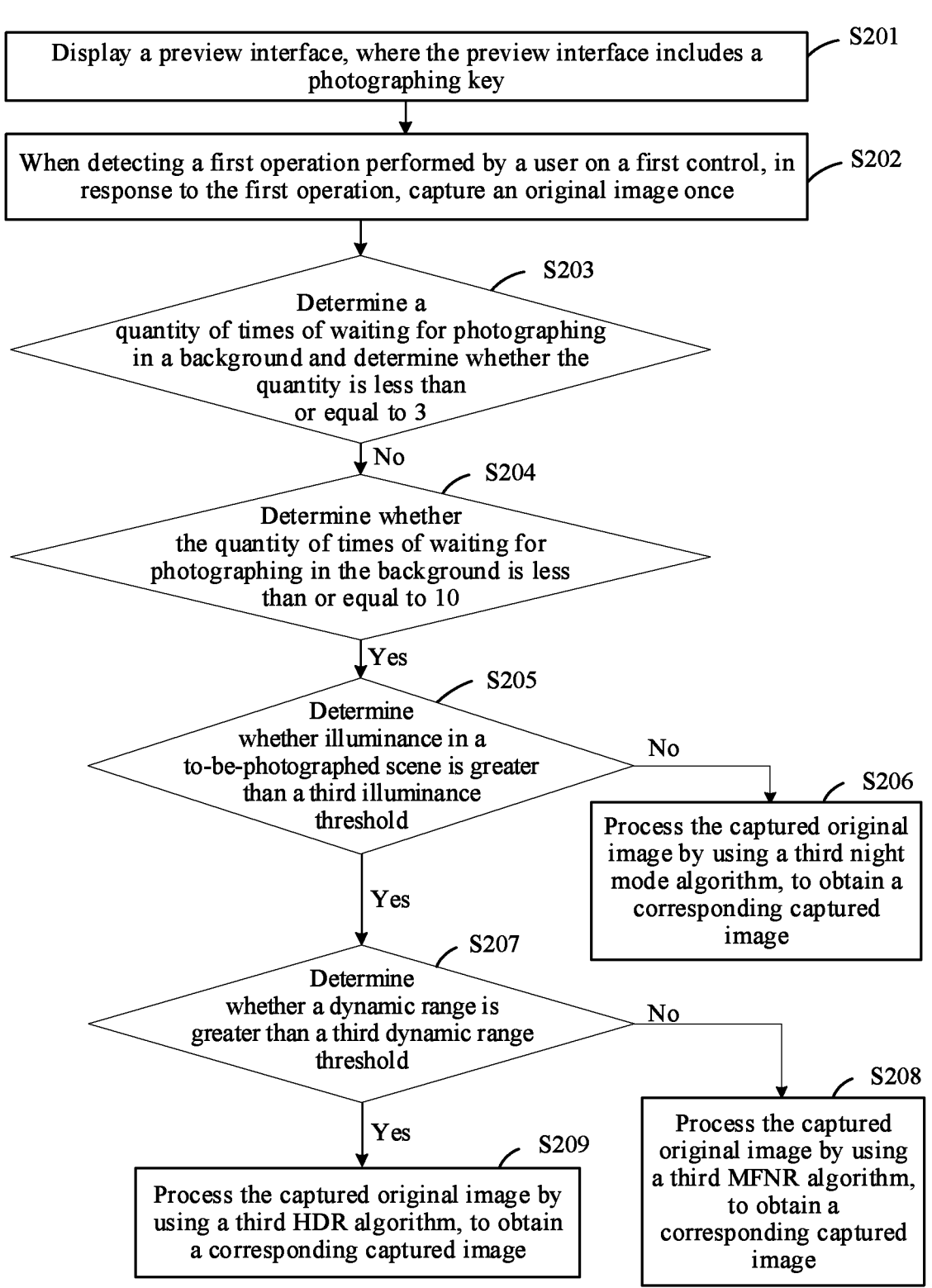
FIG. 18 is a schematic flowchart of a second photographing algorithm according to an embodiment of this application.

Embodiment 2 provides an image processing method. As shown in FIG. 18, the method may include the following steps S201 to S209.

S201: An electronic device displays a first interface. The first interface includes a preview image and a photographing key. The photographing key indicates a photo mode.

S202: When detecting a tap operation performed by a user on the photographing key, in response to the tap operation, the electronic device captures an original image once by using a camera.

S203: Determine a quantity of times of waiting for photographing in a background.

For example, after the user enables the camera, a current accumulated quantity of photographing times is accumulated from 0. When detecting a tap operation A1 to a tap operation A6 performed by the user on the photographing key, in response to the tap operation A6, the electronic device captures an original image once by using the camera, and the current accumulated quantity of photographing times is 6. It is assumed that a quantity of times of processed photographing and a quantity of times of photographing being processed are both 1 in this case. Therefore, the quantity of times of waiting for photographing in the background can be obtained through subtracting the quantity of times of processed photographing and the quantity of times of photographing being processed from the current accumulated quantity of photographing times, that is, 4.

S204: Because the quantity of times of waiting for photographing in the background is 4 and is greater than 3, it may be further determined whether the quantity of times of waiting for photographing in the background is less than or equal to 10.

S205: Because the quantity of times of waiting for photographing in the background is 4 and is less than 10, it may be further determined, based on a detected illuminance result in a to-be-photographed scene, whether illuminance is greater than a third illuminance threshold.

The quantity of times of waiting for photographing in the background is greater than M and is less than N. It indicates that there is data but not much waiting to be processed in the background in this case. This case may also be referred to as a continuous photographing state.

It should be understood that a value of the third illuminance threshold may be set and modified as required, and the value of the third illuminance threshold may be the same as or different from a value of each of a second illuminance threshold and a first illuminance threshold. This is not limited in this embodiment of this application.

Herein, that the third illuminance threshold is the same as the first illuminance threshold and the second illuminance threshold that each are 100 Lux is used as an example for description.

S206: If it is detected that the illuminance in the to-be-photographed scene is less than or equal to the third illuminance threshold, determine a third night mode algorithm as a second photographing algorithm, and process, by using the third night mode algorithm, the original image captured by the camera in this time, to obtain a corresponding captured image.

With reference to steps S203, S204, and S205, when it is detected that the quantity of times of waiting for photographing in the background is neither more nor less, and the illuminance in the to-be-photographed scene is less than or equal to the third illuminance threshold, it indicates that the user performs continuous photographing in a relatively dark environment. In this case, processing is performed by using a general photographing algorithm, and an obtained captured image is relatively fuzzy and details cannot be clearly seen. In this case, in this embodiment of this application, the third night mode algorithm with relatively small time consumption may be selected to perform processing. In this way, image clarity can be improved, and processing efficiency can also be improved, to reduce the quantity of times of waiting for photographing in the background and consider both effect and performance.

Optionally, R frames of original images captured by the camera in this time may be processed by using the third night mode algorithm, to obtain a corresponding captured image.

It should be understood that because the quantity of times of waiting for photographing in the background is relatively large, when processing is performed by using the third night mode algorithm, a relatively small quantity of original images may be selected for processing. A specific quantity of frames may be selected as required. This is not limited in this embodiment of this application. Herein, $1 \leq R \leq Q < P$, and a value of R should be an integer.

For rotation of the plurality of frames of original images, refer to the description of step S107. Details are not described herein again.

Optionally, the third night mode algorithm may be the same as or different from each of the first night mode algorithm and the second night mode algorithm. This is not limited in this embodiment of this application.

Figure 19:
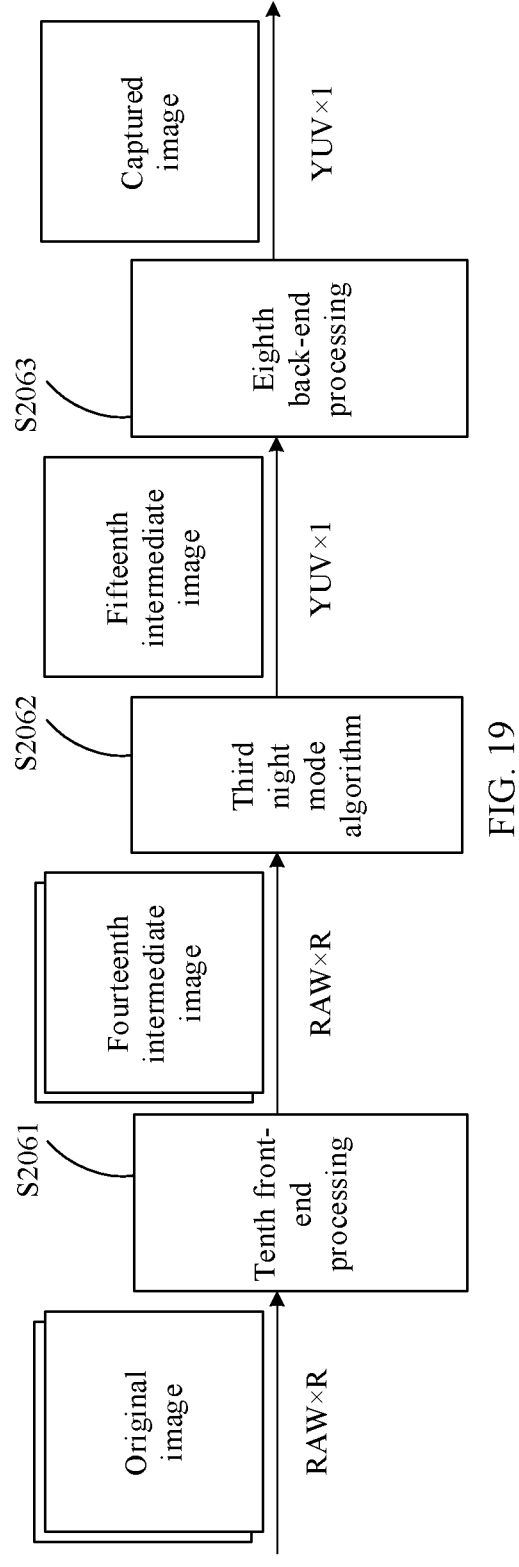
FIG. 19 is a schematic flowchart of still another image processing method according to an embodiment of this application.

On this basis, the third night mode algorithm is used to process the R frames of original images captured by the camera in this time, to obtain a corresponding captured image. As shown in FIG. 19, the following steps S2061 to S2063 may be included.

S2061: Perform tenth front-end processing on the R frames of original images captured by the camera in this time, to obtain R frames of fourteenth intermediate images.

For example, when the camera captures 10 frames of original images in this time, it is assumed that R=1. One frame may be selected for the tenth front-end processing, to obtain one frame of fourteenth intermediate image.

Steps included in the tenth front-end processing may be the same as the steps included in the foregoing first front-end processing. For details, refer to the foregoing description. Certainly, the tenth front-end processing may further include another step. This is not limited in this embodiment of this application.

S2061: Process the R frames of fourteenth intermediate images by using the third night mode algorithm, to obtain one frame of fifteenth intermediate image.

The fourteenth intermediate image is an image in a RAW domain. The fifteenth intermediate image is an image in a YUV domain.

S2063: Perform eighth back-end processing on the frame of fifteenth intermediate image, to obtain a corresponding captured image.

The eighth back-end processing is used to correct the fifteenth intermediate image.

Steps included in the eighth back-end processing may be the same as the steps included in the foregoing first back-end processing. For details, refer to the description of FIG. 11. Certainly, the eighth back-end processing may further include another step. This is not limited in this embodiment of this application.

After the eighth back-end processing, the captured image is an image in the YUV domain, or format conversion may be further performed to convert the captured image into another format commonly used for display, for example, JPEG.

S207: If it is detected that the illuminance in the to-be-photographed scene is greater than the third illuminance threshold, further determine whether a dynamic range result detected in the to-be-photographed scene is greater than a third dynamic range threshold.

It should be understood that a value of the third dynamic range threshold may be set and modified as required, and the value of the third dynamic range threshold may be the same as or different from a value of each of a first dynamic range threshold and a second dynamic range threshold. This is not limited in this embodiment of this application.

208: If the detected dynamic range in the to-be-photographed scene is less than or equal to the third dynamic range threshold, determine a third MFNR algorithm as the second photographing algorithm, and process, by using the third MFNR algorithm, the original image captured by the camera in this time, to obtain a corresponding captured image.

With reference to steps S203, S204, S205, and S208, when it is detected that the quantity of times of waiting for photographing in the background is neither more nor less, the illuminance in the to-be-photographed scene is greater than the third illuminance threshold, and the dynamic range is less than or equal to the third dynamic range threshold, it indicates that the user performs continuous photographing in a bright environment with a relatively small dynamic range. In this case, processing is performed by using a general photographing algorithm, and an obtained captured image has relatively loud noise. In addition, a dynamic range is relatively small, and content is unreal. In this case, in this embodiment of this application, the third MFNR algorithm with relatively small time consumption may be selected to perform processing. In this way, noise is reduced and a dynamic range of a captured image is expanded, and processing efficiency can also be improved, to reduce the quantity of times of waiting for photographing in the background and consider both effect and performance.

Optionally, the third MFNR algorithm is used to process the R frames of original images captured by the camera in this time, to obtain the corresponding captured image.

It should be understood that because the quantity of times of waiting for photographing in the background is relatively large, when processing is performed by using the third MFNR algorithm, a relatively small quantity of original images may be selected for processing. A specific quantity of frames may be selected as required. This is not limited in this embodiment of this application. Herein, a quantity of frames processed by using the third MFNR algorithm may be the same as a quantity of frames processed by using the third night mode algorithm.

In this embodiment of this application, when the third MFNR algorithm is selected to process a plurality of frames of original images, exposure times of the plurality of frames of original images are the same.

Optionally, the third MFNR algorithm may be the same as or different from each of a first MFNR algorithm and the second MFNR algorithm. This is not limited in this embodiment of this application.

Figure 20:
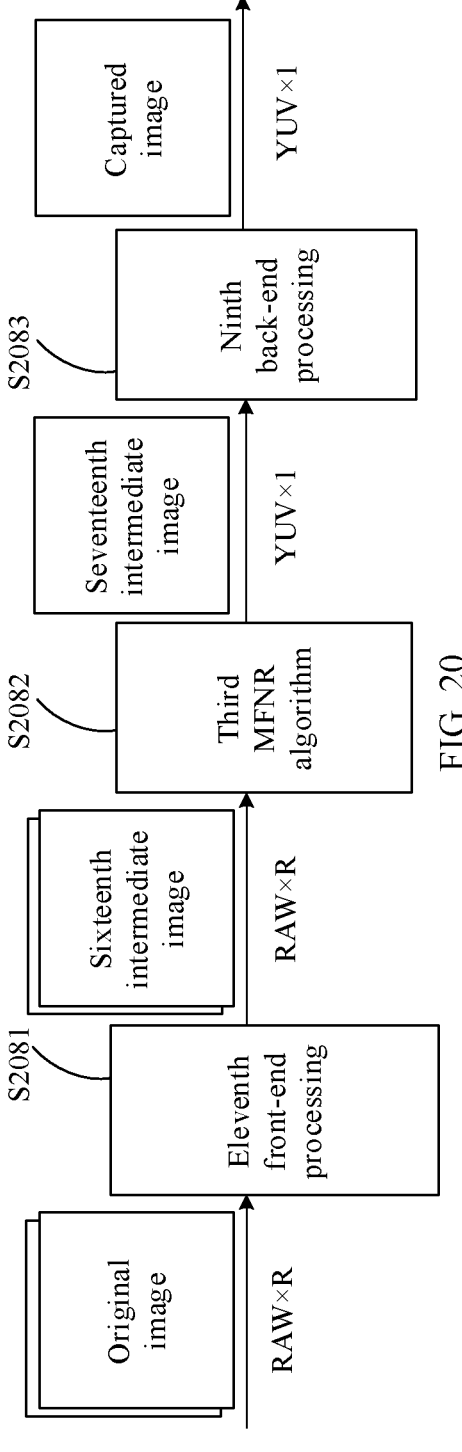
FIG. 20 is a schematic flowchart of still another image processing method according to an embodiment of this application.

On this basis, the third MFNR algorithm is used to process the R frames of original images captured by the camera in this time, to obtain a corresponding captured image. As shown in FIG. 20, the following steps S2081 to S2083 may be included.

S2081: Perform eleventh front-end processing on the R frames of original images captured by the camera in this time, to obtain R frames of sixteenth intermediate images.

Steps included in the eleventh front-end processing may be the same as the steps included in the foregoing first front-end processing. For details, refer to the foregoing description. Certainly, the eleventh front-end processing may further include another step. This is not limited in this embodiment of this application.

S2082: Process the R frames of sixteenth intermediate images by using the third MFNR algorithm, to obtain one frame of seventeenth intermediate image.

The sixteenth intermediate image is an image in the RAW domain. The seventeenth intermediate image is an image in the YUV domain.

S2083: Perform ninth back-end processing on the frame of seventeenth intermediate image, to obtain a corresponding captured image.

The ninth back-end processing is used to correct the seventeenth intermediate image.

Steps included in the ninth back-end processing may be the same as the steps included in the foregoing first back-end processing. For details, refer to the description of FIG. 11. Certainly, the ninth back-end processing may further include another step. This is not limited in this embodiment of this application.

After the ninth back-end processing, the captured image is an image in the YUV domain, or format conversion may be further performed to convert the captured image into another format commonly used for display, for example, JPEG.

S209: If the detected dynamic range in the to-be-photographed scene is greater than the third dynamic range threshold, determine a third HDR algorithm as the second photographing algorithm, and process, by using the third HDR algorithm, the original image captured by the camera in this time, to obtain a corresponding captured image.

With reference to steps S203, S204, S205, and S207, when it is detected that the quantity of times of waiting for photographing in the background is neither more nor less, the illuminance in the to-be-photographed scene is greater than the third illuminance threshold, and the dynamic range is greater than the third dynamic range threshold, it indicates that the user performs continuous photographing in a bright environment with a high dynamic range. In this case, processing is performed by using a general photographing algorithm, and an over-exposure problem may occur in an obtained captured image. In this case, in this embodiment of this application, the third HDR algorithm with relatively small time consumption may be selected to perform processing, to adjust a dynamic range of an image and enhance image details, so that content presented in a captured image is more real. In addition, processing efficiency can be improved, the quantity of times of waiting for photographing in the background can be reduced, and effect and performance are both considered.

Optionally, the third HDR algorithm is used to process the R frames of original images captured by the camera in this time, to obtain the corresponding captured image.

It should be understood that because the quantity of times of waiting for photographing in the background is relatively large, when processing is performed by using the third HDR algorithm, a relatively small quantity of original images may be selected for processing. A specific quantity of frames may be selected as required. This is not limited in this embodiment of this application. Herein, a quantity of frames processed by using the third HDR algorithm may be the same as a quantity of frames processed by using the third night mode algorithm.

In this embodiment of this application, when the third HDR algorithm is selected to process a plurality of frames of original images, the plurality of frames of original images may separately correspond to different exposure values.

Optionally, the third HDR algorithm may be the same as or different from each of a first HDR algorithm and a second HDR algorithm. This is not limited in this embodiment of this application.

Figure 21:
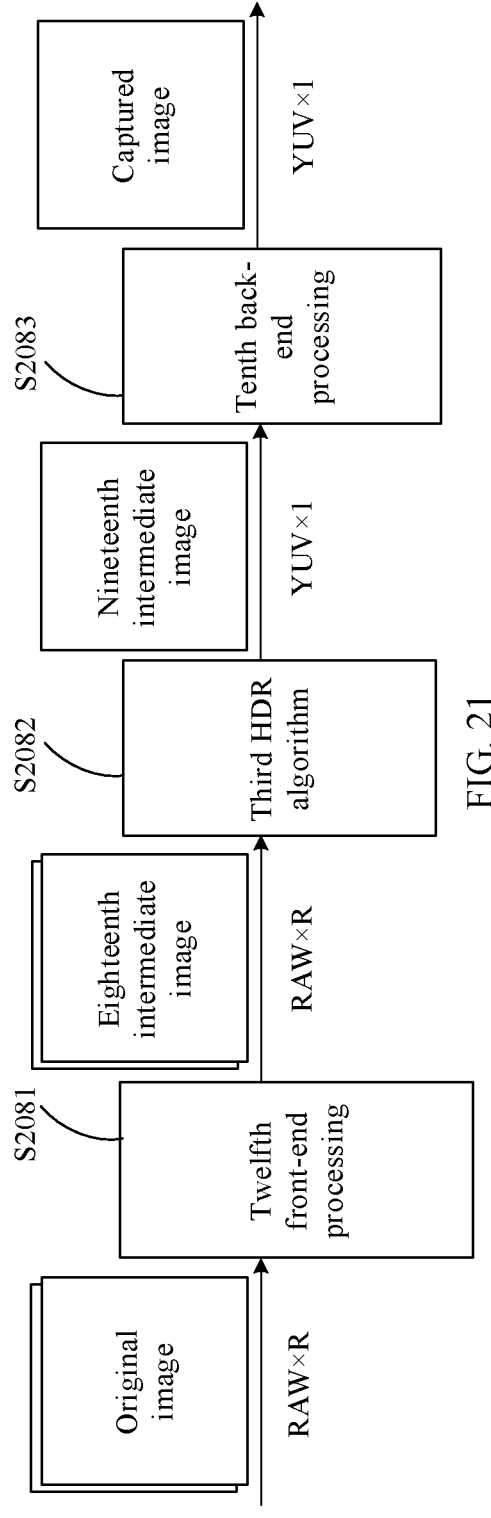
FIG. 21 is a schematic flowchart of still another image processing method according to an embodiment of this application.

On this basis, the third HDR algorithm is used to process the R frames of original images captured by the camera in this time, to obtain a corresponding captured image. As shown in FIG. 21, the following steps S2091 to S2093 may be included.

S2091: Perform twelfth front-end processing on the R frames of original images captured by the camera in this time, to obtain R frames of eighteenth intermediate images.

Steps included in the twelfth front-end processing may be the same as the steps included in the foregoing first front-end processing. For details, refer to the foregoing description. Currently, the twelfth front-end processing may further include another step. This is not limited in this embodiment of this application.

S2092: Process the R frames of eighteenth intermediate images by using the third HDR algorithm, to obtain one frame of nineteenth intermediate image.

The eighteenth intermediate image is an image in the RAW domain. The nineteenth intermediate image is an image in the YUV domain.

S2093: Perform tenth back-end processing on the frame of nineteenth intermediate image, to obtain a corresponding captured image.

The tenth back-end processing is used to correct the nineteenth intermediate image.

Steps included in the tenth back-end processing may be the same as the steps included in the foregoing first back-end processing. For details, refer to the description of FIG. 11. Certainly, the tenth back-end processing may further include another step. This is not limited in this embodiment of this application.

After the tenth back-end processing, the captured image is an image in the YUV domain, or format conversion may be further performed to convert the captured image into another format commonly used for display, for example, JPEG.

In this embodiment, in this application, determining that the quantity of times of waiting for photographing in the background is relatively large may also be referred to as determining that the electronic device is in a continuous photographing state. The to-be-photographed scene is divided into a plurality of cases based on detected illuminance and detected dynamic ranges. Then, for various cases, relatively small quantities of frames of original images are processed by using different algorithms. Therefore, a method for processing an original image can be refined, and quality of an obtained captured image is ensured and processing efficiency is also improved. In addition, the quantity of times of waiting for photographing in the background is reduced, and effect and performance are both considered.

Figures 22, 23:
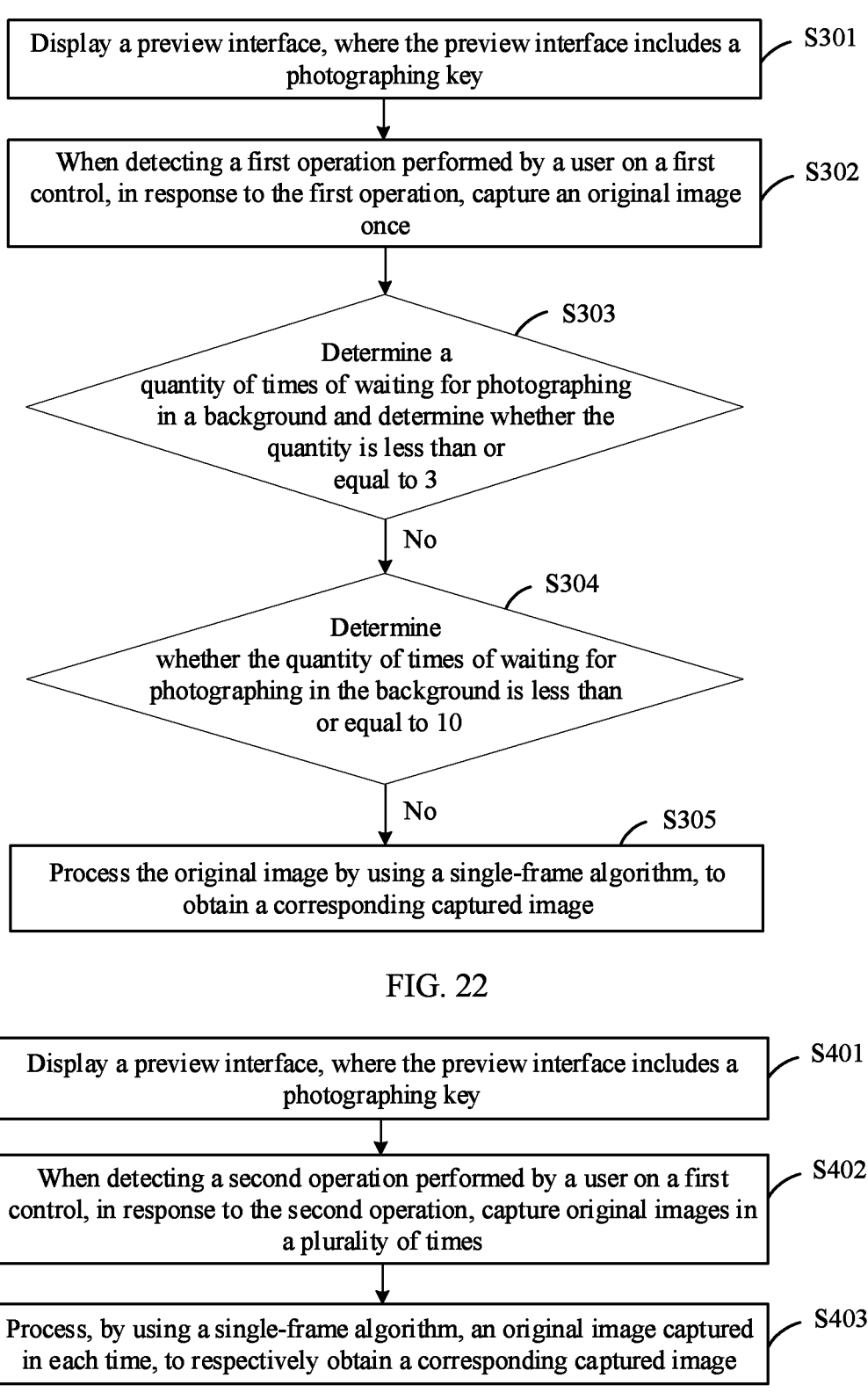
FIG. 22 is a schematic flowchart of a third photographing algorithm according to an embodiment of this application.
FIG. 23 is a schematic flowchart of a fourth photographing algorithm according to an embodiment of this application.

Embodiment 3 provides an image processing method. As shown in FIG. 22, the method may include the following steps S301 to S305.

S301: An electronic device displays a first interface. The first interface includes a preview image and a photographing key. The photographing key indicates a photo mode.

S302: When detecting a tap operation performed by a user on the photographing key, in response to the tap operation, the electronic device captures an original image once by using a camera.

S303: Determine a quantity of times of waiting for photographing in a background.

For example, after the user enables the camera, a current accumulated quantity of photographing times is accumulated from 0. When detecting a tap operation A1 to a tap operation A20 performed by the user on the photographing key, in response to the tap operation A20, the electronic device captures an original image once by using the camera, and the current accumulated quantity of photographing times is 20. It is assumed that a quantity of times of processed photographing is 5 and a quantity of times of photographing being processed is 1 in this case. Therefore, the quantity of times of waiting for photographing in the background can be obtained through subtracting the quantity of times of processed photographing and the quantity of times of photographing being processed from the current accumulated quantity of photographing times, that is, 14.

S304: Because the quantity of times of waiting for photographing in the background is 14 and is greater than 3, it may be further determined whether the quantity of times of waiting for photographing in the background is less than or equal to 10.

S305: Because the quantity of times of waiting for photographing in the background is 14 and is greater than 10, a single-frame algorithm may be determined as a third photographing algorithm, and the single-frame algorithm may be used to process the original image captured by the camera in this time, to obtain a corresponding captured image.

With reference to steps S303 and S304, when it is detected that the quantity of times of waiting for photographing in the background is greater than 10, it indicates that a quantity of tapping times of the user is very large and there is an excessively large volume of data waiting to be processed in the background. This case may also be referred to as being in a supper continuous photographing state. In this case, the single-frame algorithm with relatively small time consumption may be used to perform processing, to reduce the quantity of times of waiting for photographing in the background and improve processing efficiency.

Optionally, the single-frame algorithm is used to process one frame of original image captured by the camera in this time, to obtain the corresponding captured image.

For the description of the single-frame algorithm, refer to the content in step S117. Details are not described herein again.

In this embodiment, in this application, determining that the quantity of times of waiting for photographing in the background is very large may also be referred to as determining that the electronic device is in the supper continuous photographing state. The smallest quantity of original images may be processed by using a single-frame algorithm with the simplest processing steps and the smallest time consumption, to maximumly improve processing efficiency and reduce the quantity of times of waiting for photographing in the background, thereby avoiding a frame loss problem.

Embodiment 4 provides an image processing method. As shown in FIG. 23, the method may include the following steps S401 to S403.

S401: An electronic device displays a first interface. The first interface includes a preview image and a photographing key. The photographing key indicates a photo mode.

S402: When detecting a long press operation performed by a user on the photographing key, in response to the long press operation, the electronic device captures original images in a plurality of times by using a camera.

S403: Process, by using a single-frame algorithm, an original image captured in each time, to respectively obtain a corresponding captured image.

When the long press operation is detected, it indicates that the user expects to perform photographing for a plurality of times. In this case, there is an excessively large volume of data waiting to be processed in the background. This case may also be equivalent to a supper continuous photographing state. In this case, the single-frame algorithm with relatively small time consumption may be used to perform processing, to reduce the quantity of times of waiting for photographing in the background and improve processing efficiency.

Optionally, the single-frame algorithm is used to process one frame of original image captured by the camera in this time, to obtain the corresponding captured image.

For the description of the single-frame algorithm, refer to the content in step S117. Details are not described herein again.

In this embodiment, when it is determined in this application that the user performs the long press operation, the smallest quantity of original images may be processed by using a single-frame algorithm with the simplest processing steps and the smallest time consumption, to maximumly improve processing efficiency and reduce the quantity of times of waiting for photographing in the background, thereby avoiding a frame loss problem.

With reference to the steps of the foregoing embodiments, the following provides two examples to describe an overall image processing process.

Figure 24:
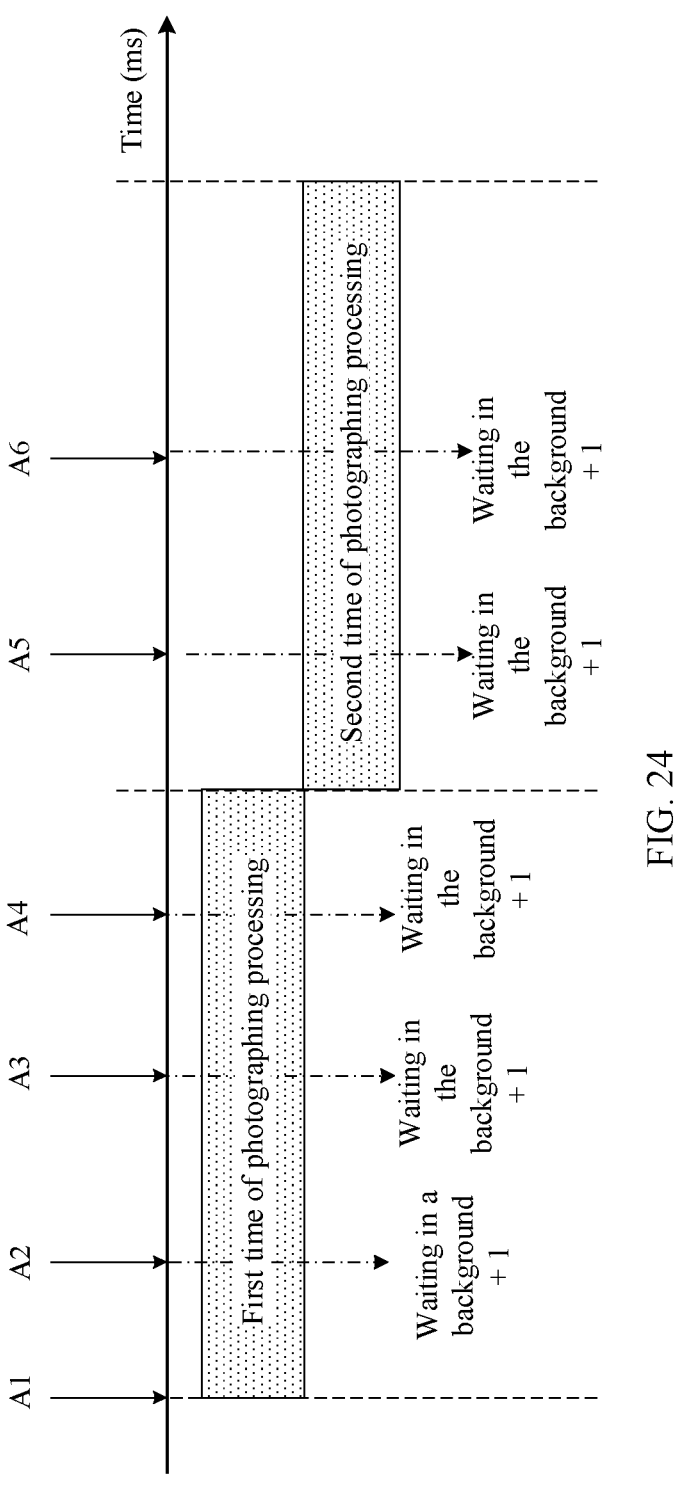
FIG. 24 is a diagram of another photographing progress according to an embodiment of this application.

Example 1: With reference to FIG. 24, after the user enables the camera, a current accumulated quantity of photographing times is accumulated from 0. When detecting a tap operation A1 performed by the user on the photographing key, in response to the tap operation A1, the electronic device captures an original image once by using the camera, and the current accumulated quantity of photographing times is 1. In this case, a quantity of times of processed photographing and a quantity of times of photographing being processed are both zero. Therefore, the quantity of times of waiting for photographing in the background can be obtained through subtracting the quantity of times of processed photographing and the quantity of times of photographing being processed from the current accumulated quantity of photographing times, that is, 1. In this case, because the quantity of times of waiting for photographing in the background is less than 3, the foregoing steps S104 to S117 may be performed, to obtain a captured image triggered by the tap operation A1.

In addition, after the tap operation A1 is performed, the user further quickly performs a tap operation A2, a tap operation A3, and a tap operation A4 on the photographing key.

When detecting the tap operation A2 performed by the user on the photographing key, in response to the tap operation A2, the electronic device captures an original image once by using the camera. The current accumulated quantity of photographing times is 2. In this case, the original image captured in response to the tap operation A1 is still being processed. Therefore, the original image captured in this time and related data first enter the background to wait.

When detecting the tap operation A3 performed by the user on the photographing key, in response to the tap operation A3, the electronic device captures an original image once by using the camera. The current accumulated quantity of photographing times is 3. In this case, the original image captured in response to the tap operation A1 is still being processed. Therefore, the original image captured in this time and related data first enter the background to wait.

Similarly, when detecting the tap operation A4 performed by the user on the photographing key, in response to the tap operation A4, the electronic device captures an original image once by using the camera. The current accumulated quantity of photographing times is 4. In this case, the original image captured in response to the tap operation A1 is still being processed. Therefore, the original image captured in this time and related data first enter the background to wait.

Then, after processing of the original image captured in response to the tap operation A1 is completed, for 3 times of waiting for photographing in the background, the original image captured in response to the tap operation A4 is processed according to a time rule from recent to past. In other words, a second time of photographing processing should be used to process the original image captured by the electronic device by using the camera in response to the tap operation A4.

Therefore, next, the original image captured by the electronic device in response to the tap operation A4 by using the camera is processed. In this case, the quantity of times of processed photographing is 1 (processing of the original image captured in response to the tap operation A1 is completed), and the quantity of times of photographing being processed is 0. Therefore, the quantity of times of waiting for photographing in the background can be obtained through subtracting the quantity of times of processed photographing and the quantity of times of photographing being processed from the current accumulated quantity of photographing times, that is, 2. Because the quantity of times of waiting for photographing in the background is still less than 3, the foregoing steps S104 to S117 may be repeated, to obtain a captured image triggered by the tap operation A4.

In a process of processing the original image captured by the electronic device in response to the tap operation A4 by using the camera, the user further performs a tap operation A5 and a tap operation A6.

Similarly, when detecting the tap operation A5 performed by the user on the photographing key, in response to the tap operation A5, the electronic device captures an original image once by using the camera. The current accumulated quantity of photographing times is 5. In this case, the original image captured in response to the tap operation A4 is still being processed. Therefore, the original image captured in this time and related data first enter the background to wait.

Similarly, when detecting the tap operation A6 performed by the user on the photographing key, in response to the tap operation A6, the electronic device captures an original image once by using the camera. The current accumulated quantity of photographing times is 6. In this case, the original image captured in response to the tap operation A4 is still being processed. Therefore, the original image captured in this time and related data first enter the background to wait.

As time goes on, after processing of the original image captured in response to the tap operation A4 is completed, for 4 times of waiting for photographing in the background, an original image captured in response to the tap operation A6 is processed according to a time rule from recent to past. In other words, a third time of photographing processing should be used to process the original image captured by the electronic device by using the camera in response to the tap operation A6.

Therefore, after processing of the original image captured in response to the tap operation A4 is completed, next, the original image captured by the electronic device in response to the tap operation A6 by using the camera is processed. In this case, the quantity of times of processed photographing is 2 (processing of the original images captured in response to the tap operation A1 and the tap operation A4 is completed), and the quantity of times of photographing being processed is 0. Therefore, the quantity of times of waiting for photographing in the background can be obtained through subtracting the quantity of times of processed photographing and the quantity of times of photographing being processed from the current accumulated quantity of photographing times, that is, 4. Because the quantity of times of waiting for photographing in the background is greater than 3, the foregoing steps S204 to S208 need to be performed, to obtain a captured image triggered by the tap operation A6.

Then, after processing of the original image captured in response to the tap operation A6 is completed, the original image captured by the electronic device in response to the tap operation A5 by using the camera is processed. In this case, the quantity of times of processed photographing is 3 (processing of the original images captured in response to the tap operation A1, the tap operation A4, and the tap operation A6 is completed), and the quantity of times of photographing being processed is 0. Therefore, the quantity of times of waiting for photographing in the background can be obtained through subtracting the quantity of times of processed photographing and the quantity of times of photographing being processed from the current accumulated quantity of photographing times, that is, 3. In this case, because the quantity of times of waiting for photographing in the background is equal to 3, the foregoing steps S104 to S117 may be performed, to obtain a captured image triggered by the tap operation A5.

After processing of the original image captured in response to the tap operation A5 is completed, the original image captured by the electronic device in response to the tap operation A3 by using the camera is processed. In this case, the quantity of times of processed photographing is 4 (processing of the original images captured in response to the tap operation A1, the tap operation A4, the tap operation A6, and the tap operation A5 is completed), and the quantity of times of photographing being processed is 0. Therefore, the quantity of times of waiting for photographing in the background can be obtained through subtracting the quantity of times of processed photographing and the quantity of times of photographing being processed from the current accumulated quantity of photographing times, that is, 2. In this case, because the quantity of times of waiting for photographing in the background is less than 3, the foregoing steps S104 to S117 may be performed, to obtain a captured image triggered by the tap operation A3.

Finally, after processing of the original image captured in response to the tap operation A3 is completed, the original image captured by the electronic device in response to the tap operation A2 by using the camera is processed. In this case, the quantity of times of processed photographing is 5 (processing of the original images captured in response to the tap operation A1, the tap operation A4, the tap operation A6, the tap operation A5, and the tap operation A3 is completed), and the quantity of times of photographing being processed is 0. Therefore, the quantity of times of waiting for photographing in the background can be obtained through subtracting the quantity of times of processed photographing and the quantity of times of photographing being processed from the current accumulated quantity of photographing times, that is, 1. In this case, because the quantity of times of waiting for photographing in the background is less than 3, the foregoing steps S104 to S117 may be performed, to obtain a captured image triggered by the tap operation A2.

Figure 25:
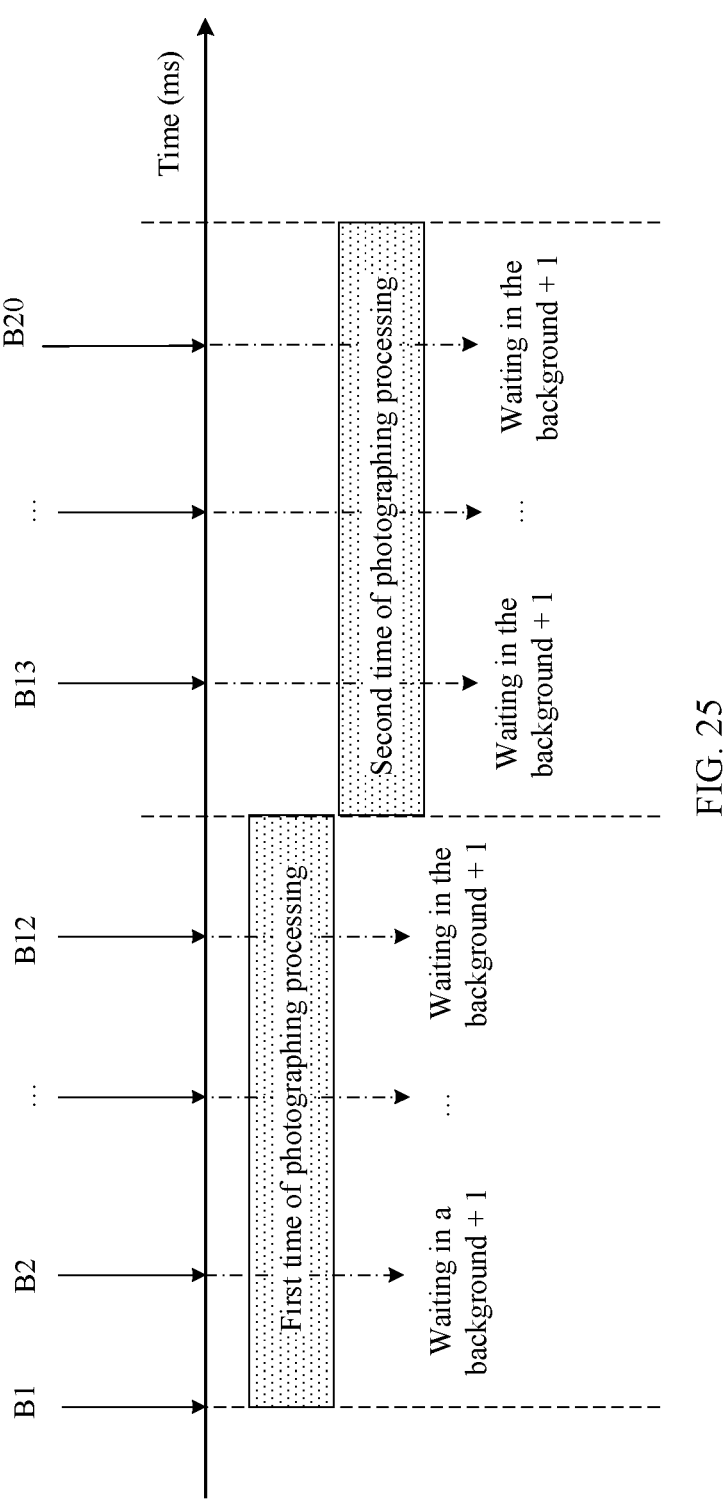
FIG. 25 is a diagram of still another photographing progress according to an embodiment of this application.

Example 2: With reference to FIG. 25, after the user enables the camera, when detecting that the user performs a long press operation on the photographing key, in response to the long press operation, the electronic device captures original images in 20 times by using the camera. This is equivalent to instructing the camera to perform 20 times of photographing (for example, B1 to B20).

First, an original image captured in a first time of photographing B1 is processed by using a single-frame algorithm. In a process of processing the original image captured in the first time of photographing B1, the camera further performs photographing in B2 to B12.

It should be understood that, when performing a second time of photographing B2, the electronic device captures an original image once by using the camera. In this case, the original image captured in the first time of photographing B1 is still being processed. Therefore, the original image captured in this time and related data first enter the background to wait.

Similarly, when a third time of photographing B3 to a twelfth time of photographing B12 are being performed, because the original image captured in the first time of photographing B1 is still being processed, an original image captured in each time and related data both enter the background to wait.

Then, after processing of the original image captured in the first time of photographing B1 is completed, in 11 times of waiting for photographing in the background, an original image captured in the twelfth time of photographing B12 is first processed according to a time rule from recent to past. In other words, the original image captured in the twelfth time of photographing B12 should be processed in a second time of photographing processing.

Therefore, the original image captured in the twelfth time of photographing B12 is next processed by using a single-frame algorithm. In a process of processing the original image captured in the twelfth time of photographing B12, the camera further performs photographing in B13 to B20.

It should be understood that, when performing a thirteenth time of photographing B13, the electronic device captures an original image once by using the camera. In this case, the original image captured in the twelfth time of photographing B12 is still being processed. Therefore, the original image captured in this time and related data first enter the background to wait.

Similarly, when a fourteenth time of photographing B14 to a twentieth time of photographing B20 are being performed, because the original image captured in the twelfth time of photographing B12 is still being processed, an original image captured in each time and related data both enter the background to wait.

Then, after processing of the original image captured in the twelfth time of photographing B12 is completed, in 17 times of waiting for photographing in the background, according to a time rule from recent to past, an original image captured in the twentieth time of photographing B20 is first processed, and then an original image captured in a nineteenth time of photographing B19 is processed, until the original image captured in the second time of photographing B2 is processed. Each time of processing is performed by using a single-frame algorithm.

The foregoing describes in detail the image processing method provided in embodiments of this application. With reference to a display interface of an electronic device, the following describes how a user performs the image processing method provided in embodiments of this application.

Figure 26:
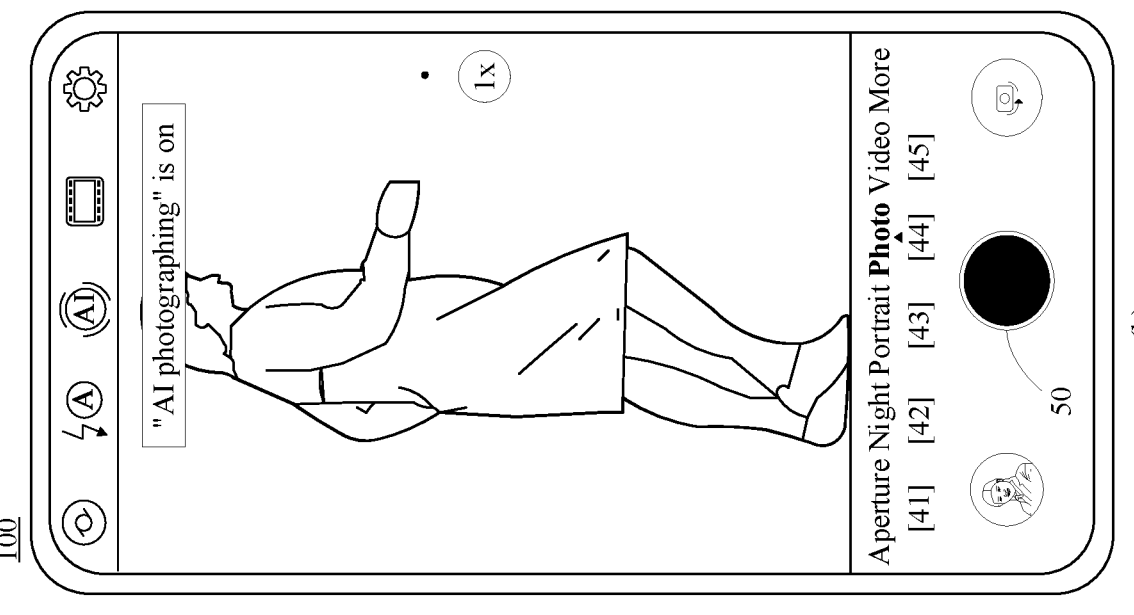
FIG. 26 is a diagram of display interfaces according to an embodiment of this application.
Figure 26:
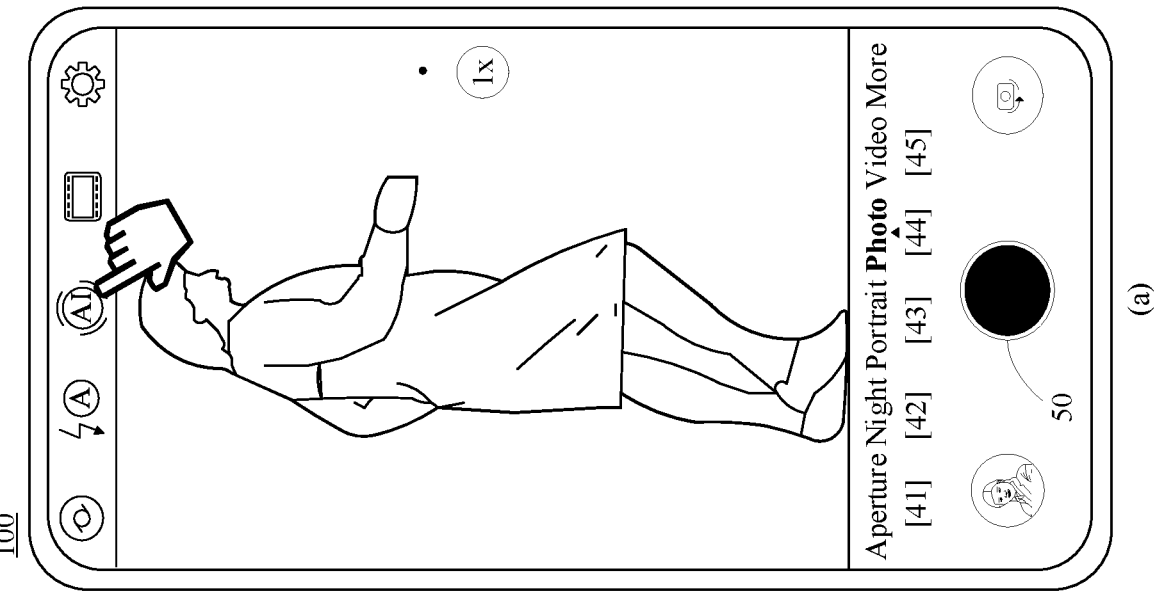

FIG. 26 is a diagram of display interfaces of an electronic device according to an embodiment of this application.

For example, when the electronic device 100 runs a camera application, in response to a tap operation of a user, the electronic device 100 displays a photographing interface shown in (a) in FIG. 26. A navigation bar is displayed on an upper part of the interface. An icon indicating "AI photographing" is displayed at a middle position.

In response to a tap operation performed by the user on "AI photographing", the electronic device 100 displays a prompt box shown in (b) in FIG. 26, and displays, on the interface, prompt information indicating that "AI photographing" is enabled. In this case, during photographing, the electronic device 100 may enable a program related to an image processing method provided in embodiments of this application.

It should be understood that, the foregoing is merely an example in which the user enables, on the display interface of the electronic device, the image processing method provided in embodiments of this application. Certainly, the image processing method provided in embodiments of this application may be alternatively enabled in another manner. Alternatively, the image processing method provided in embodiments of this application may be directly used in a photographing process by default. This is not limited in this embodiment of this application.

With reference to FIG. 1 to FIG. 26, the foregoing describes in detail the image processing method and the related display interface that are provided in embodiments of this application. With reference to FIG. 27 to FIG. 30, the following describes in detail an electronic device, an apparatus, and a chip that are provided in embodiments of this application. It should be understood that the electronic device, the apparatus, and the chip in embodiments of this application may perform various image processing methods above in embodiments of this application. In other words, for specific working processes of the following products, refer to corresponding processes in the foregoing method embodiments.

Figure 27:
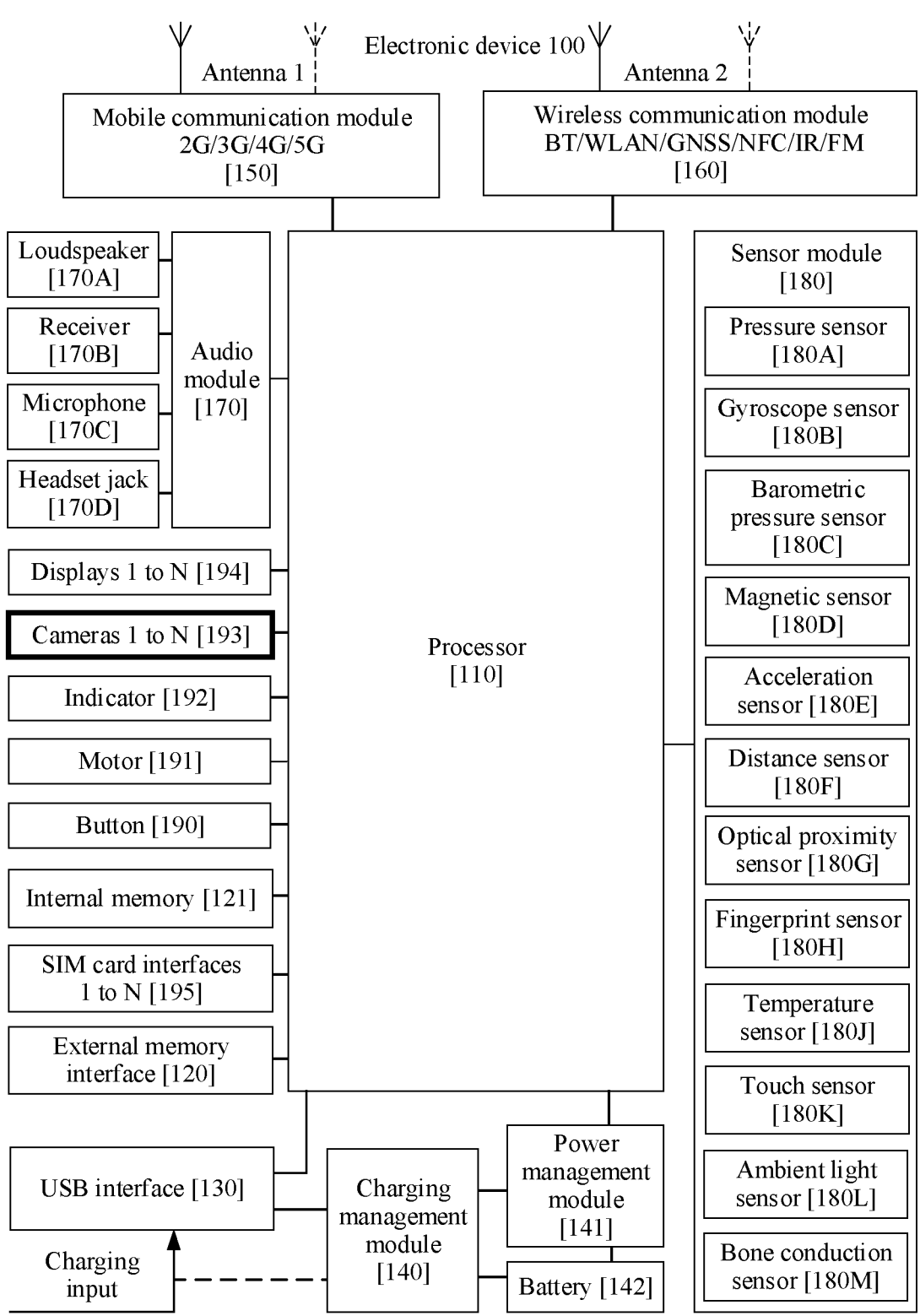
FIG. 27 is a diagram of a hardware structure of an electronic device according to an embodiment of this application.

FIG. 27 shows a hardware system applicable to an electronic device according to this application. The electronic device 100 may be configured to implement the image processing method described in the foregoing method embodiments.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, and an audio module 170, a loudspeaker 170A, a receiver 170B, a microphone 170C, a headset jack 170D, a sensor module 180, a button 190, a motor 191, an indicator 192, a camera 193, a display 194, a subscriber identity module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It should be noted that a structure shown in FIG. 27 does not constitute a specific limitation on the electronic device 100. In some other embodiments of this application, the electronic device 100 may include more or fewer components than the components shown in FIG. 27, or the electronic device 100 may include a combination of some components in the components shown in FIG. 27, or the electronic device 100 may include subcomponents of some components in the components shown in FIG. 27. The components shown in FIG. 27 may be implemented by hardware, software, or a combination of software and hardware.

The processor 110 may include one or more processing units. For example, the processor 110 may include at least one of the following processing units: an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU). Different processing units may be independent components, or may be integrated components.

The controller may be a nerve center and a command center of the electronic device 100. The controller may generate an operation control signal based on instruction operation code and a time sequence signal, to complete control of instruction fetching and instruction execution.

The processor 110 may be further provided with a memory configured to store instructions and data. In some embodiments, the memory in the processor 110 is a cache. The memory may store instructions or data recently used or cyclically used by the processor 110. If the processor 110 needs to use the instructions or the data again, the processor may directly invoke the instructions or the data from the memory. This avoids repeated access, and reduces a waiting time of the processor 110, thereby improving system efficiency.

In this embodiment of this application, the processor 110 may perform the following steps: displaying a first interface, where the first interface includes a preview image and a first control, and the first control indicates a photo mode; when detecting a first operation performed on the first control, in response to the first operation, capturing an original image once by using a camera; determining a quantity of times of waiting for photographing in the background; and processing the original image by using a first photographing algorithm, to obtain a corresponding captured image, when the quantity of times of waiting for photographing in the background is less than or equal to M; or processing the original image by using a second photographing algorithm, to obtain a corresponding captured image, when the quantity of times of waiting for photographing in the background is greater than M and less than or equal to N; and saving the captured image.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that an interface connection relationship between the modules illustrated in this embodiment of this application is merely an example for description, and does not constitute a limitation on a structure of the electronic device 100. In some other embodiments of this application, the electronic device 100 may alternatively use an interface connection manner different from that in the foregoing embodiment, or a combination of a plurality of interface connection manners.

The charging management module 140 is configured to receive a charging input from the charger. The charger may be a wireless charger, or may be a wired charger.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like. The power management module 141 is further configured to detect parameters such as a battery capacity, a battery cycle count, and a battery state of health (leakage and impedance).

The electronic device 100 implements a display function by using the GPU, the display 194, the application processor, and the like. The GPU is a microprocessor for image processing and is connected to the display 194 and the application processor. The GPU is configured to perform mathematical and geometric calculation for graphics rendering. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a micro-OLED, a quantum dot light emitting diode (quantum dot light emitting diodes, QLED), or the like. In some embodiments, the electronic device 100 may include 1 or N displays 194, where N is a positive integer greater than 1.

The electronic device 100 may implement a photographing function through the ISP, the camera 193, the video codec, the GPU, the display 194, the application processor, and the like.

The ISP is configured to process data fed back by the camera 193. For example, during photographing, a shutter is open, and light is transmitted to a photosensitive element of the camera through a lens. An optical signal is converted into an electrical signal. The photosensitive element of the camera transfers the electrical signal to the ISP for processing, so that the ISP converts the electrical signal into an image visible to naked eyes. The ISP may further perform algorithm optimization on noise, brightness, and complexion of the image. The ISP may further optimize parameters such as exposure and a color temperature of a to-be-photographed scene. In some embodiments, the ISP may be disposed in the camera 193.

The camera 193 is configured to capture a static image or a video. The camera 193 may be triggered to be on by using an application instruction, to implement a photographing function, for example, capturing an image in any scene. The camera may include an imaging lens, a filter, an image sensor, and another component. Light emitted or reflected by an object enters the imaging lens, passes through the filter, and finally converges on the image sensor. The imaging lens is mainly configured to perform converging and imaging on light emitted or reflected by all objects (which may also be referred to as a to-be-photographed scene or a target scene, or may be understood as a scene image expected to be photographed by the user) in a camera angle. The filter is mainly configured to filter out excess light waves (for example, light waves other than visible light, such as infrared) in light. The image sensor may be a charge coupled device (charge coupled device, CCD) or a complementary metal-oxide-semiconductor (complementary metal-oxide-semiconductor, CMOS) phototransistor. The image sensor is mainly configured to perform optical-to-electrical conversion on a received optical signal, to convert the optical signal into an electrical signal, and then transmit the electrical signal to the ISP to convert the electrical signal into a digital image signal. The ISP outputs the digital image signal to the DSP for processing. The DSP converts the digital image signal into an image signal in a standard format, for example, RGB or YUV. In some embodiments, the electronic device 100 may include 1 or N cameras 193, where N is a positive integer greater than 1.

The camera 193 may be located in a front of the electronic device 100, or may be located on a back of the electronic device 100. A specific quantity of cameras and a layout manner of the camera may be set as required. This is not limited in this application.

For example, the electronic device 100 includes a front-facing camera and a rear-facing camera. For example, the front-facing camera or the rear-facing camera may include one or more cameras. For example, the electronic device 100 includes four rear-facing cameras. In this case, when the electronic device 100 enables the four rear-facing cameras to perform photographing, the image processing method provided in embodiments of this application may be used. Alternatively, the camera is disposed on an external accessory of the electronic device 100, the external accessory is rotatably connected to a frame of a mobile phone, and an angle formed between the external accessory and the display 194 of the electronic device 100 is any angle between 0 degrees and 360 degrees. For example, when a selfie is taken by using the electronic device 100, the external accessory drives the camera to rotate to a position facing the user. Certainly, when the mobile phone has a plurality of cameras, only some cameras may be disposed on the external accessory, and remaining cameras are disposed on a body of the electronic device 100. This is not limited in this embodiment of this application.

The digital signal processor is configured to process a digital signal. In addition to a digital image signal, the digital signal processor can further process another digital signal. For example, when the electronic device 100 selects a frequency, the digital signal processor is configured to perform Fourier transform and the like on frequency energy.

The internal memory 121 may be configured to store computer-executable program code. The executable program code includes instructions. The internal memory 121 may include a program storage area and a data storage area. The program storage area may store an operating system, an application required by at least one function (such as a sound playing function and an image playing function), and the like. The data storage area may store data (such as audio data and an address book) and the like created when the electronic device 100 is used. In addition, the internal memory 121 may include a high-speed random access memory, and may further include a nonvolatile memory, for example, at least one magnetic disk storage device, a flash memory, or a universal flash storage (universal flash storage, UFS). The processor 110 runs the instructions stored in the internal memory 121, and/or the instructions stored in the memory disposed in the processor, to execute various functional applications and data processing of the electronic device 100.

The internal memory 121 may further store software code of the image processing method provided in embodiments of this application. When the processor 110 runs the software code, steps in a procedure of the image processing method are executed to implement "unlimited photographing".

The internal memory 121 may also store a captured image.

An external memory interface 120 may be configured to connect to an external storage card such as a micro SD card, to expand a storage capability of the electronic device 100. The external storage card communicates with the processor 110 through the external memory interface 120, to implement a data storage function. For example, files such as music are stored in the external storage card.

Certainly, the software code for the image processing method provided in embodiments of this application may alternatively be stored in the external memory. The processor 110 may run the software code through the external memory interface 120, to perform the steps in the procedure of the image processing method, thereby obtaining a high-definition image. The image captured by the electronic device 100 may alternatively be stored in the external memory.

It should be understood that the user may designate whether the image is to be stored in the internal memory 121 or the external memory. For example, when the electronic device 100 is connected to the external memory, if the electronic device 100 captures and obtains one frame of image, prompt information may pop up to prompt the user whether to store the image in the external memory or the internal memory. Certainly, there may be another specified manner. This is not limited in this embodiment of this application. Alternatively, when detecting that a memory amount of the internal memory 121 is less than a preset amount, the electronic device 100 may automatically store the image in the external memory.

The electronic device 100 may implement an audio function by using the audio module 170, the loudspeaker 170A, the receiver 170B, the microphone 170C, the headset jack 170D, the application processor, and the like. The audio function includes, for example, music playing and sound recording.

The pressure sensor 180A is configured to sense a pressure signal, and can convert the pressure signal into an electrical signal. In some embodiments, the pressure sensor 180A may be disposed in the display 194.

The gyroscope sensor 180B may be configured to determine a motion posture of the electronic device 100. In some embodiments, angular velocities of the electronic device 100 around three axes (that is, x, y, and z axes) may be determined by using the gyroscope sensor 180B. The gyroscope sensor 180B may be used for image stabilization during photographing.

The barometric pressure sensor 180C is configured to measure barometric pressure. In some embodiments, the electronic device 100 calculates an altitude based on a barometric pressure value measured by the barometric pressure sensor 180C, to assist in positioning and navigation.

The magnetic sensor 180D may include a Hall sensor. The electronic device 100 may detect opening and closing of a flip leather cover by using the magnetic sensor 180D. In some embodiments, when the electronic device 100 is a clamshell phone, the electronic device 100 may detect opening and closing of a flip cover based on the magnetic sensor 180D. Further, features such as automatic unlocking of the flip cover are set based on the detected opening and closing states of the leather case or opening and closing states of the flip cover.

The acceleration sensor 180E may detect magnitudes of acceleration in various directions (usually on three axes) of the electronic device 100, may detect a magnitude and a direction of gravity when the electronic device 100 is static. The acceleration sensor may be further configured to recognize a posture of the electronic device, and is applied to applications such as switching between landscape and portrait modes and a pedometer.

The distance sensor 180F is configured to measure a distance. The electronic device 100 may measure a distance in an infrared manner or a laser manner. In some embodiments, in a photographing scenario, the electronic device 100 may measure a distance by using the distance sensor 180F, to implement quick focusing.

The optical proximity sensor 180G may include, for example, a light-emitting diode (LED) and an optical detector, for example, a photodiode. The light-emitting diode may be an infrared light-emitting diode. The electronic device 100 emits infrared light by using the light-emitting diode. The electronic device 100 uses the photodiode to detect reflected infrared light from a nearby object. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to implement automatic screen-off to save power. The optical proximity sensor 180G may be further configured to automatically unlock and lock the screen in a leather cover mode and a pocket mode.

The ambient light sensor 180L is configured to sense ambient light brightness. The electronic device 100 may adaptively adjust brightness of the display 194 based on the perceived ambient light brightness. The ambient light sensor 180L may be further configured to automatically adjust white balance during photographing. The ambient light sensor 180L may also cooperate with the optical proximity sensor 180G to detect whether the electronic device 100 is in a pocket to prevent an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 lowers performance of a processor located near the temperature sensor 180J, to reduce power consumption and implement thermal protection. In some other embodiments, when the temperature is less than another threshold, the electronic device 100 heats the battery 142 to avoid abnormal shutdown of the electronic device 100 caused by a low temperature. In some other embodiments, when the temperature is lower than still another threshold, the electronic device 100 boosts an output voltage of the battery 142 to avoid abnormal shutdown caused by a low temperature.

The touch sensor 180K is also referred to as a "touch device". The touch sensor 180K may be disposed on the display 194. The touch sensor 180K and the display 194 constitute a touchscreen, which is also referred to as a "touch screen". The touch sensor 180K is configured to detect a touch operation on or near the touch sensor. The touch sensor may transfer the detected touch operation to the application processor to determine a type of a touch event. A visual output related to the touch operation may be provided by using the display 194. In some other embodiments, the touch sensor 180K may be alternatively disposed on a surface of the electronic device 100 at a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may be in contact with a human pulse, to receive a blood pressure pulse signal. In some embodiments, the bone conduction sensor 180M may alternatively be disposed in a headset to be combined into a bone conduction headset. The audio module 170 may obtain a speech signal through parsing based on the vibration signal that is of the vibration bone in the vocal-cord part and that is obtained by the bone conduction sensor 180M, to implement a speech function. The application processor may parse heart rate information based on a blood pressure beating signal obtained by the bone conduction sensor 180M, to implement a heart rate measurement function.

The button 190 includes a power on/off button, a volume button, and the like. The button 190 may be a mechanical button, or may be a touch key. The electronic device 100 may receive a key input, and generate a key signal input related to a user setting and function control of the electronic device 100.

The motor 191 may generate a vibration alert. The motor 191 may be configured to provide a vibration prompt for an incoming call, and may be further configured to provide vibration feedback for a touch. For example, touch operations performed on different applications (for example, photographing and audio playing) may correspond to different vibration feedback effects.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195 to implement contact with and separation from the electronic device 100.

It may be understood that an example structure in this embodiment of this application does not constitute a specific limitation on the electronic device 100. In some other embodiments of this application, the electronic device 100 may include more or fewer components than those shown in the figure, or combine some components, or split some components, or have a different component arrangement. The components shown in the figure may be implemented by hardware, software, or a combination of software and hardware.

The foregoing describes in detail a hardware system of the electronic device 100. The following describes a software system of the electronic device 100.

Figure 28:
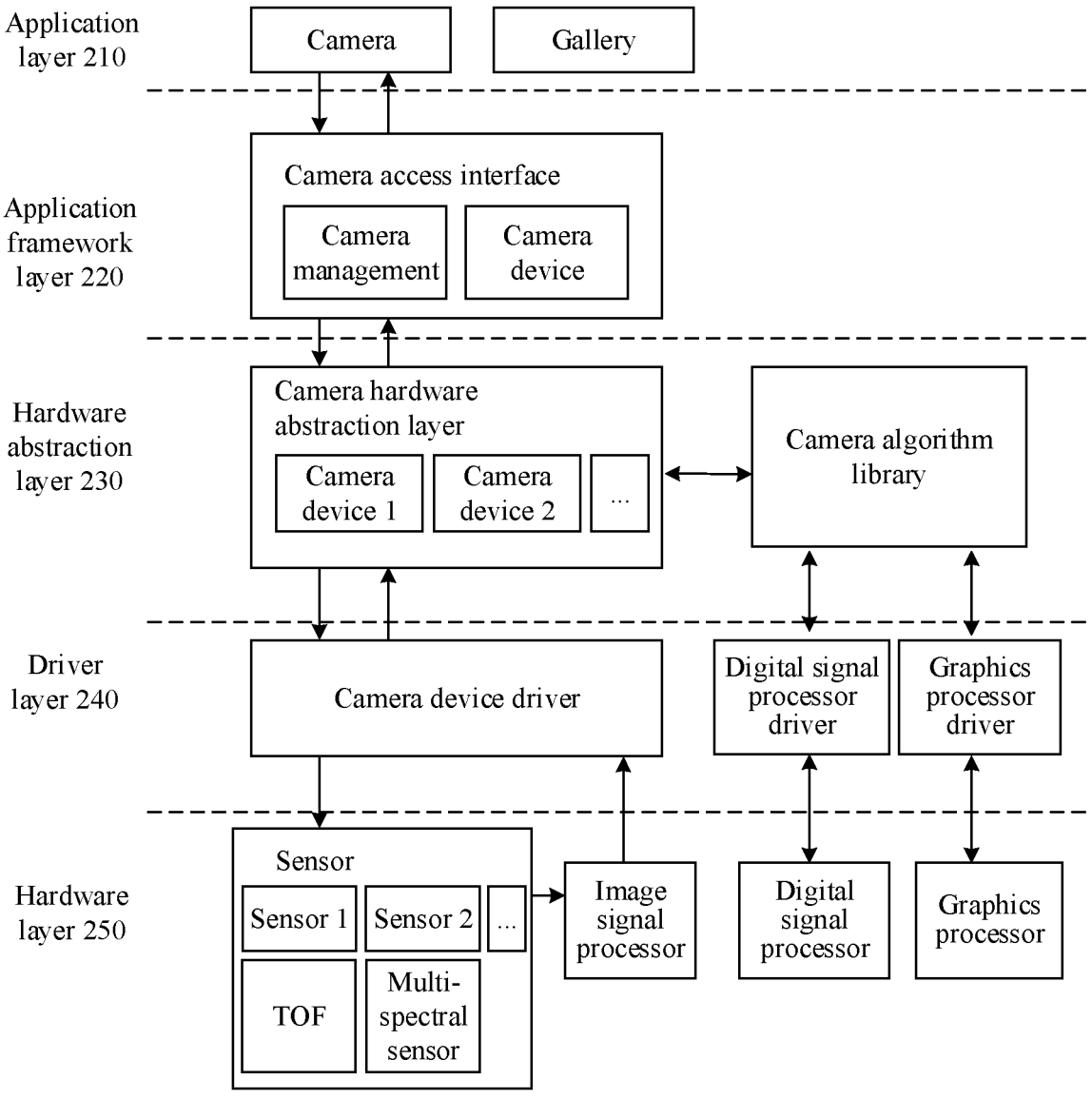
FIG. 28 is a diagram of a software structure of an electronic device according to an embodiment of this application.

FIG. 28 is a diagram of a software system of an electronic device according to an embodiment of this application.

As shown in FIG. 28, a system architecture may include an application layer (application, APP) 210, an application framework layer 220, a hardware abstraction layer (hardware abstract layer, HAL) 230, a driver layer 240, and a hardware layer 250.

The application layer 210 may include a camera application or another application, and the another application includes but is not limited to an application such as a camera or a gallery.

The application layer 210 is located at the top of an entire framework, and is responsible for directly interacting with a user. Once receiving a direct or an indirect requirement of the user, for example, photographing, the application layer sends the requirement to the application framework layer 220 through an interface, and waits for a result obtained after the application framework layer 220 performs backhaul processing. The result includes image data, camera parameters, and the like. The application layer 210 then feeds back the result to the user.

The application framework layer 220 may provide an application programming interface (application programming interface, API) and a programming framework to an application of the application layer. The application framework layer may include some predefined functions.

For example, the application framework layer 220 may include a camera access interface. The camera access interface may include camera management and a camera device. The camera management may be used to provide an access interface for managing the camera. The camera device may be configured to provide an interface for accessing the camera.

The hardware abstraction layer 230 is configured to abstract hardware. For example, the hardware abstraction layer may include a camera hardware abstraction layer and another hardware device abstraction layer. The camera hardware abstraction layer may include a camera device 1, a camera device 2, and the like. The camera hardware abstraction layer may be connected to a camera arithmetic library. The camera hardware abstraction layer may invoke an algorithm in the camera arithmetic library.

In this application, a perception engine used to perform various types of detection may be disposed at the hardware abstraction layer.

The driver layer 240 is used to provide drivers for different hardware devices. For example, the drive layer may include a camera device driver, a digital signal processor driver, and a graphics processor driver.

The hardware layer 250 may include a plurality of image sensors (sensor), a plurality of image signal processors, digital signal processors, graphics processors, and other hardware devices.

For example, the hardware layer 250 includes a sensor and an image signal processor. The sensor may include a sensor 1, a sensor 2, a depth sensor (time of flight, TOF), a multi-spectral sensor, and the like. The image signal processor may include an image signal processor 1, an image signal processor 2, and the like.

In this application, by invoking a hardware abstraction layer interface in the hardware abstraction layer 230, a connection between the application layer 210 above the hardware abstraction layer 230, the application framework layer 220, the driver layer 240 below, and the hardware layer 250 may be implemented, to implement camera data transmission and function control.

In a camera hardware interface layer in the hardware abstraction layer 230, a manufacturer may customize a function herein as required. The camera hardware interface layer is more efficient, flexible, and low-latency than the hardware abstraction layer interface, and can also be more abundant to invoke the ISP and the GPU to implement image processing. An image input to the hardware abstraction layer 230 may be from an image sensor, or may be from a stored image.

A scheduling layer in the hardware abstraction layer 230 includes a generic functional interface for implementing management and control.

A camera service layer in the hardware abstraction layer 230 is configured to access interfaces of the ISP and other hardware.

A working process of software and hardware of the electronic device 100 is described by using examples in combination with an image capture scenario.

The camera application in the application layer may be displayed on the screen of the electronic device 100 in an icon manner. When the icon of the camera application is tapped and triggered by the user, the electronic device 100 starts to run the camera application. When the camera application is run on the electronic device 100, the camera application invokes an interface corresponding to the camera application in the application framework layer 210, then enables a camera driver by invoking the hardware abstraction layer 230, enables the camera 193 on the electronic device 100, and captures one or more frames of initial images by using the image sensor. Then, the image sensor may process the captured image in the image sensor or transmit the captured image to one or more paths of image signal processors for processing, and then save a processed captured image and/or transmit the processed captured image to the display for display.

Figure 29:
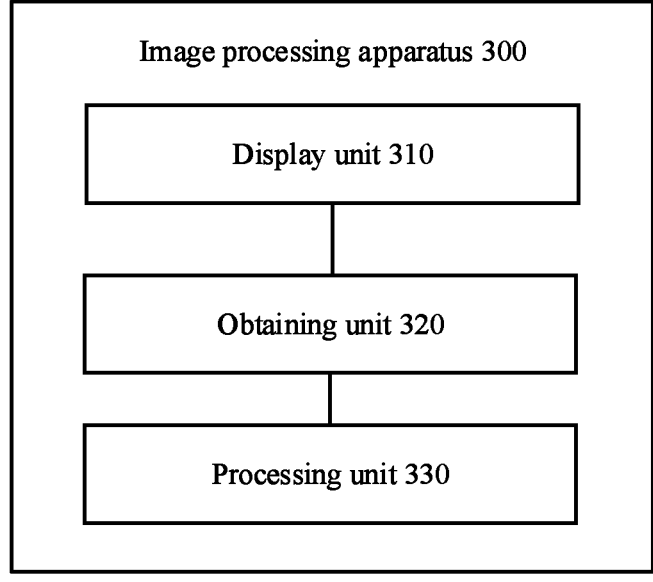
FIG. 29 is a diagram of a structure of an image processing apparatus according to an embodiment of this application.

The following describes an image processing apparatus 300 configured to implement the foregoing image processing method according to an embodiment of this application. FIG. 29 is a diagram of an image processing apparatus 300 according to an embodiment of this application.

As shown in FIG. 29, the image processing apparatus 300 includes a display unit 310, an obtaining unit 320, and a processing unit 330.

The display unit 310 is configured to display a first interface. The first interface includes a preview image and a first control. The first control indicates a photo mode.

The obtaining unit 320 is configured to detect a first operation performed by a user on the first control.

The processing unit 330 is configured to capture an original image once in response to the first operation by using a camera.

The processing unit 330 is further configured to determine a quantity of times of waiting for photographing in the background; and when the quantity of times of waiting for photographing in the background is less than or equal to M, process the original image by using a first photographing algorithm, to obtain a corresponding captured image; or when the quantity of times of waiting for photographing in the background is greater than M and less than or equal to N, process the original image by using a second photographing algorithm, to obtain a corresponding captured image; and save the captured image.

It should be noted that the foregoing image processing apparatus 300 is embodied in a form of a functional unit. The term "unit" herein may be implemented in a form of software and/or hardware. This is not specifically limited.

For example, the "unit" may be a software program, a hardware circuit, or a combination thereof that implements the foregoing functions. The hardware circuit may include an application-specific integrated circuit (application-specific integrated circuit, ASIC), an electronic circuit, a processor (for example, a shared processor, a dedicated processor, or a packet processor) configured to execute one or more software or firmware programs and a memory, a combined logic circuit, and/or another appropriate component that supports the described functions.

Therefore, the units in the examples described in embodiments of this application may be implemented by electronic hardware or a combination of computer software and electronic hardware. Whether these functions are performed by hardware or software depends on particular applications and design constraints of the technical solutions. A person skilled in the art may use different methods to implement the described functions for each particular application, but it should not be considered that the implementation goes beyond the scope of this application.

An embodiment of this application further provides a computer-readable storage medium. The computer-readable storage medium stores computer instructions. When the computer-readable storage medium runs on the image processing apparatus 300, the image processing apparatus 300 is enabled to perform the foregoing image processing method.

The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium, or a semiconductor medium (for example, a solid state disk (solid state disk, SSD)), or the like.

An embodiment of this application further provides a computer program product that includes computer instructions. When the computer program product runs on the image processing apparatus 300, the image processing apparatus 300 may execute the foregoing image processing method.

Figure 30:
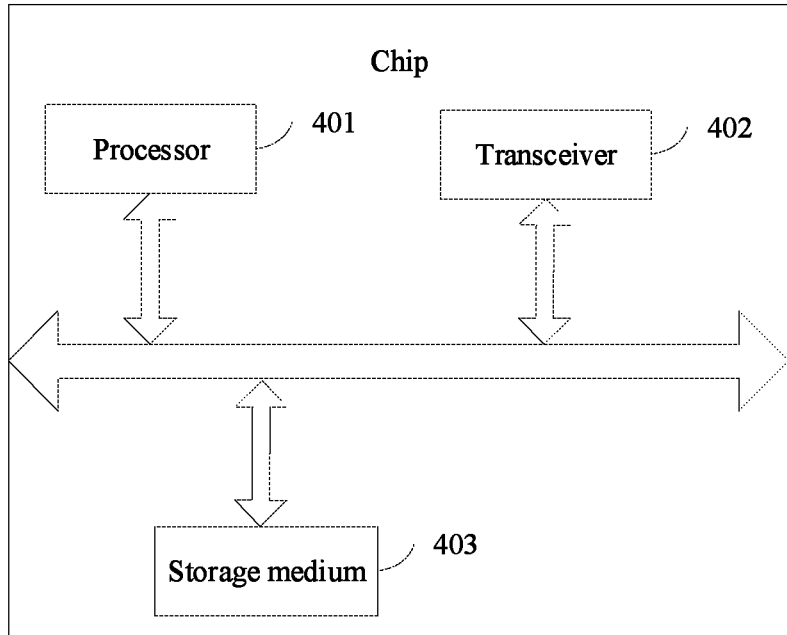
FIG. 30 is a diagram of a structure of a chip according to an embodiment of this application.

FIG. 30 is a diagram of a structure of a chip according to an embodiment of this application. The chip shown in FIG. 30 may be a general-purpose processor, or may be a dedicated processor. The chip includes a processor 401. The processor 401 is configured to support the image processing apparatus 300 to execute the foregoing technical solutions.

Optionally, the chip further includes a transceiver 402. The transceiver 402 is configured to receive control of the processor 401, and is configured to support the image processing apparatus 300 to execute the foregoing technical solutions.

Optionally, the chip shown in FIG. 30 may further include a storage medium 403.

It should be noted that the chip shown in FIG. 30 may be implemented by using the following circuit or component:

one or more field-programmable gate arrays (field-programmable gate array, FPGA), programmable logic devices (programmable logic device, PLD), controllers, state machines, logic gates, discrete hardware components, any other appropriate circuits, or any combination of circuits that can perform the various functions described in this application.

The electronic device, the image processing apparatus 300, the computer storage medium, the computer program product, and the chip provided in the foregoing embodiments of this application are all configured to perform the method provided above. Therefore, for beneficial effects that can be achieved by the electronic device, the image processing apparatus 300, the computer storage medium, the computer program product, and the chip, refer to the beneficial effects corresponding to the method provided above. Details are not described herein again.

It should be understood that the foregoing descriptions are intended to help a person skilled in the art to better understand embodiments of this application, but not to limit the scope of embodiments of this application. It is clear that a person skilled in the art may make various equivalent modifications or changes based on the foregoing examples. For example, some steps in various embodiments of the foregoing detection method may be unnecessary, or some steps may be newly added. Alternatively, any two or more of the foregoing embodiments are combined. A modified, changed, or combined solution also falls within the scope of embodiments of this application.

It should be further understood that the foregoing description of embodiments of this application focuses on highlighting differences between the embodiments. For a same or similar description that is not mentioned, refer to each other. For brevity, details are not described herein again.

It should be further understood that a value of a sequence number of each of the foregoing processes does not mean an order of an execution sequence. The execution sequence of each process should be determined based on a function and internal logic of each process, and should not be construed as any limitation on the implementation processes of embodiments of this application.

It should be further understood that in embodiments of this application, "predefined" and "preconfigured" may be implemented by prestoring corresponding code, tables, or other forms that can be used to indicate related information in devices (for example, including the electronic device), and a specific implementation thereof is not limited in this application.

It should be further understood that division of manners, cases, types, and embodiments in embodiments of this application are merely for ease of description, but should not constitute a special limitation, and features in various manners, types, cases, and embodiments may be combined when there is no contradiction.

It should be further understood that in embodiments of this application, if there is no specific description and no logical conflict, terms and/or descriptions are consistent and may be mutually referenced between different embodiments, and technical features in different embodiments may be combined based on an internal logical relationship thereof to form a new embodiment.

In conclusion, it should be noted that the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

The invention claimed is:

1. A method, comprising:

displaying a first interface that comprises a preview image and a first control, wherein the first control indicates a photo mode;

capturing, by a camera and when detecting a first operation on the first control, in response to the first operation, an original image once;

processing the original image with a first photographing algorithm, to obtain a corresponding captured image, when a quantity of times of waiting for photographing in a background is less than or equal to M, wherein the quantity of times of waiting for photographing in the background is equal to a difference obtained through subtracting a quantity of times of processed photographing and a quantity of times of photographing being processed from a current accumulated quantity of photographing times;

processing the original image with a second photographing algorithm, to obtain a corresponding captured image, when the quantity of times of waiting for photographing in the background is greater than M and less than or equal to N; and saving the captured image, wherein M<N, M and N are both positive integers, and a processing time of the second photographing algorithm is less than a processing time of the first photographing algorithm.

2. The method of claim 1, further comprising processing the original image with a third photographing algorithm, to obtain a corresponding captured image, when the quantity of times of waiting for photographing in the background is greater than N, wherein a processing time of the third photographing algorithm is less than the processing time of the second photographing algorithm.

3. The method of claim 2, wherein a single-frame algorithm is the third photographing algorithm when the quantity of times of waiting for photographing in the background is greater than N, and wherein the method further comprises processing one frame of an original image with the single-frame algorithm to obtain the corresponding captured image.

4. The method of claim 1, further comprising:

capturing, by the camera and when detecting a second operation on the first control, in response to the second operation, original images at a plurality of times; and processing, with a fourth photographing algorithm, the original image captured at each of the plurality of times, to respectively obtain a corresponding captured image, wherein a processing time of the fourth photographing algorithm is less than the processing time of the second photographing algorithm.

5. The method of claim 1, wherein before processing the original image with the first photographing algorithm, the method further comprises:

performing detection on a to-be-photographed scene, and obtaining a detection result, wherein the detection comprises illuminance detection, dynamic range detection, and at least one of artificial intelligence (AI) scene recognition, motion detection, human face detection, and human face attribute detection, wherein the first photographing algorithm is based on the detection result.

6. The method of claim 5, wherein performing detection on the to-be-photographed scene and obtaining the detection result comprises:

performing front-end processing on the original image, wherein the front-end processing is to correct the original image; and performing detection on the original image obtained after the front-end processing, to obtain the detection result.

7. The method of claim 5, wherein processing the original image with the first photographing algorithm when the quantity of times of waiting for photographing in the background is less than or equal to M comprises:

processing P frames of original images with a first night mode algorithm as the first photographing algorithm, to obtain the corresponding captured image, when an illuminance in the to-be-photographed scene is less than or equal to a first illuminance threshold, wherein the illuminance is determined when a to-be-photographed object in the to-be-photographed scene is static;

processing P frames of original images with a first multi-frame noise reduction (MFNR) algorithm as the first photographing algorithm, to obtain the corresponding captured image, when a dynamic range in the to-be-photographed scene is less than or equal to a first dynamic range threshold and the illuminance in the to-be-photographed scene is greater than the first illuminance threshold; and processing P frames of original images with a first high dynamic range (HDR) algorithm, to obtain the corresponding captured image, when the dynamic range in the to-be-photographed scene is greater than the first dynamic range threshold, wherein P is an integer greater than 1.

8. The method of claim 7, wherein processing P frames of original images with the first night mode algorithm comprises:

performing third front-end processing on the P frames of original images to obtain P frames of first intermediate images;

processing the P frames of first intermediate images with the first night mode algorithm to obtain one frame of second intermediate image; and performing first back-end processing on the frame of second intermediate image to obtain the corresponding captured image.

9. The method of claim 7, wherein processing P frames of original images with the first MFNR algorithm comprises:

performing fourth front-end processing on the P frames of original images to obtain P frames of third intermediate images;

processing the P frames of third intermediate images with the first MFNR algorithm to obtain one frame of fourth intermediate image; and performing second back-end processing on the frame of fourth intermediate image to obtain the corresponding captured image.

10. The method of claim 7, wherein processing P frames of original images with the first HDR algorithm comprises:

performing fifth front-end processing on the P frames of original images to obtain P frames of fifth intermediate images;

processing the P frames of fifth intermediate images with the first HDR algorithm to obtain one frame of sixth intermediate image; and performing third back-end processing on the frame of sixth intermediate image to obtain the corresponding captured image.

11. The method of claim 7, further comprising:

processing Q frames of original images with a second night mode algorithm as the first photographing algorithm, to obtain the corresponding captured image, when the illuminance in the to-be-photographed scene is less than or equal to a second illuminance threshold, wherein whether the illuminance is less than or equal to the second illuminance threshold is determined when a moving speed of the to-be-photographed object is greater than a preset speed threshold;

processing Q frames of original images with a second MFNR algorithm as the first photographing algorithm, to obtain the corresponding captured image, when the dynamic range in the to-be-photographed scene is less than or equal to a second dynamic range threshold and the illuminance in the to-be-photographed scene is greater than the second illuminance threshold; and processing Q frames of original images with a second HDR algorithm as the first photographing algorithm, to obtain the corresponding captured image, when the dynamic range in the to-be-photographed scene is greater than the second dynamic range threshold, wherein Q is an integer greater than or equal to 1, and Q<P.

12. The method of claim 11, wherein processing Q frames of original images with the second night mode algorithm comprises:

performing sixth front-end processing on the Q frames of original images to obtain Q frames of seventh intermediate images;

processing the Q frames of seventh intermediate images with the second night mode algorithm to obtain one frame of eighth intermediate image; and performing fourth back-end processing on the frame of eighth intermediate image to obtain the corresponding captured image.

13. The method of claim 11, wherein processing Q frames of original images with the second MFNR algorithm comprises:

performing seventh front-end processing on the Q frames of original images to obtain Q frames of ninth intermediate images;

processing the Q frames of ninth intermediate images with the second MFNR algorithm to obtain one frame of tenth intermediate image; and performing fifth back-end processing on the frame of tenth intermediate image to obtain the corresponding captured image.

14. The method of claim 11, wherein processing Q frames of original images with the second HDR algorithm comprises:

performing eighth front-end processing on the Q frames of original images to obtain Q frames of eleventh intermediate images;

processing the Q frames of eleventh intermediate images with the second HDR algorithm to obtain one frame of twelfth intermediate image; and performing sixth back-end processing on the frame of twelfth intermediate image to obtain the corresponding captured image.

15. The method of claim 11, wherein a single-frame algorithm is the first photographing algorithm when the moving speed of the to-be-photographed object is less than or equal to the preset speed threshold, wherein the method further comprises processing one frame of an original image with the single-frame algorithm to obtain the corresponding captured image.

16. The method of claim 15, wherein processing one frame of the original image with the single-frame algorithm comprises:

performing ninth front-end processing on the frame of the original image to obtain one frame of thirteenth intermediate image; and performing seventh back-end processing on the frame of thirteenth intermediate image to obtain the corresponding captured image.

17. The method of claim 5, wherein processing the original image with the second photographing algorithm when the quantity of times of waiting for photographing in the background is greater than M and less than or equal to N comprises:

processing R frames of original images with a third night mode algorithm as the second photographing algorithm, to obtain the corresponding captured image, when an illuminance in the to-be-photographed scene is less than or equal to a third illuminance threshold;

processing R frames of original images with a third multi-frame noise reduction (MFNR) algorithm as the second photographing algorithm, to obtain the corresponding captured image, when a dynamic range in the to-be-photographed scene is less than or equal to a third dynamic range threshold and the illuminance in the to-be-photographed scene is greater than the third illuminance threshold; and processing R frames of original images with a third high dynamic range (HDR) algorithm as the second photographing algorithm, to obtain the corresponding captured image, when the dynamic range in the to-be-photographed scene is greater than the third dynamic range threshold, wherein R is an integer greater than or equal to 1, and R≤Q<P.

18. The method of claim 17, wherein processing R frames of original images with the third HDR algorithm comprises:

performing twelfth front-end processing on the R frames of original images to obtain R frames of eighteenth intermediate images;

processing the R frames of eighteenth intermediate images with the third HDR algorithm to obtain one frame of nineteenth intermediate image; and performing tenth back-end processing on the frame of nineteenth intermediate image to obtain the corresponding captured image.

19. An electronic device, comprising:

one or more processors; and a memory coupled to the one or more processors and configured to store instructions that, when executed by the one or more processors, cause the electronic device to be configured to:

display a first interface that comprises a preview image and a first control, wherein the first control indicates a photo mode;

capture, by a camera and when detecting a first operation on the first control, in response to the first operation, an original image once;

process the original image with a first photographing algorithm, to obtain a corresponding captured image, when a quantity of times of waiting for photographing in a background is less than or equal to M, wherein the quantity of times of waiting for photographing in the background is equal to a difference obtained through subtracting a quantity of times of processed photographing and a quantity of times of photographing being processed from a current accumulated quantity of photographing times;

process the original image with a second photographing algorithm, to obtain a corresponding captured image, when the quantity of times of waiting for photographing in the background is greater than M and less than or equal to N; and save the captured image, wherein M<N, M and N are both positive integers, and a processing time of the second photographing algorithm is less than a processing time of the first photographing algorithm.

20. A non-transitory computer-readable storage medium storing instructions that, when executed by one or more processors of an electronic device, cause the electronic device to be configured to:

display a first interface that comprises a preview image and a first control, wherein the first control indicates a photo mode;

capture, by a camera and when detecting a first operation on the first control, in response to the first operation, an original image once;

process the original image with a first photographing algorithm, to obtain a corresponding captured image, when a quantity of times of waiting for photographing in a background is less than or equal to M, wherein the quantity of times of waiting for photographing in the background is equal to a difference obtained through subtracting a quantity of times of processed photographing and a quantity of times of photographing being processed from a current accumulated quantity of photographing times;

process the original image with a second photographing algorithm, to obtain a corresponding captured image, when the quantity of times of waiting for photographing in the background is greater than M and less than or equal to N; and save the captured image, wherein M<N, M and N are both positive integers, and a processing time of the second photographing algorithm is less than a processing time of the first photographing algorithm.

* * * * *